US010401495B2

(12) United States Patent
Crouch et al.

(10) Patent No.: US 10,401,495 B2
(45) Date of Patent: Sep. 3, 2019

(54) METHOD AND SYSTEM FOR TIME SEPARATED QUADRATURE DETECTION OF DOPPLER EFFECTS IN OPTICAL RANGE MEASUREMENTS

(71) Applicant: Blackmore Sensors and Analytics Inc., Bozeman, MT (US)

(72) Inventors: Stephen C. Crouch, Bozeman, MT (US); Krishna Rupavatharam, Bozeman, MT (US)

(73) Assignee: Blackmore Sensors and Analytics Inc., Bozeman, MT (US)

( * ) Notice: Subject to any disclaimer, the term of this patent is extended or adjusted under 35 U.S.C. 154(b) by 101 days.

(21) Appl. No.: 15/645,311

(22) Filed: Jul. 10, 2017

(65) Prior Publication Data

US 2019/0011558 A1 Jan. 10, 2019

(51) Int. Cl.
*G01S 17/10* (2006.01)
*H04L 12/28* (2006.01)
(Continued)

(52) U.S. Cl.
CPC .......... *G01S 17/102* (2013.01); *G01S 7/4866* (2013.01); *G01S 17/936* (2013.01); *G08G 1/04* (2013.01);
(Continued)

(58) Field of Classification Search
CPC .... G01S 17/102; G01S 7/4866; G01S 17/936; G08G 1/04; G08G 1/16; H04B 10/505; H04B 10/516; H04L 12/2801
See application file for complete search history.

(56) References Cited

U.S. PATENT DOCUMENTS 4,099,249 A 7/1978 Casasent
5,781,156 A 7/1998 Krasner
(Continued)

FOREIGN PATENT DOCUMENTS

CN 105652282 6/2016
WO 2007/124063 11/2007
(Continued)

OTHER PUBLICATIONS

Duncan B., & Dierking M., "Holographic aperture ladar", Applied Optics, vol. 48, Issue 6, pp. 1-10 (2009).
(Continued)

*Primary Examiner* — Yuen Wong
(74) *Attorney, Agent, or Firm* — Beusse Wolter Sanks & Maire; Eugene Molinelli

(57) ABSTRACT

Doppler correction of broadband LIDAR includes mixing, during a first time interval, a returned optical signal with an in-phase version of the transmitted signal to produce a first mixed optical signal that is detected during the first time interval to produce a first electrical signal. During a non-overlapping second time interval the returned optical signal is mixed with a quadrature version of the transmitted signal to produce a second mixed optical signal that is detected during the second time interval to produce a second electrical signal. A complex digital signal uses one of the digitized electrical signals as a real part and a different one as the imaginary part. A signed Doppler frequency shift of the returned optical signal is determined based, at least in part, on a Fourier transform of the complex digital signal. A device is operated based on the Doppler frequency shift.

13 Claims, 25 Drawing Sheets

(51) Int. Cl.
| | |
|---|---|
| *H04B 10/516* | (2013.01) |
| *H04B 10/50* | (2013.01) |
| *G08G 1/16* | (2006.01) |
| *G08G 1/04* | (2006.01) |
| *G01S 17/93* | (2006.01) |
| *G01S 7/486* | (2006.01) |

(52) U.S. Cl.
CPC ............. *G08G 1/16* (2013.01); *H04B 10/505* (2013.01); *H04B 10/516* (2013.01); *H04L 12/2801* (2013.01)

(56) References Cited

U.S. PATENT DOCUMENTS

| | | |
|---|---|---|
| 6,753,950 B2 | 6/2004 | Morcom |
| 6,931,055 B1 | 8/2005 | Underbrink et al. |
| 7,511,824 B2 | 3/2009 | Sebastian et al. |
| 7,742,152 B2 | 6/2010 | Hui et al. |
| 7,917,039 B1 | 3/2011 | Delfett |
| 8,531,650 B2 | 9/2013 | Feldkhun et al. |
| 8,805,197 B2 | 8/2014 | Delfett |
| 9,383,753 B1 | 7/2016 | Templeton et al. |
| 10,036,812 B2 | 7/2018 | Crouch et al. |
| 2002/0071109 A1 | 6/2002 | Allen et al. |
| 2004/0109155 A1 | 6/2004 | Deines |
| 2006/0239312 A1 | 10/2006 | Kewitsch et al. |
| 2008/0018881 A1 | 1/2008 | Hui et al. |
| 2009/0002679 A1 | 1/2009 | Ruff et al. |
| 2010/0183309 A1 | 7/2010 | Etemad et al. |
| 2010/0188504 A1 | 7/2010 | Dimsdale |
| 2011/0205523 A1 | 8/2011 | Pezk et al. |
| 2011/0292371 A1 | 12/2011 | Chang |
| 2012/0274922 A1 | 1/2012 | Hodge |
| 2012/0038902 A1 | 2/2012 | Dotson |
| 2015/0046119 A1* | 2/2015 | Sandhawalia .......... G01B 11/24 702/167 |
| 2015/0185244 A1 | 7/2015 | Inoue et al. |
| 2015/0323660 A1 | 11/2015 | Hampikian |
| 2016/0091599 A1 | 3/2016 | Jenkins |
| 2016/0123720 A1 | 5/2016 | Thorpe et al. |
| 2016/0216366 A1 | 7/2016 | Phillips et al. |
| 2016/0377724 A1 | 12/2016 | Crouch et al. |
| 2017/0343652 A1 | 11/2017 | de Mersseman et al. |
| 2017/0350964 A1 | 12/2017 | Kaneda |
| 2018/0224547 A1 | 8/2018 | Crouch et al. |

FOREIGN PATENT DOCUMENTS

| | | |
|---|---|---|
| WO | 2010/127151 | 11/2010 |
| WO | 2018/102188 | 6/2018 |
| WO | 2018/102190 | 6/2018 |
| WO | 2018/125438 | 7/2018 |
| WO | 2018/144853 | 9/2018 |
| WO | 2018/160240 | 9/2018 |

OTHER PUBLICATIONS

International Search Report and Written Opinion for correspondence PCT Application PCT/US17/062721 dated Feb. 6, 2018, pp. 1-12.
International Search Report and Written Opinion for correspondence PCT Application PCT/US17/62714 dated Aug. 23, 2018, pp. 1-13.
International Search Report and Written Opinion for correspondence PCT Application PCT/US17/62708 dated Mar. 16, 2018, pp. 1-14.
International Search Report and Written Opinion for correspondence PCT Application PCT/US17/62703 dated Aug. 27, 2018, pp. 1-13.
International Search Report and Written Opinion for correspondence PCT Application PCT/US18/44007 dated Oct. 25, 2018, pp. 1-11.
International Search Report and Written Opinion for correspondence PCT Application PCT/US18/41388 dated Sep. 20, 2018, pp. 1-13.
Adany, P., et al., "Chirped Lidar Using Simplified Homodyne Detection," Jour. Lightwave Tech., Aug. 2009; pp. 1-7, vol. 27, Issue 16.
Aull, B. F., et al., "Geiger-Mode avalanche photodiodes for three-dimensional imaging," Lincoln Lab. J., 2002, pp. 335-350, vol. 13.
Elashkansky, et al., M. "RF phase-coded random-modulation LIDAR," Optics Communications, 2004, pp. 93-98, vol. 231.
Beck, S. M., et al., "Synthetic-aperture imaging laser radar: laboratory demonstration and signal processing," Appl. Opt., 2005, pp. 7621-7629, vol. 44.
Berkovic, G. and Shafir E., "Optical methods for distance and displacement measurements," Adv. Opt. Photon. 4, 2012, pp. 441-471.
Eiesl, P.J. and N.D. McKay, "Method for registration of 3-D shapes," 1992, vol. 1611, pp. 586-606.
Campbell, JF, et al. "Super-resolution technique for CW lidar using Fourier transform reordering and Richardson-Lucy deconvolution." Opt Lett. Dec. 15, 2014; 39(24): 6981-4.
Cao, et al. "Lidar Signal Depolarization by Solid Targets and its Application to Terrain Mapping and 3D Imagery," Deference R&D, Contract Report DRDC Valcartier CR 2011-236 Mar. 2011 [retrieved on Jan. 11, 2018]. Retrieved from the Internet: <URL: http://publications.gc.ca/collections/collection_2016/rddc-drdc/D68-3-236-2011-eng.pdf> pp. 1-74.
Contu, Francesco, "The Do's and Don'ts of High Speed Serial Design in FPGA's". Xilinx All Programmable, Copyright 2013, High Speed Digital Design & Validation Seminars 2013.
Crouch, S. and Barber, Z. W., "Laboratory demonstrations of interferometric and spotlight synthetic aperture ladar techniques," Opt. Express 20, 2012, pp. 24237-24246.
Crouch, S., et al., "Three dimensional digital holographic aperture synthesis," Optics Express 23, pp. 23811-23816, 2015.
Dapore, B. R., et al., "Phase noise analysis of two wavelength coherent imaging system," Opt. Express 21, 2013, pp. 30642-30652.
Duncan, B. D. and Dierking, M. P., "Holographic aperture ladar: erratum," Appl. Opt. 52, 2013, pp. 706-708.
Fehr, D., A. Cherian, R. Sivalingam, S. Nickolay, V. Moreallas, and N. Papanikolopoulos, "Compact Covariance descriptors in 3D point clouds for object recognition," presented at the Robotics and Automation (ICRA), 2012 IEEE International Conference, pp. 1793-1798.
Foucras, M. et al., "Detailed Analysis of the Impact of the Code Doppler on the Acquisition Performance of New GNSS Signals," ION ITM 2014, International Technical Meeting of The Institute of Navigation, San Diego, California, Jan. 2014, pp. 1-13.
"Fundamentals of Direct Digital Synthesis," Analog Devices, MT-085 Tutorial Rev. D, Oct. 2008. pp. 1-9.
Garcia, J., et al., "Detection of Three Dimensional Objects Based on Phase Encoded Range Images," Sixth International Conference on Correlation Optics, Bellingham, WA 2004, pp. 269-280, vol. 5477.
Haralick, R.M., S.R. Stemberg and X. Zhuang, "Image Analysis Using Mathematical Morphology," IEEE Transactions on Pattern Analysis and Machine Intelligence, v. PAMI-9 (4), Jul. 1987.
Johnson, Andrew, "Spin-Images: A Representation for 3-D Surface Matching," doctoral dissertation, tech. report CMU-RI-TR-97-47, Robotics Institute, Carnegie Mellon University, Aug. 1997.
Kachelmyer, A.L., "Range-Doppler Imaging with a Laser Radar," The Lincoln Laboratory Journal, 1990, pp. 1-32, vol. 3, Issue: 1.
Klasing, K., D. Althoff, D. Wollher and M. Buss, "Comparison of Surface Normal Estimation Methods for Range Sensing Applications," in Proceedings of the 2009 IEEE International Conference on Robotics and Automation, Piscataway, NJ, USA, 2009, p. 1977-1982.
Krause, Brian W., et al., "Motion compensated frequency modulated continuous wave 3D coherent imaging ladar with scannerless architecture," Appl. Opt. v51, 2012, pp. 8745-8761.
Le, Trung-Thanh., "Arbitrary Power Splitting Couplers Based on 3x3 Multimode Interference Structures for All-optical Computing,"

(56) References Cited

OTHER PUBLICATIONS

IACSIT International Journal of Engineering and Technology. vol. 3, No. 5, Oct. 2011. pp. 565-569.

Lu, et al. "Recognizing Objects in 3D Point Clouds with Multi-Scale Local Features," Sensors 2014, 14, 24156-24173; doi: 10.3390/s141224156, Dec. 15, 2014 [retrieved on Jan. 11, 2018]. Retrieved from the Internet: <URL: www.mdpi.com/1424/-8220/14/12/24156/pdf>. pp. 24156-24173.

Marron, J. C. and Schroeder, K. S., "Three-dimensional lensless imaging using laser frequency diversity," Appl. Opt. 31, 1992, pp. 255-262.

Munkres, J., "Algorithms for the Assignment and Transportation Problems," Journal of the Society for Industrial and Applied Mathematics, v 5 (1), pp. 32-38, Mar. 1957.

O'Donnell, R.M., "Radar Systems Engineering Lecture 11 Waveforms and Pulse Compression," IEE New Hampshire Section, Jan. 1, 2010, pp. 1-58.

OIF (Optical Internetworking Forum), "Implementation Agreement for Integrated Dual Polarization Micro-Intradyne Coherent Receivers," R. Griggs, Ed., IA # OIF-DPC-MRX-01.0, published by Optical Internetworking Forum available at domain oiforum at category corn, Mar. 31, 2015.

Optoplex Corporation. "90 degree Optical Hybrid". Nov. 9, 2016.

Rabb, D. J., et al., "Multi-transmitter aperture synthesis," Opt. Express 18, 2010, pp. 24937-24945.

Roos, P. A., et al., "Ultrabroadband optical chirp linearization for precision metrology applications," Opt. Lett. 34, 2009, 3692-3694.

Salehian, H., G. Cheng, B.C. Vemuri and J. Ho, "Recursive Estimation of the Stein Center of SPD Matrices and Its Applications," in 2013 IEEE International Conference on Computer Vision (ICCV), 2013, pp. 1793-1800.

Satyan, N., et al., "Precise control of broadband frequency chirps using optoelectronic feedback," Opt. Express 17, 2009, pp. 15991-15999.

Stafford, J., et al., "Holographic aperture ladar with range compression," Journal of Optical Society of America, 2017, pp. A1-A9, vol. 34, No. 5.

Tippie, A. E., et al., "High-resolution synthetic-aperture digital holography with digital phase and pupil correction," Optics Express 19, 2011, pp. 12027-12038, vol. 19, No. 13.

Wikipedia, In-phase and quadrature components, https://en.wikipedia.org/wiki/In-phase_and_quadrature_components (as of Jan. 26, 2018 20:41 GMT).

Wikipedia, Field-programmable gate array, https://en.wikipedia.org/wiki/Field-programmable_gate_array (as of Apr. 15, 2017).

Wikipedia, Phase-shift keying, https://en.wikipedia.org/wiki/Phase-shift_keying#Binary_phase-shift_keying.28BPSK.29 (as of Oct. 23, 2016).

Wikipedia, Digital-to-analog converter, https://en.wikipedia.org/wiki/Digital-to-analog_converter (as of Apr. 15, 2017).

J. Ye, "Least Squares Linear Discriminant Analysis," Proceedings of the 24th International Conference on Machine Learning, p. 1087-1093 (as of Nov. 27, 2016).

International Search Report and Written Opinion for correspondence PCT Application PCT/US18/16632 dated Apr. 24, 2018, pp. 1-6.

\* cited by examiner

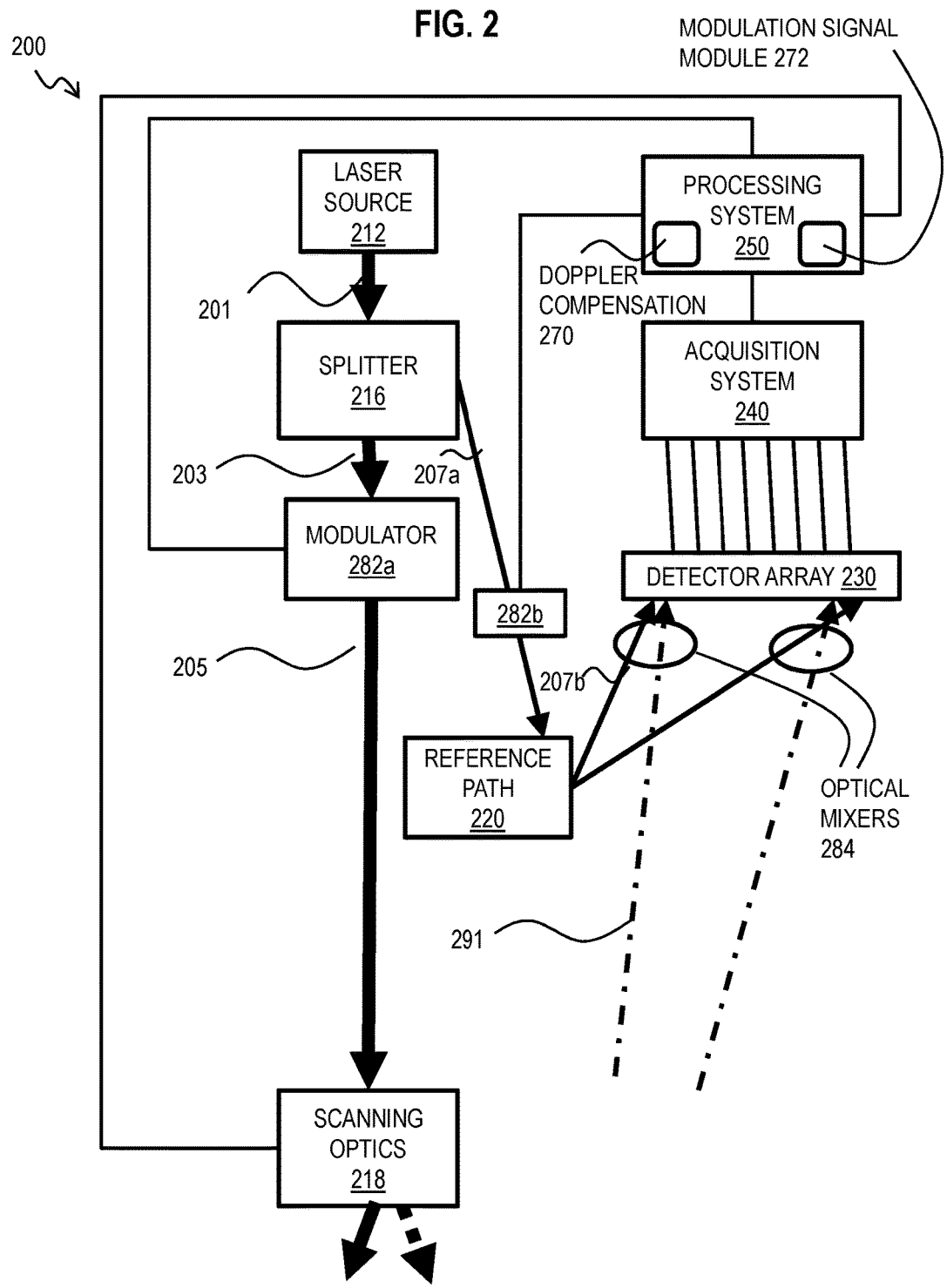

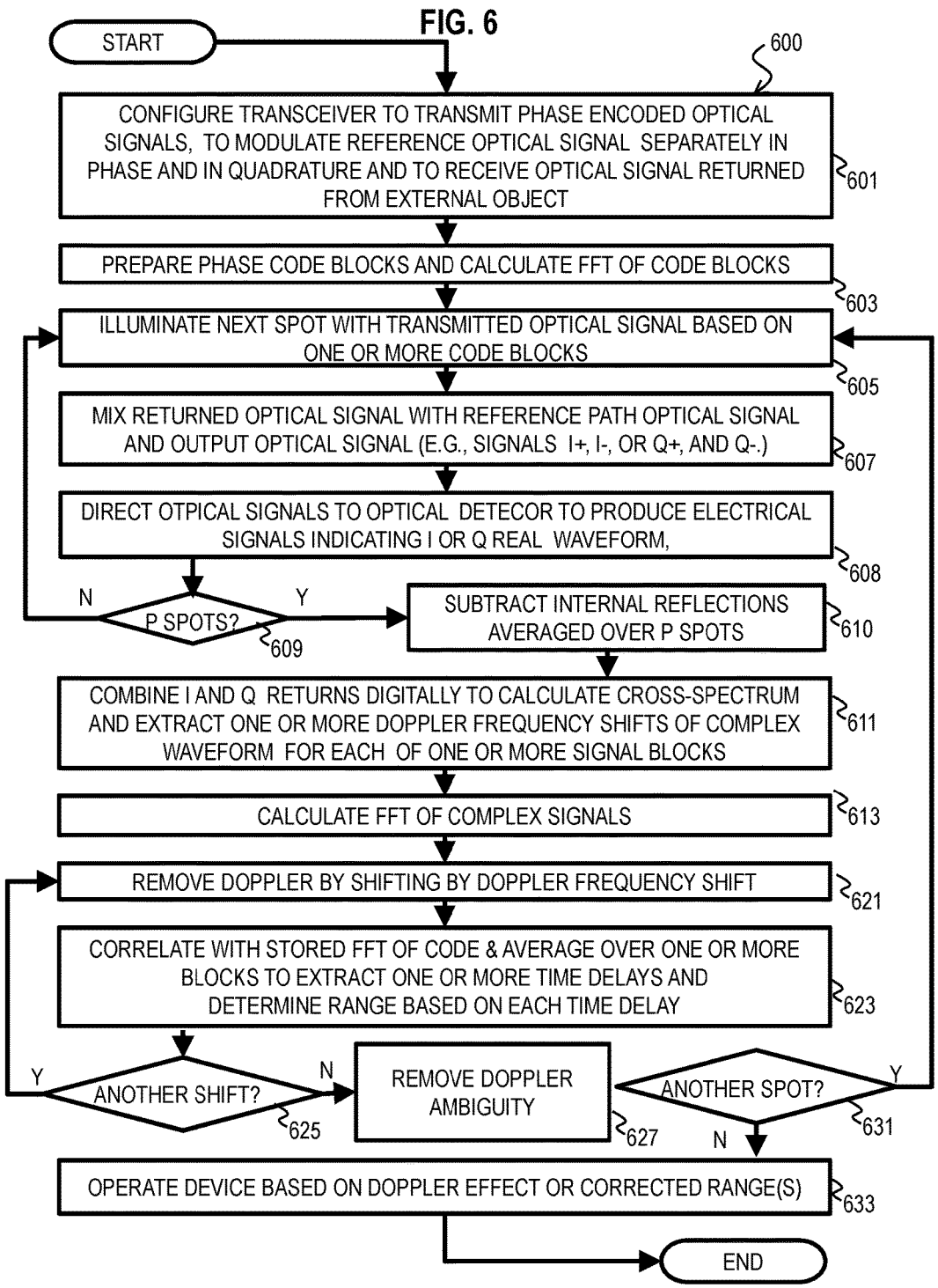

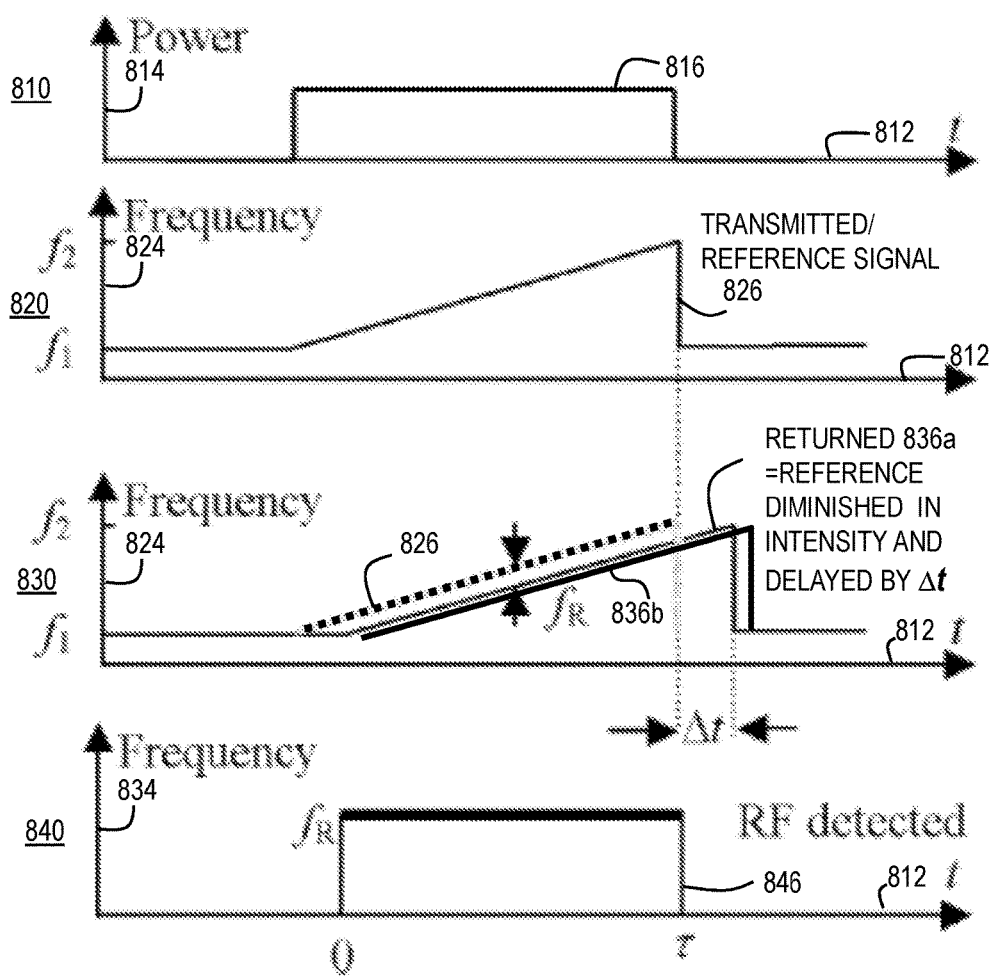

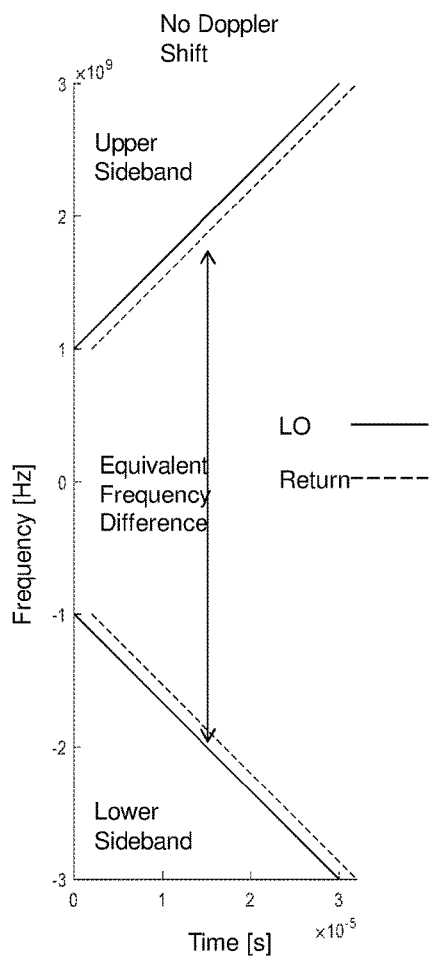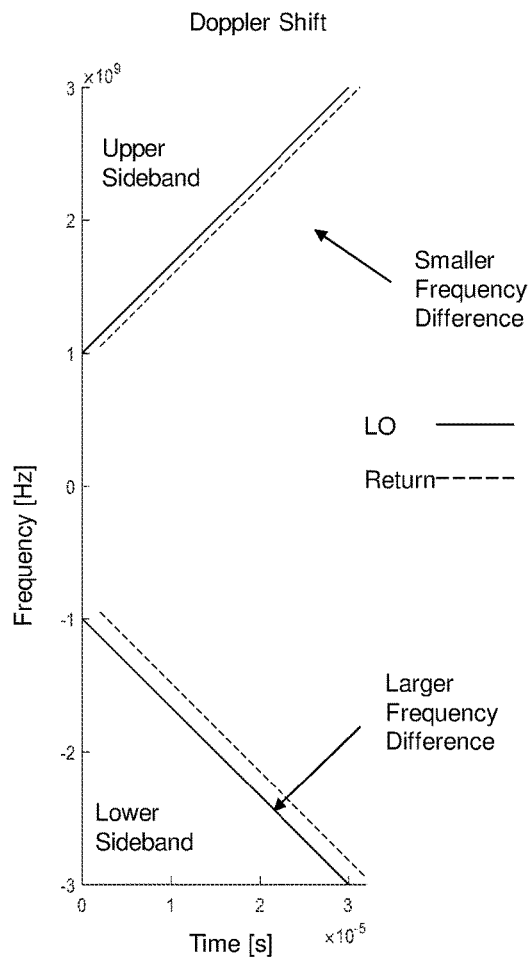

METHOD AND SYSTEM FOR TIME SEPARATED QUADRATURE DETECTION OF DOPPLER EFFECTS IN OPTICAL RANGE MEASUREMENTS

BACKGROUND

Optical detection of range using lasers, often referenced by a mnemonic, LIDAR, for light detection and ranging, also sometimes called laser RADAR, is used for a variety of applications, from altimetry, to imaging, to collision avoidance. LIDAR provides finer scale range resolution with smaller beam sizes than conventional microwave ranging systems, such as radio-wave detection and ranging (RADAR). Optical detection of range can be accomplished with several different techniques, including direct ranging based on round trip travel time of an optical pulse to an object, and chirped detection based on a frequency difference between a transmitted chirped optical signal and a returned signal scattered from an object, and phase-encoded detection based on a sequence of single frequency phase changes that are distinguishable from natural signals.

To achieve acceptable range accuracy and detection sensitivity, direct long range LIDAR systems use short pulse lasers with low pulse repetition rate and extremely high pulse peak power. The high pulse power can lead to rapid degradation of optical components. Chirped and phase-encoded LIDAR systems use long optical pulses with relatively low peak optical power. In this configuration, the range accuracy increases with the chirp bandwidth or length and bandwidth of the phase codes rather than the pulse duration, and therefore excellent range accuracy can still be obtained.

Useful optical chirp bandwidths have been achieved using wideband radio frequency (RF) electrical signals to modulate an optical carrier. Recent advances in chirped LIDAR include using the same modulated optical carrier as a reference signal that is combined with the returned signal at an optical detector to produce in the resulting electrical signal a relatively low beat frequency in the RF band that is proportional to the difference in frequencies or phases between the references and returned optical signals. This kind of beat frequency detection of frequency differences at a detector is called heterodyne detection. It has several advantages known in the art, such as the advantage of using RF components of ready and inexpensive availability. Recent work described in U.S. Pat. No. 7,742,152, the entire contents of which are hereby incorporated by reference as if fully set forth herein, except for terminology that is inconsistent with the terminology used herein, show a novel simpler arrangement of optical components that uses, as the reference optical signal, an optical signal split from the transmitted optical signal. This arrangement is called homodyne detection in that patent.

LIDAR detection with phase-encoded microwave signals modulated onto an optical carrier have been used as well. Here bandwidth B is proportional to the inverse of the duration τ of the pulse that carries each phase (B=1/τ), with any phase-encoded signal made up of a large number of such pulses. This technique relies on correlating a sequence of phases (or phase changes) of a particular frequency in a return signal with that in the transmitted signal. A time delay associated with a peak in correlation is related to range by the speed of light in the medium. Range resolution is proportional to the pulse width τ. Advantages of this technique include the need for fewer components, and the use of mass produced hardware components developed for phase-encoded microwave and optical communications.

A variety of coherent ranging techniques have been demonstrated to provide single-shot range and Doppler information for moving targets. In both coded and chirped waveform design, the Doppler effect of a moving target must be understood and compensated in some way to allow accurate range measurements. In the coded case, Doppler compensation is vital prior to cross-correlation due a "thumb-tack" ambiguity function. Without this step, no range measurement will be observed. In the chirped case, the range-Doppler ambiguity function traverses the range-Doppler space such that any ranging frequency could explain a set of linear combination of range-Doppler measurements. Techniques have been proven to overcome these challenges, although some involve expense, power and footprint costly component such as acousto-optic modulators (AOM). For large scale applications, such as autonomous driving, these costs of an AOM are prohibitive.

SUMMARY

The current inventors have recognized an alternative to previous approaches to signed Doppler detection using time-separated in-phase/quadrature (I/Q) detection for both chirped and coded detection. This approach has the advantage of hardware support in integrated photonics which is a more likely platform for large scale adoption of coherent LIDAR. Further, I/Q detection is a proven enabler to the resolution of the sign of a radial Doppler measurement (i.e., determining whether a target is approaching or receding at a given rate). Techniques are provided for detecting the Doppler effect to determine the speed and direction of an object and then compensating for the Doppler effect in range measurements. The techniques used here include determining in-phase and quadrature components of a returned signal at distinct time intervals. Such a time-separated approach enables the development of more compact and scalable systems.

In a first set of embodiments, a method includes modulating an optical signal from a laser to produce a broadband optical signal and transmitting the broadband optical signal. The method also includes receiving a returned optical signal in response to transmitting the broadband optical signal. The method also includes mixing, during a first time interval, the returned optical signal with a first reference optical signal based on an in-phase version of the broadband optical signal to produce a first mixed optical signal. Further, the method includes detecting a real part of the mixed optical signal at a first optical detector during the first time interval to produce a first electrical signal. Similarly, the method includes: mixing, during a non-overlapping second time interval, the returned optical signal with a second reference optical signal based a quadrature version of the broadband optical signal to produce a second mixed optical signal; and, detecting a real part of the second mixed optical signal at a second optical detector during the second time interval to produce a second electrical signal. Still further, the method includes producing on a processor a complex digital signal by using a digitized sample of one of the first electrical signal and the second electrical signal as a real part of the complex digital signal and a digitized sample of a different one of the first electrical signal and the second electrical signal as the imaginary part of the complex digital signal. Even further, the method includes determining on a processor a signed Doppler frequency shift of the returned optical signal based, at least in part, on a Fourier transform of the complex digital signal. In at least some embodiments, the method also includes operating a device based on the signed Doppler frequency shift.

In some embodiments of the first set, both mixing steps are performed using one 2×2 multimode interference (MMI) structure that outputs a positive optical component and a negative optical component. In some of these embodiments, both detecting steps are performed using one balanced optical detector that outputs an electrical signal that indicates a difference between the positive optical component and the negative optical component.

In some embodiments of the first set, the broadband optical signal is a phase-encoded optical signal. In other embodiments of the first set, the broadband optical signal is an up and down chirped optical signal.

In some embodiments of the first set, the first time interval and the second time interval alternate an equal number of times during a processing time interval. In other embodiments of the first set, the first time interval and the second time interval occur an equal number of times randomly during a processing time interval.

In other embodiments, a system or apparatus or computer-readable medium is configured to perform one or more steps of the above methods. In some of these embodiments, the 2×2 MMI and balanced detector are a single integrated component.

Still other aspects, features, and advantages are readily apparent from the following detailed description, simply by illustrating a number of particular embodiments and implementations, including the best mode contemplated for carrying out the invention. Other embodiments are also capable of other and different features and advantages, and their several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which:

FIG. 2 is a block diagram that illustrates example components of a high resolution LIDAR system, according to an embodiment;

FIG. 6 is a flow chart that illustrates an example method for using time-separated I/Q Doppler-corrected phase-encoded LIDAR system to determine and compensate for signed Doppler effects on ranges, according to an embodiment;

FIG. 8 is a set of graphs that illustrates an example optical chirp measurement of range, according to an embodiment;

FIG. 9F is a graph similar to FIG. 9D, using a symmetric LO signal, and shows the return signal in this frequency time plot as a dashed line when there is no Doppler shift, according to an embodiment;

FIG. 9G is a graph similar to FIG. 9F, using a symmetric LO signal, and shows the return signal in this frequency time plot as a dashed line when there is a non zero Doppler shift, according to an embodiment;

DETAILED DESCRIPTION

Figure 1A:
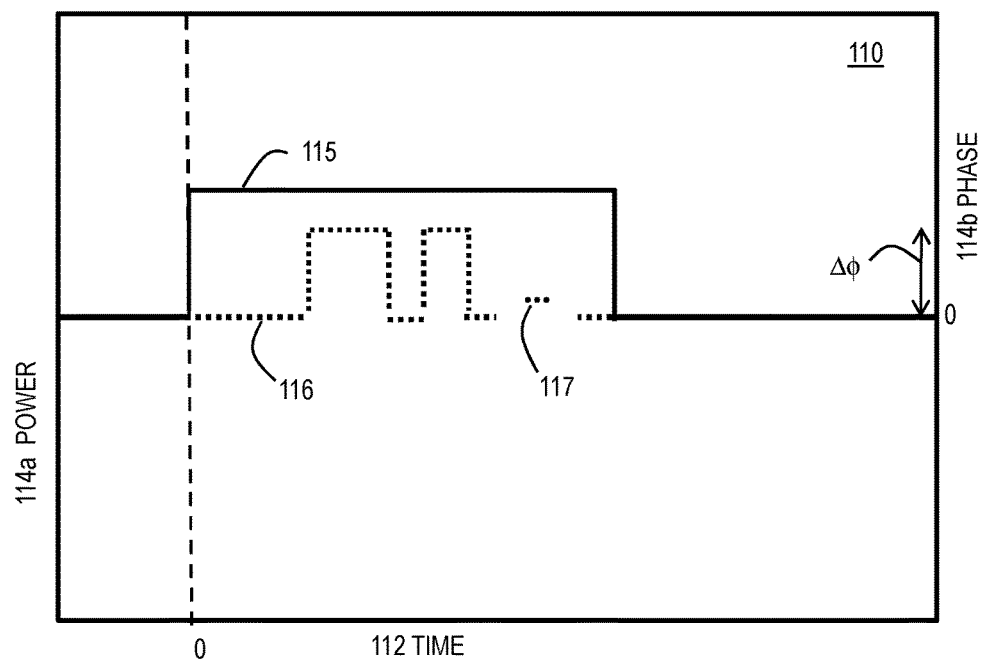
FIG. 1A is a schematic graph that illustrates an example transmitted optical phase-encoded signal for measurement of range, according to an embodiment.

A method and apparatus and system and computer-readable medium are described for signed Doppler correction of optical range detection. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5x to 2x, for example, about 100 implies a value in a range from 50 to 200. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some embodiments of the invention are described below in the context of binary, π/2 (90 degree) phase encoding at a radio frequency (RF) signal modulated onto an optical signal or in the context of an up and down chirped (RF) signal modulated onto the optical signal. However, embodiments are not limited to these contexts. For example, in some embodiments, other phase encoding is used, with different phase differences (e.g., 30, 60, or 180 degrees) or encoding with 3 or more different phases. In other embodiments, other ranging modulation formats use time separated in-phase and quadrature local oscillator (LO) signals as a reference signal. Such modulation formats include but are not limited to "on off keying", "frequency shift keying", and "noise" waveforms. Embodiments are described in the context of a single optical beam and its return on a single detector or pair of detectors, which in other embodiments can then be scanned using any known scanning means, such as linear stepping or rotating optical components or with arrays of transmitters or arrays of detectors or pairs of detectors.

1. Phase-Encoded Detection Overview

FIG. 1A is a schematic graph 110 that illustrates an example transmitted optical phase-encoded signal for measurement of range, according to an embodiment. The horizontal axis 112 indicates time in arbitrary units from a start time at zero. The left vertical axis 114a indicates power in arbitrary units during a transmitted signal; and, the right vertical axis 114b indicates phase of the transmitted signal in arbitrary units. To most simply illustrate the technology of phase-encoded LIDAR, binary phase encoding is demonstrated. Trace 115 indicates the power relative to the left axis 114a and is constant during the transmitted signal and falls to zero outside the transmitted signal. Dotted trace 116 indicates phase of the signal relative to a continuous wave signal.

As can be seen, the trace is in phase with a carrier (phase=0) for part of the transmitted signal and then changes by $\Delta\phi$ (phase=$\Delta\phi$) for short time intervals, switching back and forth between the two phase values repeatedly over the transmitted signal as indicated by the ellipsis 117. The shortest interval of constant phase is a parameter of the encoding called pulse duration τ and is typically the duration of several periods of the lowest frequency in the band. The reciprocal, 1/τ, is baud rate, where each baud indicates a symbol. The number N of such constant phase pulses during the time of the transmitted signal is the number N of symbols and represents the length of the encoding. In binary encoding, there are two phase values and the phase of the shortest interval can be considered a 0 for one value and a 1 for the other, thus the symbol is one bit, and the baud rate is also called the bit rate. In multiphase encoding, there are multiple phase values. For example, 4 phase values such as $\Delta\phi*\{0, 1, 2 \text{ and } 3\}$, which, for $\Delta\phi=\pi/2$ (90 degrees), equals $\{0, \pi/2, \pi \text{ and } 3\pi/2\}$, respectively; and, thus 4 phase values can represent 0, 1, 2, 3, respectively. In this example, each symbol is two bits and the bit rate is twice the baud rate.

Phase-shift keying (PSK) refers to a digital modulation scheme that conveys data by changing (modulating) the phase of a reference signal (the carrier wave) as illustrated in FIG. 1A. The modulation is impressed by varying the sine and cosine inputs at a precise time. At radio frequencies (RF), PSK is widely used for wireless local area networks (LANs), RF identification (RFID) and Bluetooth communication. Alternatively, instead of operating with respect to a constant reference wave, the transmission can operate with respect to itself. Changes in phase of a single transmitted waveform can be considered the symbol. In this system, the demodulator determines the changes in the phase of the received signal rather than the phase (relative to a reference wave) itself. Since this scheme depends on the difference between successive phases, it is termed differential phase-shift keying (DPSK). DPSK can be significantly simpler to implement than ordinary PSK, since there is no need for the demodulator to have a copy of the reference signal to determine the exact phase of the received signal (thus, it is a non-coherent scheme).

For optical ranging applications, the carrier frequency is an optical frequency fc and a RF $f_0$ is modulated onto the optical carrier. The number N and duration τ of symbols are selected to achieve the desired range accuracy and resolution. The pattern of symbols is selected to be distinguishable from other sources of coded signals and noise. Thus a strong correlation between the transmitted and returned signal is a strong indication of a reflected or backscattered signal. The transmitted signal is made up of one or more blocks of symbols, where each block is sufficiently long to provide strong correlation with a reflected or backscattered return even in the presence of noise. In the following discussion, it is assumed that the transmitted signal is made up of M blocks of N symbols per block, where M and N are non-negative integers.

Figure 1B:
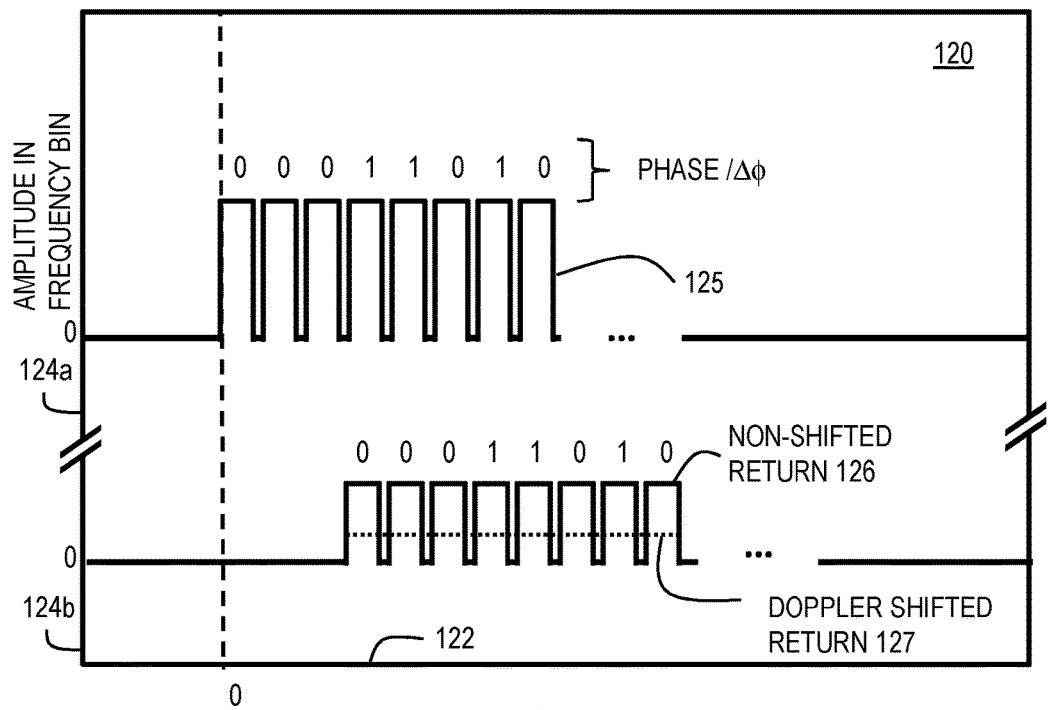
FIG. 1B is a schematic graph that illustrates the example transmitted signal of FIG. 1A as a series of binary digits along with returned optical signals for measurement of range, according to an embodiment.

FIG. 1B is a schematic graph 120 that illustrates the example transmitted signal of FIG. 1A as a series of binary digits along with returned optical signals for measurement of range, according to an embodiment. The horizontal axis 122 indicates time in arbitrary units after a start time at zero. The vertical axis 124a indicates amplitude of an optical transmitted signal at frequency fc+/$f_0$ in arbitrary units relative to zero. The vertical axis 124b indicates amplitude of an optical returned signal at frequency fc+$f_0$ in arbitrary units relative to zero, and is offset from axis 124a to separate traces. Trace 125 represents a transmitted signal of M*N binary symbols, with phase changes as shown in FIG. 1A to produce a code starting with 00011010 and continuing as indicated by ellipsis. Trace 126 represents an idealized (noiseless) return signal that is scattered from an object that is not moving (and thus the return is not Doppler shifted). The amplitude is reduced, but the code 00011010 is recognizable. Trace 127 represents an idealized (noiseless) return signal that is scattered from an object that is moving and is therefore Doppler shifted. The return is not at the proper optical frequency fc+$f_0$ and is not well detected in the expected frequency band, so the amplitude is diminished.

The observed frequency f' of the return differs from the correct frequency f=fc+$f_0$ of the return by the Doppler effect given by Equation 1.

$$f' = \frac{(c + v_o)}{(c + v_s)} f \qquad (1)$$

Where c is the speed of light in the medium, $v_o$ is the velocity of the observer and $v_s$ is the velocity of the source along the vector connecting source to receiver. Note that the two frequencies are the same if the observer and source are moving at the same speed in the same direction on the vector between the two. The difference between the two frequencies, Δf=f'−f, is the Doppler shift, $\Delta f_D$, which causes problems for the range measurement, and is given by Equation 2.

$$\Delta f_D = \left[\frac{(c + v_o)}{(c + v_s)} - 1\right] f \qquad (2)$$

Note that the magnitude of the error increases with the frequency f of the signal. Note also that for a stationary LIDAR system ($v_o$=0), for an object moving at 10 meters a second ($v_s$=10), and visible light of frequency about 500 THz, then the size of the error is on the order of 16 megahertz (MHz, 1 MHz=$10^6$ hertz, Hz, 1 Hz=1 cycle per second). In various embodiments described below, the Doppler shift error is detected and used to process the data for the calculation of range.

Figure 1C:
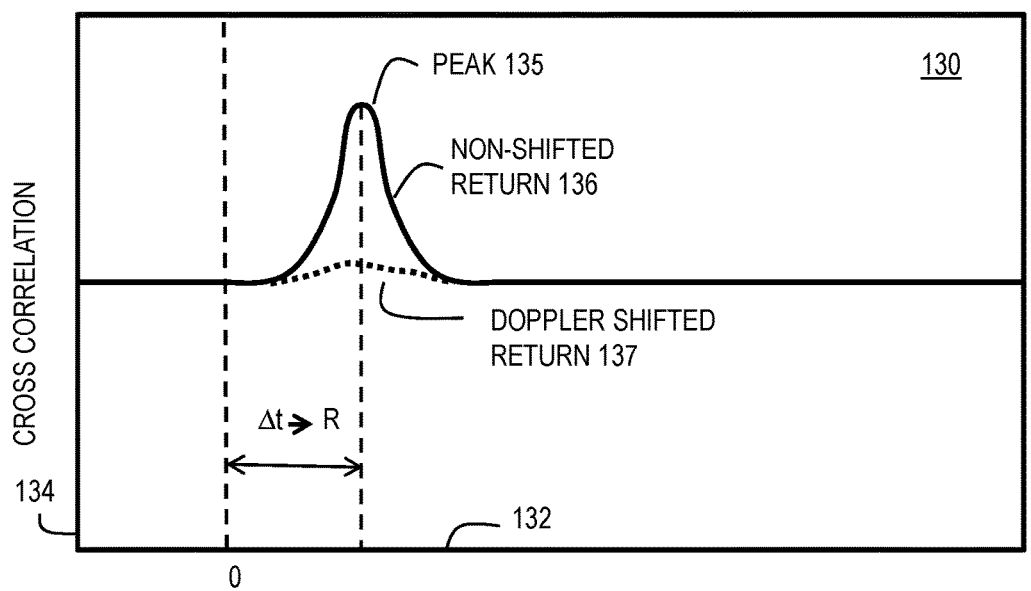
FIG. 1C is a schematic graph that illustrates example cross-correlations of a reference signal with two returned signals, according to an embodiment.

FIG. 1C is a schematic graph 130 that illustrates example cross-correlations of the transmitted signal with two returned signals, according to an embodiment. In phase coded ranging, the arrival of the phase coded reflection is detected in the return by cross correlating the transmitted signal or other reference signal with the returned signal, implemented practically by cross correlating the code for a RF signal with a electrical signal from an optical detector using heterodyne detection and thus down-mixing back to the RF band. The horizontal axis 132 indicates a lag time in arbitrary units applied to the coded signal before performing the cross correlation calculation with the returned signal. The vertical axis 134 indicates amplitude of the cross correlation computation. Cross correlation for any one lag is computed by convolving the two traces, i.e., multiplying corresponding values in the two traces and summing over all points in the trace, and then repeating for each time lag. Alternatively, the cross correlation can be accomplished by a multiplication of the Fourier transforms of each of the two traces followed by an inverse Fourier transform. Efficient hardware and software implementations for a Fast Fourier transform (FFT) are widely available for both forward and inverse Fourier transforms. More precise mathematical expression for performing the cross correlation are provided for some example embodiments, below.

Note that the cross correlation computation is typically done with analog or digital electrical signals after the amplitude and phase of the return is detected at an optical detector. To move the signal at the optical detector to a RF frequency range that can be digitized easily, the optical return signal is optically mixed with the reference signal before impinging on the detector. A copy of the phase-encoded transmitted optical signal can be used as the reference signal, but it is also possible, and often preferable, to use the continuous wave carrier frequency optical signal output by the laser as the reference signal and capture both the amplitude and phase of the electrical signal output by the detector.

Trace 136 represents cross correlation with an idealized (noiseless) return signal that is reflected from an object that is not moving (and thus the return is not Doppler shifted). A peak occurs at a time Δt after the start of the transmitted signal. This indicates that the returned signal includes a version of the transmitted phase code beginning at the time Δt. The range R to the reflecting (or backscattering) object is computed from the two way travel time delay based on the speed of light c in the medium, as given by Equation 3.

$$R = c*\Delta t/2 \qquad (3)$$

Dotted trace 137 represents cross correlation with an idealized (noiseless) return signal that is scattered from an object that is moving (and thus the return is Doppler shifted). The return signal does not include the phase encoding in the proper frequency bin, the correlation stays low for all time lags, and a peak is not as readily detected, and is often undetectable in the presence of noise. Thus Δt is not as readily determined and range R is not as readily produced.

Figure 1D:
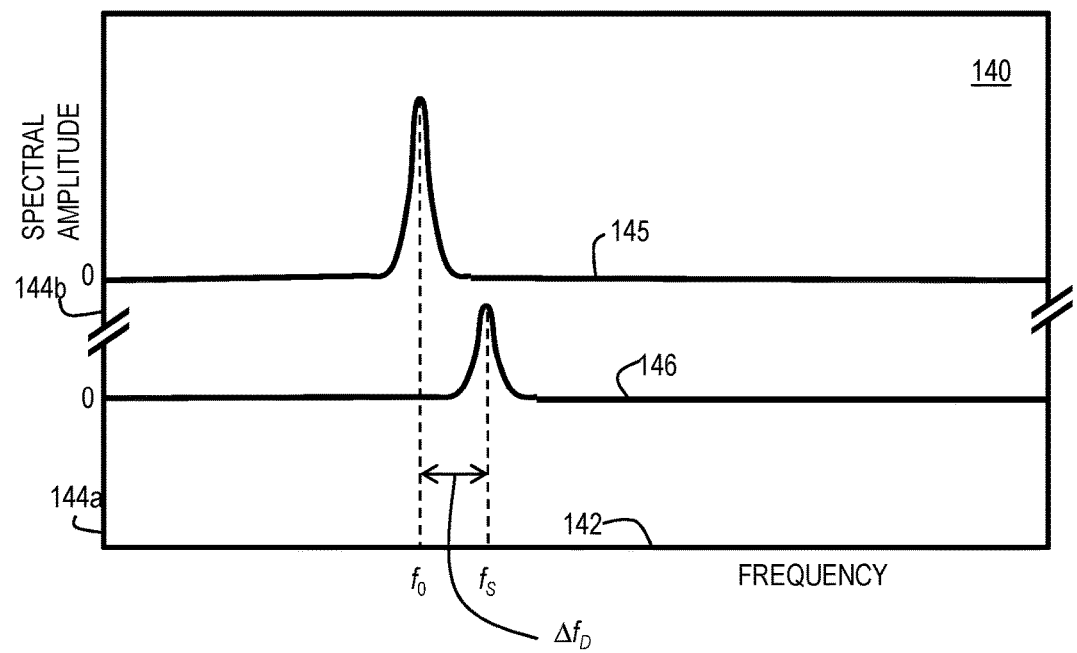
FIG. 1D is a schematic graph that illustrates an example spectrum of the reference signal and an example spectrum of a Doppler shifted return signal, according to an embodiment.

According to various embodiments described in more detail below, the Doppler shift is determined in the electrical processing of the returned signal; and the Doppler shift is used to correct the cross correlation calculation. Thus a peak is more readily found and range can be more readily determined. FIG. 1D is a schematic graph 140 that illustrates an example spectrum of the transmitted signal and an example spectrum of a Doppler shifted complex return signal, according to an embodiment. The horizontal axis 142 indicates RF frequency offset from an optical carrier fc in arbitrary units. The vertical axis 144a indicates amplitude of a particular narrow frequency bin, also called spectral density, in arbitrary units relative to zero. The vertical axis 144b indicates spectral density in arbitrary units relative to zero, and is offset from axis 144a to separate traces. Trace 145 represents a transmitted signal; and, a peak occurs at the proper RF $f_0$. Trace 146 represents an idealized (noiseless) complex return signal that is backscattered from an object that is moving toward the LIDAR system and is therefore Doppler shifted to a higher frequency (called blue shifted). The return does not have a peak at the proper RF $f_0$; but, instead, is blue shifted by $\Delta f_D$ to a shifted frequency $f_S$. In practice, a complex return representing both in-phase and quadrature (I/Q components of the return is often not measured, and the spectrum of the real valued return has peaks at both $+\Delta f_D$ and $-\Delta f_D$, thus the direction of the Doppler shift, and the direction of motion of the target, is not apparent from a single return, as described in more detail below.

Figure 1E:
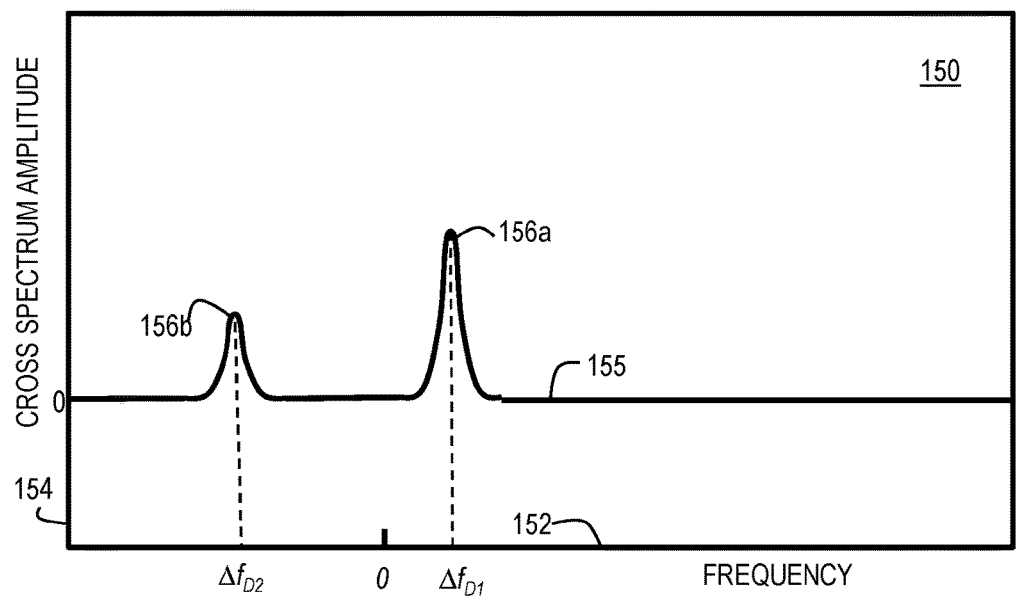
FIG. 1E is a schematic graph that illustrates an example cross-spectrum of phase components of a Doppler shifted return signal, according to an embodiment.

In some Doppler compensation embodiments, rather than finding $\Delta f_D$ by taking the spectrum of both transmitted and returned signals and searching for peaks in each, then subtracting the frequencies of corresponding peaks, as illustrated in FIG. 1D, it is more efficient to take the cross spectrum of the in-phase and quadrature component of the down-mixed returned signal in the RF band. FIG. 1E is a schematic graph 150 that illustrates an example cross-spectrum, according to an embodiment. The horizontal axis 152 indicates frequency shift in arbitrary units relative to the reference spectrum; and, the vertical axis 154 indicates amplitude of the cross spectrum in arbitrary units relative to zero. Trace 155 represents a cross spectrum with an idealized (noiseless) return signal generated by one object moving toward the LIDAR system (blue shift of $\Delta f_{D1} = \Delta f_D$ in FIG. 1D) and a second object moving away from the LIDAR system (red shift of $\Delta f_{D2}$). A peak occurs when one of the components is blue shifted $\Delta f_{D1}$; and, another peak occurs when one of the components is red shifted $\Delta f_{D2}$. Thus the Doppler shifts are determined. These shifts can be used to determine a signed velocity of approach of objects in the vicinity of the LIDAR, as can be critical for collision avoidance applications. However, if I/Q processing is not done, peaks appear at both $+/-\Delta f_{D1}$ and both $+/-\Delta f_{D2}$, so there is ambiguity on the sign of the Doppler shift and thus the direction of movement.

As described in more detail below, the Doppler shift(s) detected in the cross spectrum are used to correct the cross correlation so that the peak 135 is apparent in the Doppler compensated Doppler shifted return at lag Δt, and range R can be determined. The information needed to determine and compensate for Doppler shifts is either not collected or not used in some prior phase-encoded LIDAR systems. In addition, new techniques to split the in-phase and quadrature measurements into separate time intervals have certain advantages that are also described below in more detail.

2. Optical Detection Hardware Overview

In order to depict how an improved chirped or phase-encoded detection approach is implemented, some generic and specific hardware approaches are described. FIG. 2 is a block diagram that illustrates example components of a high resolution LIDAR system, according to an embodiment. A laser source 212 emits a carrier wave 201 that is phase or frequency modulated in modulator 282a, before or after splitter 216, to produce a phase coded or chirped optical signal 203 that has a duration D. A splitter 216 splits the modulated (or, as shown, the unmodulated) optical signal. A target beam 205, also called transmitted signal herein, with most of the energy of the beam 201 is produced. A modulated or unmodulated reference beam 207a with a much smaller amount of energy that is nonetheless enough to produce good mixing with the returned light 291 scattered from an object (not shown) is also produced. In the illustrated embodiment the reference beam 207a is separately modulated in modulator 282b. The reference beam 207a passes through reference path 220 and is directed to one or more detectors as reference beam 207b. In some embodiments, the reference path 220 introduces a known delay sufficient for reference beam 207b to arrive at the detector array 230 with the scattered light from a object outside the LIDAR. In some embodiments, the reference beam 207b is called the local oscillator (LO) signal referring to older approaches that produced the reference beam 207b locally from a separate oscillator. In various embodiments, from less to more flexible approaches, the reference is caused to arrive with the scattered or reflected field by: 1) putting a mirror in the scene to reflect a portion of the transmit beam back at the detector array so that path lengths are well matched; 2) using a fiber delay to closely match the path length and broadcast the reference beam with optics near the detector array, as suggested in FIG. 2, with or without a path length adjustment to compensate for the phase or frequency difference observed or expected for a particular range; or, 3) using a frequency shifting device (acousto-optic modulator) or time delay of a local oscillator waveform modulation (e.g., in modulator 282b) to produce a separate modulation to compensate for path length mismatch; or some combination. In some embodiments, the object is close enough and the transmitted duration long enough that the returns sufficiently overlap the reference signal without a delay.

The transmitted signal is then transmitted to illuminate an area of interest, often through some scanning optics 218. The detector array is a single paired or unpaired detector or a 1 dimensional (1D) or 2 dimensional (2D) array of paired or unpaired detectors arranged in a plane roughly perpendicular to returned beams 291 from the object. The reference beam 207b and returned beam 291 are combined in zero or more optical mixers to produce an optical signal of characteristics to be properly detected. The frequency, phase or amplitude of the interference pattern, or some combination, is recorded by acquisition system 240 for each detector at multiple times during the signal duration D. The number of temporal samples processed per signal duration affects the down-range extent. The number is often a practical consideration chosen based on number of symbols per signal, signal repetition rate and available camera frame rate. The frame rate is the sampling bandwidth, often called "digitizer frequency." The only fundamental limitations of range extent are the coherence length of the laser and the length of the chirp or unique phase code before it repeats (for unambiguous ranging). This is enabled as any digital record of the returned heterodyne signal or bits could be compared or cross correlated with any portion of transmitted bits from the prior transmission history.

The acquired data is made available to a processing system 250, such as a computer system described below with reference to FIG. 14, or a chip set described below with reference to FIG. 15. A signed Doppler compensation module 270 determines the sign and size of the Doppler shift and the corrected range based thereon along with any other corrections described herein. In some embodiments, the processing system 250 also provides scanning signals to drive the scanning optics 218, and includes a modulation signal module 272 to send one or more electrical signals that drive modulators 282a, 282b, as illustrated in FIG. 2.

Any known apparatus or system may be used to implement the laser source 212, modulators 282a, 282b, beam splitter 216, reference path 220, optical mixers 284, detector array 230, scanning optics 218, or acquisition system 240. Optical coupling to flood or focus on a target or focus past the pupil plane are not depicted. As used herein, an optical coupler is any component that affects the propagation of light within spatial coordinates to direct light from one component to another component, such as a vacuum, air, glass, crystal, mirror, lens, optical circulator, beam splitter, phase plate, polarizer, optical fiber, optical mixer, among others, alone or in some combination.

3. Phase Encoded Optical Detection

In some phase encoded embodiments, electro-optic modulators provide the modulation. The system is configured to produce a phase code of length M*N and symbol duration τ, for a total duration of D=M*N*τ, suitable for the down-range resolution desired, as described in more detail below for various embodiments. For example, in 3D imaging applications, the total number of pulses M*N is in a range from about 500 to about 4000. Because the processing is often done in the digital domain, it is advantageous to select M*N as a power of 2, e.g., in an interval from 512 to 4096. M is 1 when no averaging is done. If there are random noise contributions, then it is advantages for M to be about 10. As a result, N is in a range from 512 to 4096 for M=1 and in a range from about 50 to about 400 for M=10. For a 500 Mbps to 1 Gbps baud rate, the time duration of these codes is then between about 500 ns and 8 microseconds. It is noted that the range window can be made to extend to several kilometers under these conditions and that the Doppler resolution can also be quite high (depending on the duration of the transmitted signal). Although processes, equipment, and data structures are depicted in FIG. 2, and subsequent diagrams FIG. 3A through FIG. 3E and FIG. 4, as integral blocks in a particular arrangement for purposes of illustration, in other embodiments one or more processes or data structures, or portions thereof, are arranged in a different manner, on the same or different hosts, in one or more databases, or are omitted, or one or more different processes or data structures are included on the same or different hosts. For example splitter 216 and reference path 220 include zero or more optical couplers.

3.1 Phase-Encoded Optical Detection Signed Doppler Correction Hardware

Figure 3A:
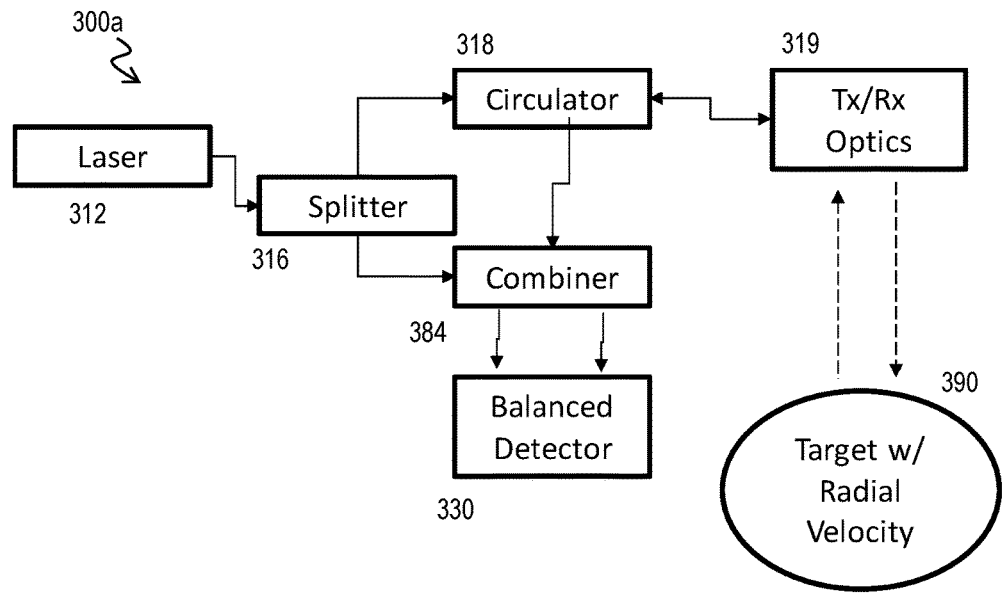
FIG. 3A is a block diagram that illustrates example components of a phase-encoded LIDAR system.

FIG. 3A is a block diagram that illustrates example components of a phase-encoded LIDAR system 300a. Although an object 390 is depicted to illustrate operation of the system 300a, the object 390 is not part of the system 300a. The system includes modulated laser source 312 (including both laser 212 and modulator 282a upstream of a beam splitter), beam splitter 316, an optical mixer 284 comprising a circulator 318 and combiner 384, scanning optics 218 including transmission/receiver optics 319, and balanced photodetector 330. The processing system 250 is not shown.

In electrical engineering, a sinusoid with phase modulation (corresponding to an angle modulation between the real and imaginary parts of the mathematical function exp(iωt)) can be decomposed into, or synthesized from, two amplitude-modulated sinusoids that are offset in phase by one-quarter cycle (π/2 radians). All three functions have the same frequency. The amplitude modulated sinusoids are known as in-phase component (I) at 0 phase and quadrature component (Q) at a phase of π/2. A laser 212 produces an optical signal at a carrier frequency fc. The modulated laser optical signal, L, is represented mathematically by Equation 4.

$$L = I_0 \exp(i\omega t) \qquad (4)$$

where $I_0$ is the intensity output by the laser, exp( ) is the exponential function such that exp(x)=$e^x$, i is the imaginary number having the properties of the square root of −1, t is time, and ω=2πfc is the angular frequency corresponding to the optical carrier frequency fc. Mathematically this expression has a real part=$I_{0R}$ cos(ωt) and an imaginary part=$I_{0I}$ sin(ωt), where $I_{0R}$ is the real part of the intensity (in-phase) and $I_{0I}$ is the imaginary part. The phase of the oscillation is given by the angle between the real and imaginary parts. Thus, L=$I_{0R}$ cos(ωt)+i $I_{0I}$ sin(ωt), and $I_0$ is the root of the sum of the squares of the real and imaginary parts, $I_0^2 = I_{0R}^2 + I_{0I}^2$. Splitter 316 directs a small portion of the intensity of the signal to use as a reference signal (called a local oscillator) LO given by Equation 5.

$$LO = A_{LO} \exp(i\omega t) = A_R \cos(\omega t) + iA_I \sin(\omega t). \qquad (5a)$$

where A is a constant that represents the intensity effect of the splitter 312. The electric field, $E_{LO}$, that generally is detected at an optical detectors that outputs an electrical signal, can thus be written as Equation 5b.

$$E_{LO} = A_{LO} e^{i\omega t} \qquad (5b)$$

When the reference signal (LO) is the unmodulated laser signal, the entire signal is in phase and the imaginary component is zero, thus $$LO = A \cos(\omega t). \qquad (5c)$$

In this embodiment, the modulation signal module 272 in the processing system 250 sends an electrical signal that indicates a digital code of symbols to be imposed as phase changes on the optical carrier, represented as B(t) where B(t) switches between 0 and π/2 as a function of t. The phase modulator 320 imposes the phase changes on the optical carrier by taking digital lines out of a field programmable gate array (FPGA), amplifying them, and driving the EO phase modulator. The transmitted optical signal, T, is then given by Equation 6.

$$T = C \exp(i[\omega t + B(t)]) \qquad (6)$$

where C is a constant that accounts for the reduction in $I_0$ by splitting of the fraction A and any amplification or further reduction imposed by the phase modulator 320 or other components of the transmitted path.

Any phase modulator may be used as modulator 282a or 282b. For example, an electro-optic modulator (EOM) is used that includes a crystal, such as lithium niobate, whose refractive index is a function of the strength of the local electric field. That means that if lithium niobate is exposed to an electric field, light will travel more slowly through it. But the phase of the light leaving the crystal is directly proportional to the length of time it takes that light to pass through it. Therefore, the phase of the laser light exiting an EOM can be controlled by changing the electric field in the crystal according to the digital code provided by the modulation signal module 272. The phase change induces a broadband frequency signal, with bandwidth B approximately equal to the baud rate, $1/\tau$.

The phase-encoded optical signal output by the phase modulated lase source 312 is transmitted through some optical couplers, such as a polarizing beam splitter (PBS) as beam splitter 316 or other circulator optics 318 and transmit optics, after which it is scattered by any object 390 in the beam carrying the transmitted signal. For example, it was found that the fiber coupled polarizing beam splitter combiners offer better isolation between the ports than the fiber based circulators as this optical component. This is important as signal that is not well isolated between transmit and receive will appear as an undesirable large peak in the range profiles. So the transmit signal is injected into port 1, is emitted out of port 2 and the back-scattered return signal is received in port 2 and exits port 3. Some targets (e.g., metal targets) maintain the polarization of the beam and some targets (e.g., diffuse targets) depolarize the returned beam. In some embodiments, a quarter wave plate is included in the transmit optics to properly compensate for targets that do not depolarize.

The returned signal is directed by the optical coupler, e.g., circulator 318, to the combiner 384 as optical mixer 284, where the return optical signal is mixed with the reference optical signal (LO) given by Equation 5. The returned signal R from the kth object intercepted by the transmitted beam is given by Equation 7a.

$$R_k = A_k \exp(i[(\omega + \omega_{Dk})(t+\Delta t_k) + B(t+\Delta t_k)]) \quad (7a)$$

where $A_k$ is a constant accounting for the loss of intensity due to propagation to and from the object 390 and scattering at the kth object 390, $\Delta t_k$ is the two way travel time between the LIDAR system and the kth object 390, and $\omega_{Dk} = 2\pi \Delta f_D$ is the angular frequency of the Doppler frequency shift (called Doppler shift herein for convenience) of the kth object. The electric field of the return signal, $E_R$, summed over all targets, is then given by Equation 7b.

$$E_R = \sum_k A_k e^{i[\omega(t+\Delta t_k) + \omega_{Dk}(t+\Delta t_k) + B(t+\Delta t_k)]} \quad (7b)$$

The coincident signals at the combiner 384 produce a mixed optical signal with a beat frequency related to a difference in frequency and phase and amplitude of the two optical signals being mixed, and an output depending on the function of the combiner 384. As used herein, down mixing refers to optical heterodyne detection, which is the implementation of heterodyne detection principle using a nonlinear optical process. In optical heterodyne detection, called "down-mixing" herein, an optical signal of interest at some optical frequency is non-linearly mixed with a reference "local oscillator" (LO) that is set at a close-by frequency. The desired outcome is a difference frequency, which carries the information (amplitude, phase, and frequency modulation differences) of the original optical frequency signal, but is oscillating at a lower more easily processed frequency, called a beat frequency herein, conveniently in the RF band. In some embodiments, this beat frequency is in an RF band that can be output from the optical detector 330 as an electrical signal, such as an electrical analog signal that can be easily digitized by RF analog to digital converters (ADCs). The digital electrical signal 332 is input to the processing system 250 and used, along with the digital code from module 272, by the Doppler compensation module 270 to determine cross correlation and range, and, in some embodiments, the signed Doppler shift and resulting speed and direction of the object 390.

In some embodiments, the raw signals are processed to find the Doppler peak and that frequency, $\omega_D$, is used to correct the correlation computation and determine the correct range. However, in such embodiments, the lack of I/Q detection will lead to a real valued time domain signal at the Doppler shift frequency at both positive and negative Doppler shifts. Analysis of this signal will not reveal the sign of the Doppler shift.

Figure 3B:
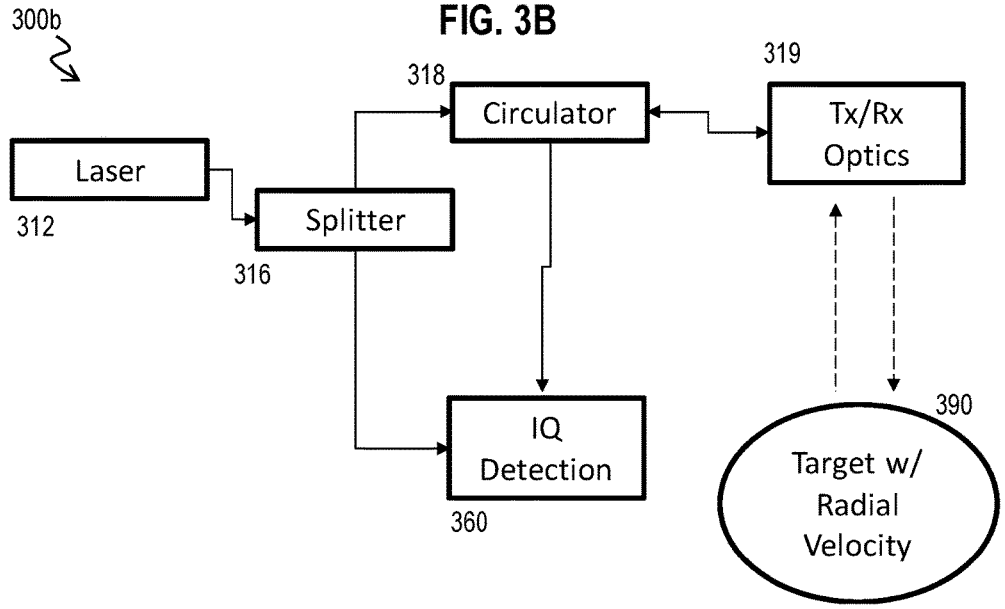
FIG. 3B is a block diagram that illustrates example components of a Doppler compensated phase-encoded LIDAR system using in-phase/quadrature (I/Q) processing.

In other embodiments, described in U.S. patent application Ser. No. 15/423,978 by Crouch et al., entitled "Method and system for Doppler detection and Doppler correction of optical phase-encoded range detection", incorporated by reference as if fully set forth herein, it was discovered to be advantageous if the optical mixer and processing are configured to determine the in-phase (I) and quadrature (Q) components. FIG. 3B is a block diagram that illustrates example components of a Doppler compensated phase-encoded LIDAR system 300b using in-phase/quadrature (I/Q) processing, according to an embodiment. IQ detection by one or more components 360 can be utilized to resolve the sign of the Doppler shift.

In these embodiments, the I/Q separation was used to first estimate signed $\omega_D$ and then the signed $\omega_D$ was used to correct the cross correlation computation to derive $\Delta t$. The signed value of $\omega_D$ is also used to present the speed and direction of the object, at least on the vector connecting the object to the LIDAR system 300b. The value of $\Delta t$ is then used to determine and present the range to the object using Equation 3 described above. The separation of the I and Q signals by the optical mixers enables clearly determining the sign of the Doppler shift.

An example hardware embodiment was designed in the above cited application to support the coherent detection of in-phase and quadrature (I/Q) signals of a phase coded transmitted signal, according to one embodiment. The advantage of this approach is a very cheap but high bandwidth waveform production requirement (binary digital or poly-phase digital codes) and minimal modulation requirements (single electro-optic phase modulator). A 90 degree optical hybrid optical mixer allows for I/Q detection of the optically down-mixed signals on two channels which are then digitized. This system allows for an extremely flexible "software defined" measurement architecture to occur.

Figure 3C:
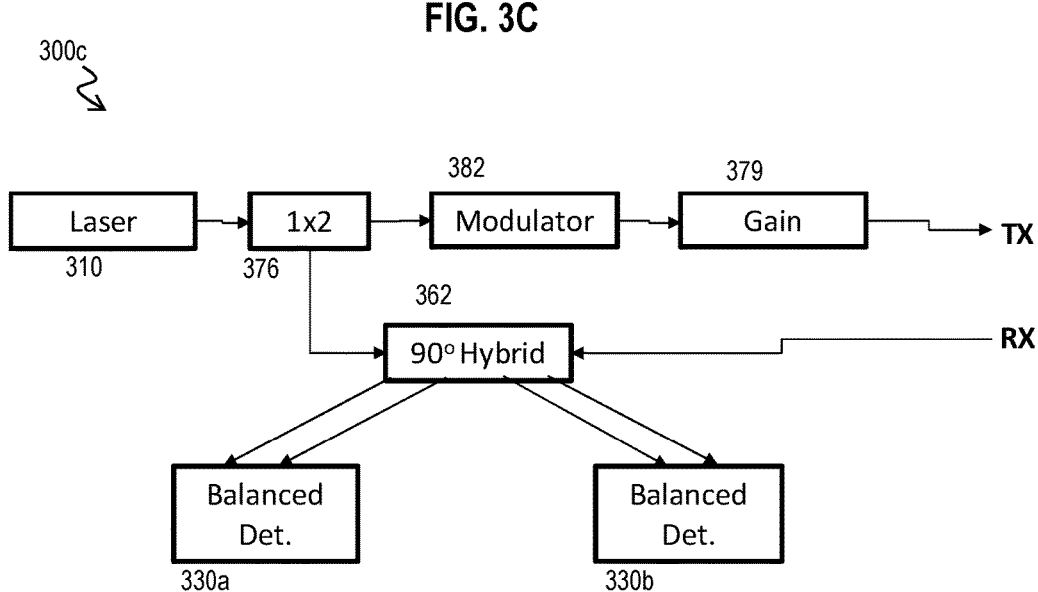
FIG. 3C is a block diagram that illustrates example components of a Doppler compensated phase-encoded LIDAR system using hybrid I/Q components.

FIG. 3C is a block diagram that illustrates example components of a Doppler compensated phase-encoded LIDAR system 300c using hybrid I/Q components. This embodiment uses binary phase encoding with the two phases separated by $\pi/2$ but with optical separation of in-phase and quadrature components rather than electrical separation. The system includes continuous wave laser source 310, beam splitter 376, phase modulator 382, optical amplifier 379 to increase gain and transmission/receiver optics (not shown), a 90 degree hybrid mixer 362 in place of the generic optical combiner 384 of FIG. 3A, and two balanced photodetectors 330a, 330b in place of the single balanced photodetector 330 of FIG. 3A. The processing system 250, including a digital code module 272 and a Doppler compensation module 270 as shown in FIG. 2, is not shown in FIG. 3C to avoid clutter. The laser 310 produces an optical signal at an optical carrier frequency fc. Splitter 376, such a 1×2 multimode interference (MMI) structure directs a small portion of the power of the signal to use as a reference signal (called a local oscillator) LO. The digital code module 272 in the processing system 250 sends an electrical signal that indicates a digital code of symbols to be imposed as phase changes on the optical carrier. The phase modulator 382 imposes the phase changes on the optical carrier, as described above.

The phase-encoded optical signal output by the phase modulator 332, after any optional amplification by 379, is transmitted through some optical couplers (not shown), after which it is scattered by any object intercepted by the beam carrying the transmitted signal. The returned signal is directed by the receiving optics (not shown), to the 90 degree Hybrid optical mixer 362 where the return optical signal 324 is mixed with the reference optical signal (LO) given by Equation 5b. The returned signal R is given by Equation 7a. The Hybrid mixer outputs four optical signals, termed I+, I−, Q+, and Q−, respectively, combining LO with an in-phase component of the return signal R, designated $R_I$, and quadrature component of the return signal R, designated $R_Q$, as defined in Equation 8a through 8d.

$$I+ = LO + R_I \quad (8a)$$

$$I- = LO - R_I \quad (8b)$$

$$Q+ = LO + R_Q \quad (8c)$$

$$Q- = LO - R_Q \quad (8d)$$

where $R_I$ is the in phase coherent cross term of the AC component of the return signal R and $R_Q$ is the 90 degree out of phase coherent cross term of the AC component of the return signal R. For example, the electrical field of the above relations can be expressed based on Equations 5b and Equation 7b above and Equation 8e through Equation 8g below to produce Equations 8h through Equation 8k.

$$LO = |E_{LO}|^2 \quad (8e)$$

$$R_I = |E_R|^2 + \text{Real}(E_R E_{LO}^*) \quad (8f)$$

$$R_Q = |E_R|^2 + \text{Imag}(E_R E_{LO}^*) \quad (8g)$$

where * indicate a complex conjugate of a complex number, Imag( ) is a function that returns the imaginary part of a complex number, and Real( ) is a function that returns the real part of a complex number. The AC term $E_R E_{LO}^*$ cancels all of the optical frequency portion of the signal, leaving only the RF "beating" of LO with the RF portion of the return signal—in this case the Doppler shift and code function. The terms $|E_{LO}|^2$ and $|E_R|^2$ are constant (direct current, DC) terms. The latter is negligible relative to the former; so the latter term is neglected in the combinations expressed in Equations 8h through Equation 8k, as particular forms of Equation 8a through Equation 8d.

$$I+ = |E_{LO}|^2 + \text{Real}(E_R E_{LO}^*) \quad (8h)$$

$$I- = |E_{LO}|^2 - \text{Real}(E_R E_{LO}^*) \quad (8i)$$

$$Q+ = |E_{LO}|^2 + \text{Imag}(E_R E_{LO}^*) \quad (8j)$$

$$Q- = |E_{LO}|^2 + \text{Imag}(E_R E_{LO}^*) \quad (8k)$$

The two in-phase components I+ and I− are combined at a balanced detector pair 330a to produce the RF electrical signal I on channel 1 (Ch1) and the two quadrature components Q+ and Q− are combined at a second balanced detector pair 330b to produce the RF electrical signal Q on channel 2 (Ch2), according to Equations 9a and 9b.

$$I = I+ - I- \quad (9a)$$

$$Q = Q+ - Q- \quad (9b)$$

The use of a balanced detector (with a balanced pair of optical detectors) provides an advantage of cancellation of common mode noise (while doubling the effect of the amplitudes $R_I$ or $R_Q$ given the definition of the I+, I−, Q+ and Q− components), which provides reliable measurements with high signal to noise ratio (SNR). In some embodiments, such common mode noise is negligible or otherwise not of concern; so, a simple optical detector or unbalanced pair is used instead of a balanced pair. The Doppler compensation module 270 then uses the signals I and Q to determine one or more signed Doppler shifts $\omega_D$, with corresponding speeds, and then uses the value of $\omega D$ and the values of B(t) from the digital code module 272 and the signals I and Q to produce a corrected correlation trace in which peaks indicate one or more Δt at each of the one or more velocities (speed and direction) along the vector connecting the target and LIDAR system 330c. When multiple speeds are detected, each is associated with a peak in the corresponding multiple correlation traces. In some embodiments, this is done by coincidence processing, to determine which current speed/location pairing is most probably related to previous pairings of similar speed/location. The one or more Δt are then used to determine one or more ranges using Equation 3, described above.

As described in the cited patent application, it is advantageous to prepare a frequency domain representation of the code used for correlation at the start and re-used for each measuring point in the scan; so, this is done in some embodiments. A long code, of duration D=(M*N)*τ, is encoded onto the transmitted light, and a return signal of the same length in time is collected by the data acquisition electronics. Both the code and signal are broken into M shorter blocks of length N so that the correlation can be conducted several times on the same data stream and the results averaged to improve signal to noise ratio (SNR). Each block of N symbols is distinctive from a different block of N symbols and therefore each block is an independent measurement. Thus, averaging reduces the noise in the return signal. The input I/Q signals are separated in phase by π/2. In some embodiments, further averaging is done over several illuminated spots in order to remove the effect of reflections from purely internal optics, as described in more detail below.

Figure 3D:
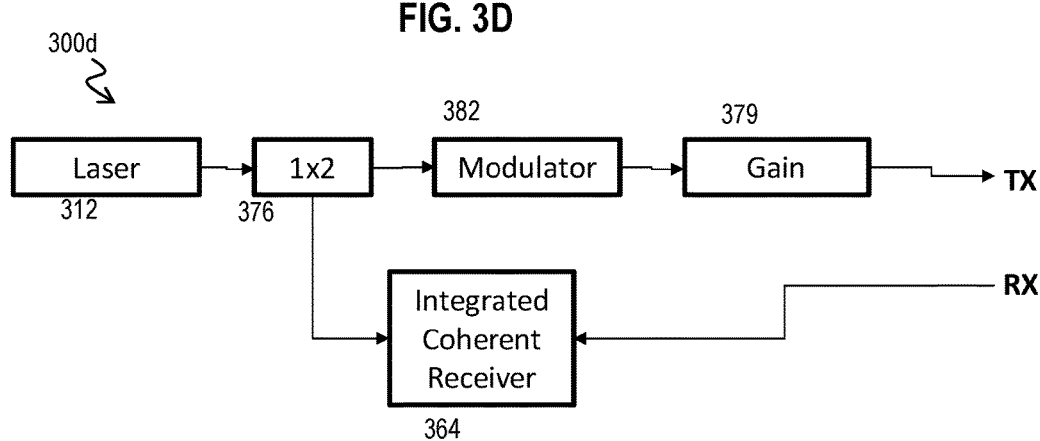
FIG. 3D is a block diagram that illustrates example components of a Doppler compensated phase-encoded LIDAR system using compact integrated components.

A modern integrated coherent receiver integrates the optical mixing and detection functionality into a single optical package, as shown in FIG. 3D. See for example, OIF (2015). FIG. 3D is a block diagram that illustrates example components of a Doppler compensated phase-encoded LIDAR system 300d using compact integrated components. The system 300d includes continuous wave laser source 310, beam splitter 376, such as a 1×2 MMI, phase modulator 382, optical amplifier 379 to increase gain and transmission/receiver optics (not shown), and an integrated coherent receiver 364 in place of the 90 degree hybrid mixer 362 and two balanced photodetectors 330a, 330b of FIG. 3C.

Figure 3E:
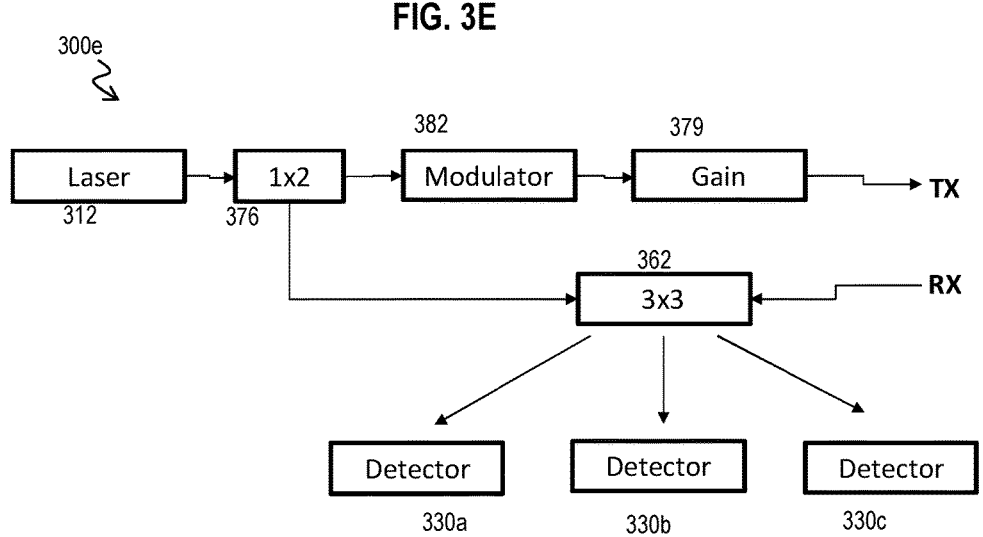
FIG. 3E is a block diagram that illustrates example components of a Doppler compensated phase-encoded LIDAR system using multimode interference (MMI) components.

Other schemes include the use of 3×3 s multimode interference (MMI) structures. These devices are more compact than free-space 90-degree hybrids. They produce a 120 degree phase shift at each output port. Each port is then independently detected and digitized prior to software based reconstruction of the complex signal. The 3×3 scheme is shown in FIG. 3E. FIG. 3E is a block diagram that illustrates example components of a Doppler compensated phase-encoded LIDAR system 300e using multimode interference (MMI) components. The system 300e includes continuous wave laser source 310, beam splitter 376, such as a 1×2 MMI, phase modulator 382, optical amplifier 379 to increase gain and transmission/receiver optics (not shown), and 3×3 MMI structure in place of the 90 degree hybrid mixer 362 and three photodetectors 331a, 331b, 331c instead of the two balanced detectors 330a, 33b shown in FIG. 3C.

In each of the above systems 300b, 300c, 300d, 300e, the approach requires at least two detectors and two analog to digital converters (ADCs) to support a measurement. This presents a challenge to scaling where optical hybrids, detectors, electrical routing, and digitizers all take space in heavily integrated designs.

It is recognized here that an advantage is obtained if the in-phase (I) and quadrature (Q) components are detected at separate times. A time separated I/Q detection technique (also called a time domain multiplexing scheme, herein) has been devised to measure IQ with a single ADC channel. This solves the problem of scaling where all included components required in the traditional approach take up valuable space in heavily integrated designs. This technique works well provided the time separation of the measurements from the single ADC channel combined digitally (called the processing time interval herein) is small compared to time for a moving object or scanning beam to move a significant amount. In some embodiments, a significant amount is about an angular width of the transmitted beam. In many applications, the sequential I and Q mixing occurs within about one nanosecond, thus hundreds or thousands of sequential paired I/Q measurements occur in a few microseconds. For a beam width with 0.01 degree divergence steering at several thousand degrees per second, the measurement time of a few microseconds corresponds to about 0.005 degrees, which is half a beam width of angular translation. This embodiment involves a second modulator and software controlled modulation signals.

Figure 4:
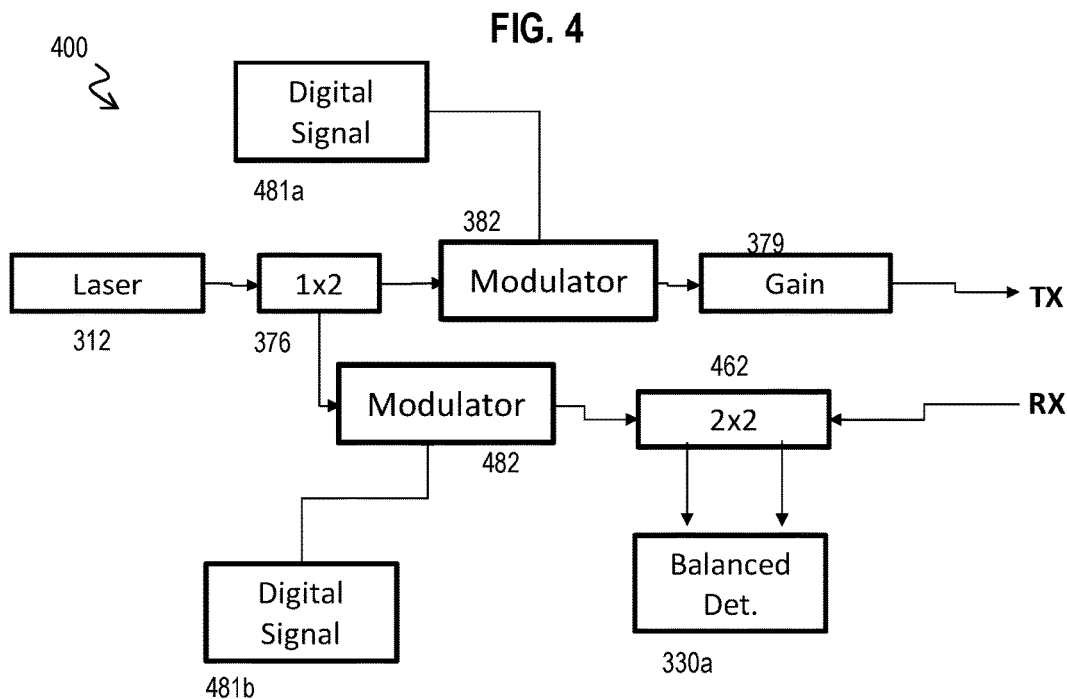
FIG. 4 is a block diagram that illustrates example components of a high resolution signed Doppler compensated phase-encoded LIDAR system using time separated I/Q with a compact MMI component, according to an embodiment.

A particular embodiment that also uses compact integrated optics is depicted in FIG. 4. FIG. 4 is a block diagram that illustrates example components of a high resolution signed Doppler compensated phase-encoded LIDAR system 400 using time separated I/Q with a compact MMI component, according to an embodiment. The system 400 includes continuous wave laser source 310, beam splitter 376, such as a 1×2 MMI structure, phase modulator 382 to encode digital signal 481a onto the optical signal, optical amplifier 379 to increase gain and transmission/receiver optics (not shown), as in FIG. 3E. However, in contrast to the structures of system 300e, system 400 includes a second phase modulator 482 to separately encode the LO reference signal based on digital signal 481b, and, instead of the 3×3 MMI structure and three detectors 331a, 331b, 331c, a smaller footprint 2×2 MMI structure with one balanced detector 330a. In some embodiments, both digital signals 481a, 481b are generated by modulation signal module 272 in processing system 250 depicted in FIG. 2.

In some embodiments, the digital signal to impose on the optical carrier, produced in each of 481a and 481b, includes the desired RF code signal imposed on a non-zero RF carrier signal. This results in an offset of the pulses further from the optical carrier. The offset is in both the transmitted optical signal and LO optical signal. When the resulting LO and received optical signals are mixed at mixer 462, the result will mix back down to baseband for digitization, and subsequent processing is the same. This step offers an advantage in terms of avoiding low-frequency noise.

By introducing the second phase modulator 482, in various embodiments, the reference signal can be made to be in-phase with the transmitted signal during one time interval to measure at the detector 330a an electrical signal related to the real part of the returned optical signal, and the reference signal can be made to be in quadrature with the transmitted signal during a different, non-overlapping time interval to measure at the detector 330b an electrical signal related to the complex part of the returned optical signal. A complex signal can then be generated digitally in Doppler compensation module 270 from the two measured electrical signals; and, the digitally constructed complex signal can be used to determine the properly signed Doppler shift. A balanced optical detector is advantageous in various embodiments, including the embodiment depicted in FIG. 4, to provide a means for cancellation of common mode noise in each optical signal, as described above. A 2×2 MMI structure is advantageous in various embodiments, including the embodiment depicted in FIG. 4, to decrease the power and size footprint of the system 400. The 2×2 MMI structure outputs the positive and negative components (phase 0 and π radians, i.e., angles 0 and 180 degrees) of the two mixed optical signals, e.g., given by Equations 8h and 8i for one time interval, or given by Equations 8j and 8k for the other time interval.

3.2 Phase-Encoded Optical Detection Signed Doppler Correction Method

The presented approach takes advantage of the phase difference to compute a cross-spectrum using the I/Q signals (either in the electrical or optical signals), which provides a clear peak at the properly signed Doppler frequency. The approach also takes advantage of the phase difference of the I/Q signals to construct a complex signal for the correlation to determine range. Doppler compensation is accomplished by first taking the FFT of the complex return signals, then shifting the values of the FFT within the array of frequency bins. The corrected signals can be recovered by applying an inverse-FFT to the shifted FFT, but this is not necessary since the shifted FFT is used directly in the correlation with the code FFT in some embodiments. In other embodiments, the complex return signals are multiplied by a complex exponential formed from the Doppler frequency measured in the cross spectrum, and an FFT of the corrected signals is used for correlation with the code. In some embodiments, the correlation is determined using a finite impulse response (FIR) filter. After a correlation (also called a range profile, herein) is calculated for each code/signal block, the results are averaged over the M blocks, and the range to the target is calculated from the time delay of the peak in the averaged range profile. If there is more than one peak in the range profile, then the approach will record the range to multiple targets.

Figure 5A:
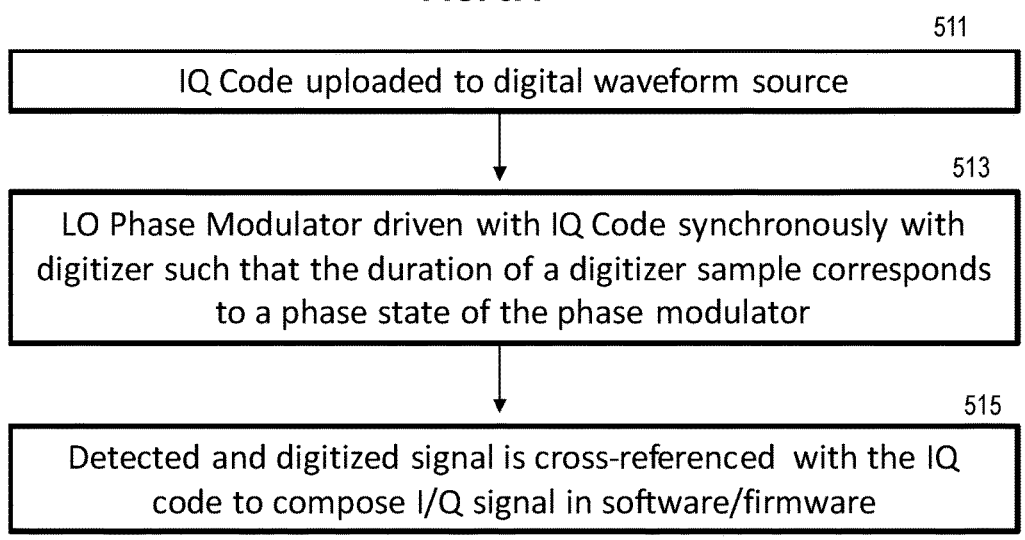
FIG. 5A, is a flow diagram that illustrates example steps for using a signed Doppler compensated phase-encoded LIDAR system with time-separated I/Q processing, according to an embodiment.

From a signal processing perspective, the IQ signal is composed by considering time separated in-phase and in-quadrature states as real and imaginary parts of a single time domain sample over the processing time interval. The time separated signals are used to drive the phase modulator 482 on the LO path to synthesize the I and Q states in the optical reference signal at different times within the processing time interval. FIG. 5A, is a flow diagram that illustrates example steps for using a signed Doppler compensated phase-encoded LIDAR system with time-separated I/Q processing, according to an embodiment. Although steps are depicted in FIG. 5A, and subsequent flow diagrams, as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways. In step 511, the I and Q phase codes are uploaded to the digital waveform source, e.g., modulation signal module 272. In step 513 the LO phase modulator 482 is driven with the I or Q code, each one simultaneously with the digitizer, e.g., a single ADC in acquisition system 240 processing output from the detector 330a, such that the duration of the digitized sample corresponds to the individual I or Q phase state of the phase modulator 482. In step 516, the digitized detected signals are cross-referenced with the corresponding I or Q code to compose (in software or firmware) the complex digital signal R=I+iQ, e.g., as represented by Equation 7b.

Figure 5B:
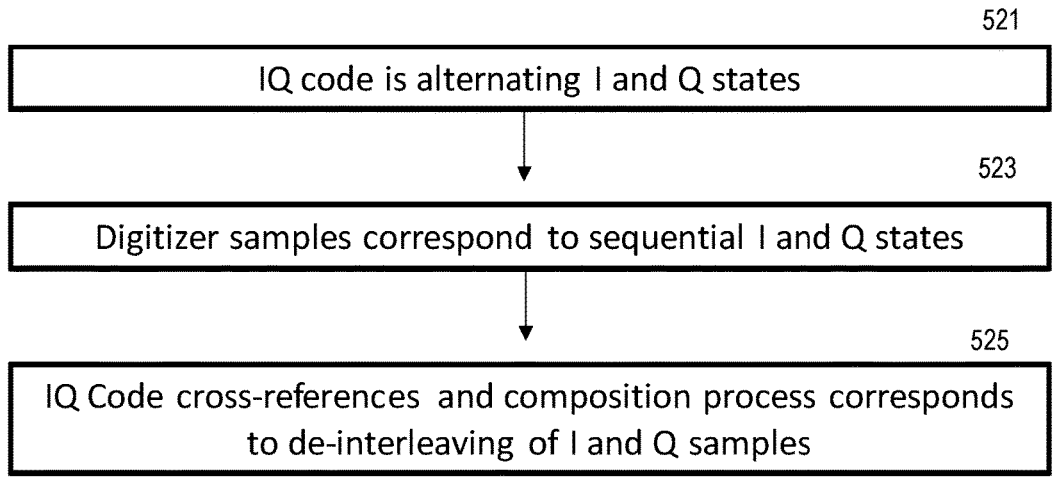
FIG. 5B, is a flow diagram that illustrates example steps for using a signed Doppler compensated phase-encoded LIDAR system with alternating time-separated I/Q processing, according to an embodiment.

FIG. 5B, is a flow diagram that illustrates example steps for using a signed Doppler compensated phase-encoded LIDAR system with alternating time-separated I/Q processing, according to an embodiment. In step 521, the IQ code for the LO modulator 482 alternates between I and Q one or more times for each processing time interval. In step 523 the digitizer samples correspond to an I state followed by a Q state. In Step 525, the IQ code cross reference composition process corresponds to de-interleaving the I and Q digitizer samples and constructs the complex digital signal from a combination (e.g., an average) of the de-interleaved I samples and similar combination of the de-interleaved Q samples.

Figure 5C:
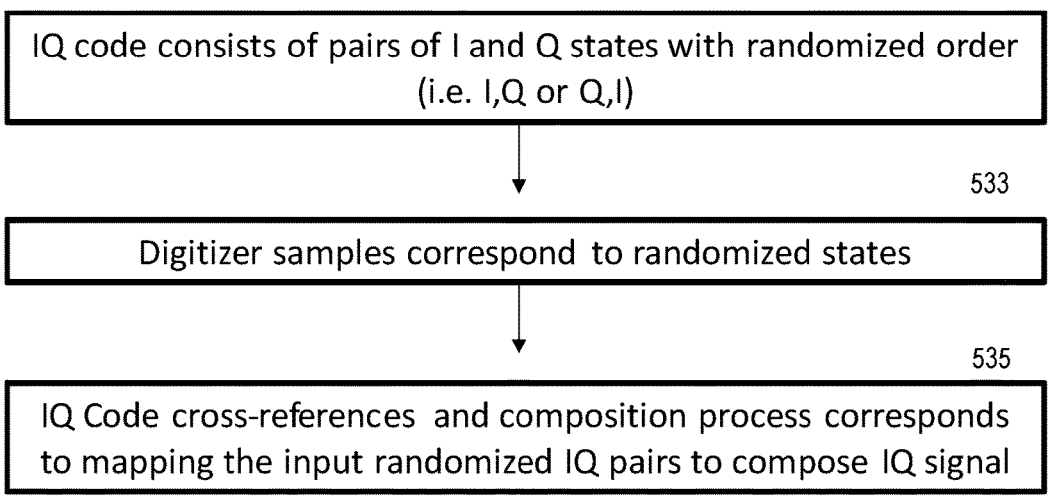
FIG. 5C, is a flow diagram that illustrates example steps for using a signed Doppler compensated phase-encoded LIDAR system with random time-separated I/Q processing, according to an embodiment.

FIG. 5C, is a flow diagram that illustrates example steps for using a signed Doppler compensated phase-encoded LIDAR system with random time-separated I/Q processing, according to an embodiment. An advantage of randomly timed I and Q LO signals is that the LO phase modulator is not changing phase states for every ADC sample. Relative to the constantly alternating case, the random state pattern reduces the number of phase transitions (between the I and Q state). Therefore, any temporal misalignment between the phase state and the ADC sample affects a fewer number of samples and will provide better IQ contrast. In step 531, the IQ code for the LO modulator 482 produces an equal number of I and Q states one or more times for each processing time interval, such as I, Q followed by Q,I in each of two processing time intervals or I,I,Q,Q followed by Q,I,I,Q followed by Q,Q,I,I in each of three processing time intervals. In step 533, digitized samples are formed that correspond to each of the randomized states I or Q. In Step 535, the IQ code cross reference composition process corresponds to mapping the input I and Q states to the corresponding digitizer samples and constructs the complex digital signal from a combination (e.g., an average) of the mapped I samples and a similar combination of the mapped Q samples.

FIG. 6 is a flow chart that illustrates an example method 600 for using time separated signed Doppler-corrected phase-encoded LIDAR system to determine and compensate for Doppler effects on ranges, according to an embodiment. This example method incorporates time separated I/Q measurements with other processing features of the methods described in the above cited patent application. In some embodiment, steps 603 and 610 through 633 are performed by processing system 250. For example, determining the FFT of the digital code in step 603 and all of steps 610 through 633 are performed by Doppler compensation module 270 in FIG. 2.

In step 601, a transceiver, e.g., a LIDAR system, is configured to transmit phase-encoded optical signals based on input of a phase code sequence. A portion (e.g., 1% to 10%) of the unmodulated input optical signal from the laser, or the phase-encoded transmitted signal, is also directed to a reference optical path. The LIDAR system is also configured to modulate the reference optical signal separately in phase and in quadrature, e.g., by storing those codes separately in the modulation signal module 272 and including the second modulator 282b as a phase modulator 482 in the reference path but not the transmitted path. The transceiver is also configured to receive a backscattered optical signal from any external object illuminated by the transmitted signals. In some embodiments, step 601 includes configuring other optical components in hardware to provide the functions of one or more of the following steps as well, as illustrated for example in FIG. 4, or equivalents. Note that the transmitted signal need not be a beam. A diverging signal will certainly see a lot of different ranges and Doppler values within a single range profile; but, provide no cross range resolution within an illuminated spot. However, it is advantageous to use a narrow beam which provides inherent sparsity that comes with point by point scanning to provide the cross range resolution useful to identify an object.

In step 603 a code made up of a sequence of M*N symbols is generated for use in ranging, representing M blocks of N symbols, with no duplicates among the M blocks. In some embodiments, the Fourier transform of an RF signal with such phase encoding is also determined during step 603 because the transform can be used repeatedly in step 623 as described below and it is advantageous to not have to compute the Fourier transform separately for each transmission. For example, a complex (real and imaginary components) digital signal is generated with angular RF frequency ω and phase π/2 according to the code, and a complex digital Fast Fourier Transform (FFT) is computed for this complex digital signal. The resulting complex FFT function is prepared for the operation in step 623 by taking the complex conjugate of the complex signal. For example the complex conjugate of the complex FFT, $Code_{FFT}$, is represented by Equation 10a for each of M blocks of the code.

$$Code_{FFT} = conj(FFT(exp(iBt))) \quad (10a)$$

where conj( ) represents the complex conjugate operation, which is given by conj(x+iy)=x−iy. This complex FFT is stored, for example on a computer-readable medium, for subsequent use during step 623, as described below.

In step 605 a first portion of the laser output, represented by Equation 4, is phase-encoded using code received from digital code module 272 to produce a transmitted phase-encoded signal, as represented by Equation 6, and directed to a spot in a scene where there might be, or might not be, an object or a part of an object. In addition, in step 605 a second portion of the laser output is directed as a reference signal, as represented by Equation 5a or Equation 5b, also called a local oscillator (LO) signal, along a reference path. According to various embodiments, the LO signal is modulated by one of two different versions of the code modulated onto the transmitted signal, either the in-phase component or quadrature component. The in-phase component is given by Equation 10b based on Equation 6, given above.

$$LO = C_{LO} \exp(i[\omega t + B(t)]) \tag{10b}$$

Where $C_{LO}$ differs from C in Equation 6 to reflect the much lower amplitude of the LO signal than the transmitted signal. The quadrature component is given by Equation (10c)

$$LO = C_{LO} \exp(i[\omega t + B(t) + \pi/2]) \tag{10c}$$

In embodiments using binary phase codes, the pattern on the LO is not necessarily a replica of the binary phase code, B(t). In some embodiments, the pattern on the LO is just a known alternating sequence of phase states, given by equation 10d.

$$LO = C_{LO} \exp(i[\omega t]) \text{ for half of pulses}$$

$$= C_{LO} \exp(i[\omega t + \pi/2]) \text{ for other half of pulses} \tag{10d}$$

In step 607, the backscattered returned signal, R, with any travel time delay Δt and Doppler shift $\omega_D$, as represented by Equation 7, is mixed with only one of the two reference signals (LO), as represented by Equation 10b or Equation 10c, depending on the time interval, to output one or more mixed optical signals. The mixed signal in any particular time interval informs on either the in-phase or quadrature component, but not both. For example, in the embodiment illustrated in FIG. 4, the mixed optical signals output by 2×2 MMI structure 462 include two optical signals that inform on in-phase components, namely I+, I−, as defined in Equations 8a through 8b, during one time interval within the processing time interval; and in a different, non-overlapping time interval within the same processing time interval informs on the quadrature components, namely Q+, Q− as defined in Equations 8c through 8d. This is because the output of a 2×2 MMI structure are two outputs separated by π (180 degrees), i.e., the positive and negative coherent parts of the two input optical signals.

In step 608, the mixed optical signals are directed to and detected at one or more optical detectors to convert the optical signals to one or more corresponding electrical signals. For example, in the embodiment illustrated in FIG. 4, one electrical signal is produced by the balanced detector 330a. The electrical signal during one time interval within the processing time interval (called channel Ch 1) indicates down-mixed in-phase component I given by Equation 9a. The electrical signal during a different non-overlapping time interval within the processing time interval (called Ch 2) indicates down-mixed quadrature component Q given by Equation 9b. A complex down-mixed signal S is later, e.g., in step 611, computed digitally based on the two electrical signals, as given by Equation 11.

$$S = I + iQ \tag{11a}$$

Note that the signals S, I and Q are functions of time, t, of at least duration D=M*N*τ.

In some embodiments, averaging is performed over several different return signals S(t) to determine spurious copies of the phase-encoded signal produced at internal optical components along the return signal path. Such spurious copies can decrease the correlation with the actual return from an external object and thus mask actual returns that are barely detectable. If the averaging is performed over a number P of different illuminated spots and returns such that a single object is not in all those illuminated spots, then the average is dominated by the spurious copy of the code produced by the internal optical components. This spurious copy of the code can then be removed from the returned signal to leave just the actual returns in a corrected complex electrical signal S(t). P is a number large enough to ensure that the same object is not illuminated in all spots. A value as low as P=100 is computationally advantageous for graphical processing unit (GPU) implementations; while a value as high as P=1000 is preferred and amenable to field-programmable gate array (FPGA) implementations. In an example embodiment, P is about 100. In other embodiments, depending on the application, P can be in a range from about 10 to about 5000 Steps 609 and 610 perform this correction.

In step 609 it is determined whether P returns have been received. If not, control passes to back to step 605 to illuminate another spot. If so, then control passes to step 610. In step 610 the average signal, $S_S(t)$ is computed according to Equation 11b where each received signal of duration D is designated $S_p(t)$.

$$S_S(t) = \frac{1}{P} \sum_{p=1}^{P} S_p(t) \tag{11b}$$

This average signal is used to correct each of the received signals $S_p(t)$ to produce corrected signals $S_{pC}(t)$ to use as received signal S(t) in subsequent steps, as given by Equation (11c)

$$S(t) = S_{pC}(t) = S_p(t) - S_S(t) \tag{11c}$$

In some embodiments, the internal optics are calibrated once under controlled conditions to produce fixed values for $S_S(t)$ that are stored for multiple subsequent deployments of the system. Thus step 610 includes only applying Equation 11c. In some embodiments, the spurious copies of the code produced by the internal optics are small enough, or the associated ranges different enough from the ranges to the external objects, that step 609 and 610 can be omitted. Thus, in some embodiments, steps 609 and 610 are omitted, and control passes directly from step 608 to step 611, using S(t) from step 608 rather than from Equation 11c in step 610.

In step 611, a cross spectrum, of the complex digital signal that is constructed by temporally separated estimates of I and Q, is used to detect the signed Doppler shift. The following explanation is provided for purposes of illustration; however, the features and utility of the various techniques are not limited by the accuracy or completeness of this explanation. The frequency content of I and Q contain the Doppler (sinusoidal) and the Code (square wave). For the Doppler component, I is expected to lag or advance Q by 90 degrees as it is sinusoidal. The lag or advance depends on the sign of the Doppler shift. The code component does not demonstrate this effect—the I and Q levels that indicate the returning bits as a function of time move either in-phase or 180 degrees out of phase. The operation inside the brackets of the XS operation computes the complex phasor difference between I and Q at a given frequency. If there is a 90 degree phase difference between I and Q at a given frequency (as in the case of the Doppler component) this will be manifest in the imaginary part of the result. Code frequency content will conversely not appear in the imaginary part of the result, because as was stated above, the I and Q aspects of the code are either in phase or 180 degrees out of phase for the chose binary code, so the complex phasor difference at each frequency is always real. The cross spectrum operation, XS( ), can be viewed as a way of revealing only those aspects of the signal spectrum relating to Doppler, with the code dropping out. This makes it easier to find the Doppler frequency content. In contrast, in a regular spectrum of the return signal, the code frequency content could obscure the Doppler frequency content desired to make good Doppler estimates/corrections.

For example, the cross-spectrum of S is calculated as given by Equation 12.

$$XS(S) = FFF(I) * conj[FFT(Q)] \quad (12)$$

XS(S) resulting from Equation 12 is a complex valued array. The peaks in this cross spectrum represent one or more Doppler shifts $\omega_D$ in the returned signal. Any peak detection method may be used to automatically determine the peaks in the cross spectrum XS(S). In general, identification of large positive or negative peaks in the imaginary components of the cross spectrum will reveal information about Doppler shifts. However, under some special circumstances the real part may also reveal such information. An example of such a circumstance would be the presence of multiple range returns with similar Doppler values. Elevated amplitude in the real part can indicate such a circumstance. In some embodiments, the cross spectrum operation is performed separately on each block of data and averaged over the M blocks. These Doppler shifts and corresponding relative speeds are stored for further use, e.g., on one or more computer-readable media.

In step 613 the complex Fourier transform of the complex down mixed returned signal, S, is determined, for example using a complex FFT function FFT(S) implemented in hardware or software.

In step 621, the FFT(S) is shifted by the signed Doppler shift to produce a corrected spectrum, $S_{FFT}$, as given by Equation 14a or 14b, described below, for a current Doppler shift of the zero or more Doppler shifts observed in step 611. As indicated in Foucras 2014 equation 27, the time shift-theorem can be applied to achieve Doppler code compensation. Indeed, the time-shift frequency theorem is given by Equation 13.

$$\mathcal{F}\,x(t+\delta)) = \exp(i\zeta\delta)F(\zeta) \quad (13)$$

where $\mathcal{F}$ indicates the Fourier operator, x(t) is a function of time t, $\delta$ is a time shift, and F($\zeta$) indicates the Fourier transform of x(t). Then, for an FFT-based acquisition method, the code delay induced by code Doppler can be compensated by multiplying in the frequency domain the FFT of the local spreading code by the complex exponential. The advantage of this method is that if the Fourier transform of the spreading code sequence has been built and stored in the memory, then the Fourier transform of the receded (or extended) spreading code can be transformed to the frequency domain in a simple way. Then the correct spreading code can be produced quickly. This technique was patented by Krasner 1998. The effect of the Doppler is to frequency shift the spectrum of the code. Thus when using the convolution theorem to quickly compute the cross correlation, the frequency content of the measured code does not match the frequency content of the reference. By Doppler compensating, the frequency spectra are brought back into alignment and the cross correlation is again effective.

In some embodiments, the correct spectrum is computed using Equation 14a.

$$S_{FFT} = circshift(FFT(S), \omega_D) \quad (14a)$$

where circshift (x,y) shifts a function x of an independent variable over a finite domain by an amount y in the independent variable such that anything shifted off one end of the finite domain is shifted on to the opposite end of the finite domain. In some embodiments, the correct spectrum is computed using Equation 14b, which removes the Doppler effect by multiplication with a complex exponential and then calculating the FFT, as indicated in Equation 13.

$$S_{FFT} = FFT(S * \exp(-i\omega_D t)) \quad (14b)$$

In step 623 the cross-correlation, XC, of the phase encoding, exp(iB(t)), with the corrected complex signal, Scorr, is determined, designated XC(Code, Scorr) for each of the M independent blocks of N symbols, and then averaged. In some embodiments, this is done by taking the inverse Fast Fourier Transform (invFFT) of the corrected complex spectrum $S_{FFT}$ and correlating that corrected complex return Scorr with the digital signal exp(iB(t)) representing the code, as given by Equation 15a.

$$XC(Code, Scorr) = \frac{1}{M}\sum_{m=1}^{M} correl[\exp(iB_m(t)), invFF(S_{FFT})] \quad (15a)$$

where correl(x,y) is a function that determines the correlation of series x with series y and $B_m(t)$ is the code for the mth block. Both the invFFT and correl functions involve multiple operations on each member of the series. In some embodiments, computational resources are saved by performing a multiply in Fourier space using the $S_{FFT}$ already determined in step 621, and then taking an inverse FFT, as given by Equation 15b.

$$XC(Code, Scorr) = \frac{1}{M}\sum_{m=1}^{M} invFFT[FFT\{\exp(iB_m(t))\} * (S_{FFT})] \quad (15b)$$

Any peaks in the XC(Code, Scorr) are used to determine a delay time, $\Delta t$, at the current signed Doppler shift, and the zero or more delay times are used to compute zero or more corresponding ranges at the current signed Doppler shift.

In some embodiments, the FFT based convolution to determine the cross correlation (XC) can also be efficiently performed with a finite-impulse-response (FIR) filter based convolution as given by Equation 15c. This has the potential to be more efficient for some shorter code lengths and in some computational hardware settings (FPGA). For each range bin, k, in the cross-correlation.

$$XC(Code, Scorr, k) = \quad (15c)$$
$$\frac{1}{M}\sum_{m=1}^{M} circshift[\exp(iB_m(t)), k] * invFFT[(S_{FFT})]$$

Note that the dot multiply (*) implies a series of inner products at different shifts (k) between the reference code $B_m$ and the corrected signal S. As can be seen, the FIR approach of Equation 15c implies a simple register shift operation and simple multiply compared to the more complicated FFT method of FIG. 15b. The repeated shift and multiply of the FIR approach can be more computationally efficient for shorter codes, B.

In step 625, it is determined whether there is another signed Doppler shift, e.g., when more than one signed Doppler shift is detected in step 611. If so, control passes back to step 621 to correct the complex return spectrum FFT(S) with the next Doppler shift. If not, control passes to step 627. In step 627, Doppler ambiguity, if any, is removed, for example, by coincidence processing. There exists some potential for so called "split-pixel" scenarios to occur while scanning. In such scenarios, the beam may be clipped so that part of it measures a surface at one range and signed Doppler and the other part(s) measures different range(s) and signed Doppler(s). In such a scenario, an efficient processing strategy is desirable to extract all relevant information. For example, the cross spectrum could sense multiple non-zero signed Doppler values. This would lead to multiple Doppler corrections and cross correlations. One strategy is to coherently sum the signed Doppler corrected time domain signals prior to a single cross correlation. This avoids the computational burden of multiple cross correlations at the expense of some ambiguity in the range-Doppler pairing and the addition of the noise component of each corrected signal to the final range profile. The ambiguity could be sorted out with a spatial correspondence algorithm designed to find the "most likely" range-Doppler pairing on the basis of spatial proximity to non-ambiguous (single range-Doppler) points. The additive noise may not be sufficient to be a concern. This processing strategy is worth considering as multi-return capability can be desirable for some users. In some embodiments, step 627 is omitted and control passes directly to step 631.

In step 631, it is determined whether there is another spot to illuminate in a scene of interest, e.g., by scanning to view a new spot in the scene of interest. If so, control passes back to step 605 and following steps to illuminate the next spot and process any returns during the next processing time interval. In some embodiments using multi-spot averaging, the new spot is added to the average and the oldest spot is removed, or P new spots are collected in the loop formed by steps 605 through 609. If there is not another spot to illuminate, then the results are used, and control passes to step 633.

In step 633, a device is operated based on the signed Doppler effect or the corrected ranges. In some embodiments, this involves presenting on a display device an image that indicates a Doppler corrected position of any object at a plurality of spots illuminated by the transmitted optical signal. In some embodiments, this involves communicating, to the device, data that identifies at least one object based on a point cloud of Doppler corrected positions at a plurality of spots illuminated by a plurality of transmitted optical signals. In some embodiments, this involves presenting on a display device an image that indicates a size of the Doppler effect at a plurality of spots illuminated by the transmitted optical signals, whereby moving objects are distinguished from stationary objects and absent objects. In some embodiments, this involves moving a vehicle to avoid a collision with an object, wherein a closing speed between the vehicle and the object is determined based on a size of the Doppler effect at a plurality of spots illuminated by the transmitted optical signals. In some embodiments, this involves identifying the vehicle or identifying the object on the collision course based on a point cloud of Doppler corrected positions at a plurality of spots illuminated by the transmitted optical signals. Filtering the point cloud data based on Doppler has the effect of identifying and removing vegetation that may be moving in a breeze. Hard objects, man-made objects, or dense objects are then better revealed by the filtering process. This can be advantageous in defense and surveillance scenarios. In the vehicle scenario—the Doppler can be used to segment objects (e.g., distinguish a road surface versus a moving vehicle).

In some embodiments with multiple signed Doppler shifts for a single return, step 633 includes associating each delay time with one of the signed Doppler shifts, assuming that a particular return is based on an object or part of an object moving at a particular average speed over the duration of one transmitted signal. For a given signed Doppler correction, only those range peaks associated with that signed Doppler correction will be present in the cross correlation. So it is improbable to incorrectly pair a given range and signed Doppler in the case of multiple instances. Put another way, the ambiguity function of this approach guarantees that there can be no confusion. This was demonstrated by mapping out the range-Doppler space by computing the ranging cross-correlation at a wide set of possible Doppler corrections. The plot indicated the ambiguity space is indeed very sparse.

3.3 Experimental Phase-Encoded Embodiment

Figure 7A:
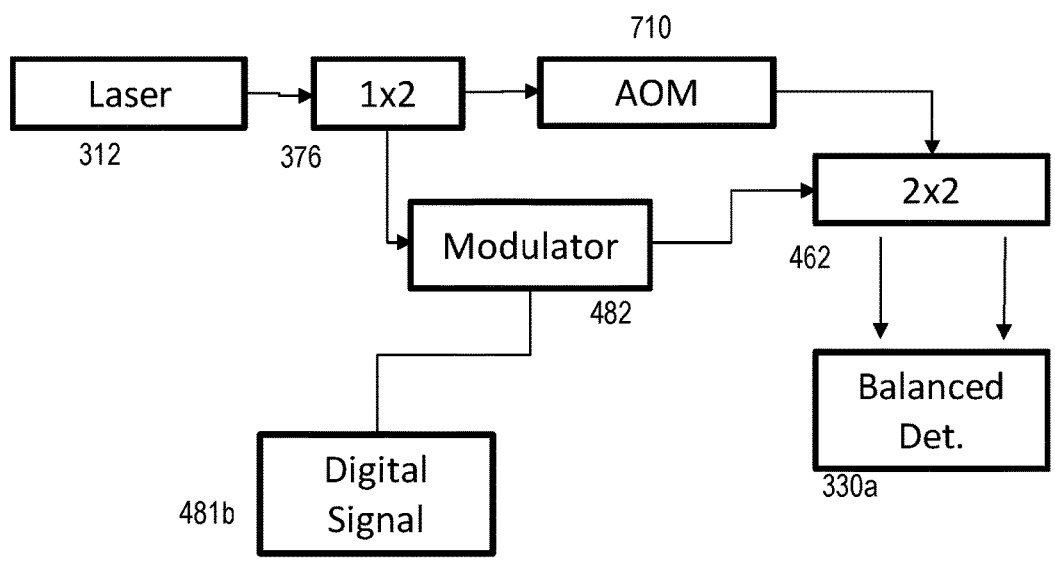
FIG. 7A is a block diagram that illustrates example components of an experimental setup to simulate high resolution signed Doppler compensated LIDAR system using time separation with a compact MMI component, according to an embodiment.

To demonstrate the ability to detect signed Doppler effects using time separated I/Q processing, the hardware arrangement of FIG. 7A was assembled. FIG. 7A is a block diagram that illustrates example components of an experimental setup to simulate high resolution signed Doppler compensated LIDAR system using time separation with a compact MMI component, according to an embodiment. In this embodiment, the AOM 710 in inserted to replace transmitter/receiver optics, including amplifier 379, and a moving object, in order to introduce a known signed Doppler frequency shift $\omega_D$ into an optical signal that simulates a retuned signal R. There was no phase encoded signal, so FIG. 7A schematic does not demonstrate phase-encoded LIDAR, and ranging is not simulated by this measurement. The configuration only supports an experiment to show that the time domain IQ supported by the separate LO modulator 482 can accurately resolve the sign of the AOM frequency shift. The configuration is used to demonstrate suppression of the incorrect sign versus the correct sign of the tone imposed by AOM 710 that represents a Doppler shift. The other components, including continuous wave laser source 310, beam splitter 376, such as a 1×2 MMI structure, Digital signal 481b, a LO phase modulator 482, a smaller footprint 2×2 MMI structure 462 with one balanced detector 330a, are as described above for FIG. 4. In an illustrated embodiment, the AOM 710 was operated to impart a positive Doppler shift of 80 megahertz (MHz, 1 MHz=$10^6$ hertz). The alternating interleaving strategy was deployed to drive the LO phase modulator 482.

Figure 7B:
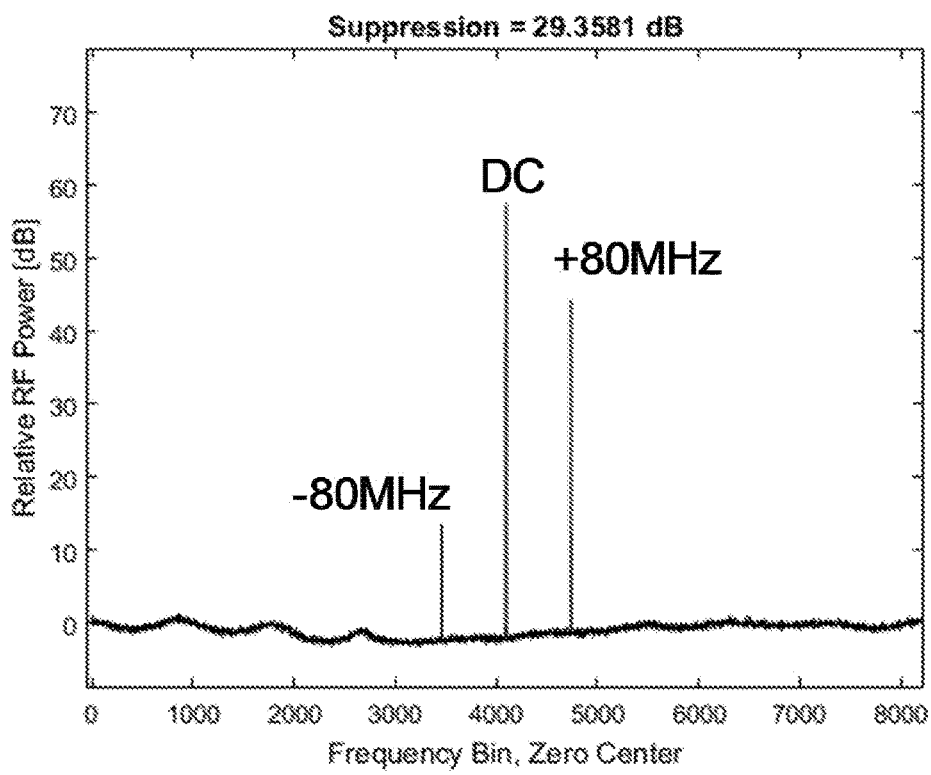
FIG. 7B is a graph that illustrates the effect of time-separated I/Q processing to distinguish the sign of a Doppler shift, according to an embodiment.

FIG. 7B is a graph that illustrates a spectrum of a complex signal constructed from time-separated I/Q mixing to distinguish the sign of a Doppler shift, according to an embodiment. The graph is a spectrum of a complex waveform digitally assembled from the time-separated I/Q processing, as depicted above in FIG. 1D, before performing a cross correlation to obtain range The horizontal axis indicates frequency bin of the down converted, heterodyne frequencies in the RF band formed at the detector. The total number of bins is 8192, a factor of 2 resulting from a digital FFT transform. A frequency shift of zero is at the center, bin 4096. The vertical axis indicates relative power of the down-converted RF band. A major peak is found at zero shift, a direct current (DC) signal that indicates residual carrier power or bias in the time domain signal. A major non-DC peak is found at the correct signed Doppler shift of +80 MHz, with a much suppressed second peak at the wrongly signed Doppler shift of −80 MHz, an artifact of the FFT. The suppression, at 30 dB, is substantial, making it easy to distinguish the correctly signed Doppler shift +80 MHz over the wrongly signed Doppler shift of −80 MHz. This is competitive and in some cases better than the performance of the optical hybrid approach depicted in FIG. 3C.

Figure 7C:
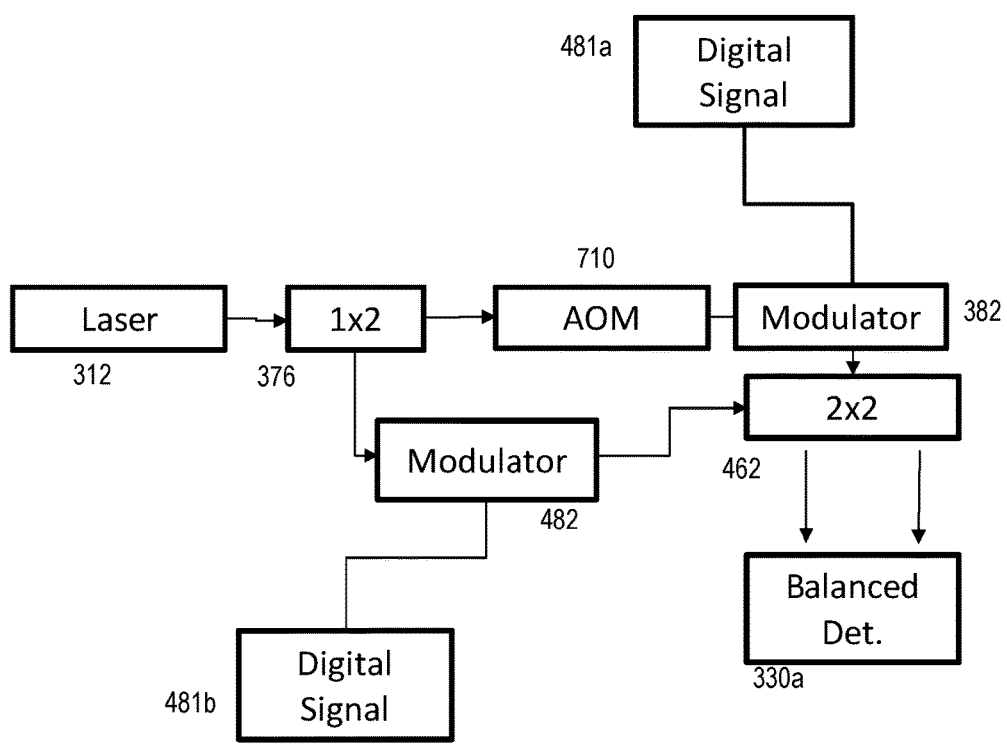
FIG. 7C is a block diagram that illustrates example components of an experimental setup to simulate high resolution signed Doppler compensated phase-encoded LIDAR system using time separation with a compact MMI component, according to an embodiment.

FIG. 7C is a block diagram that illustrates example components of an experimental setup to simulate high resolution signed Doppler compensated phase-encoded LIDAR system using time separation with a compact MMI component, according to an embodiment. This experimental embodiment simulates both Doppler shift detection and ranging. The ranging is simulated by including a modulator 382 to impose the transmitted phase code from digital signal generator 481a, as performed by these components in other embodiments described above. The remaining components are as described above for FIG. 7A. In this embodiment, a 2048 bit pseudo-random binary phase range code was used to produce the simulated range profile.

Figure 7D:
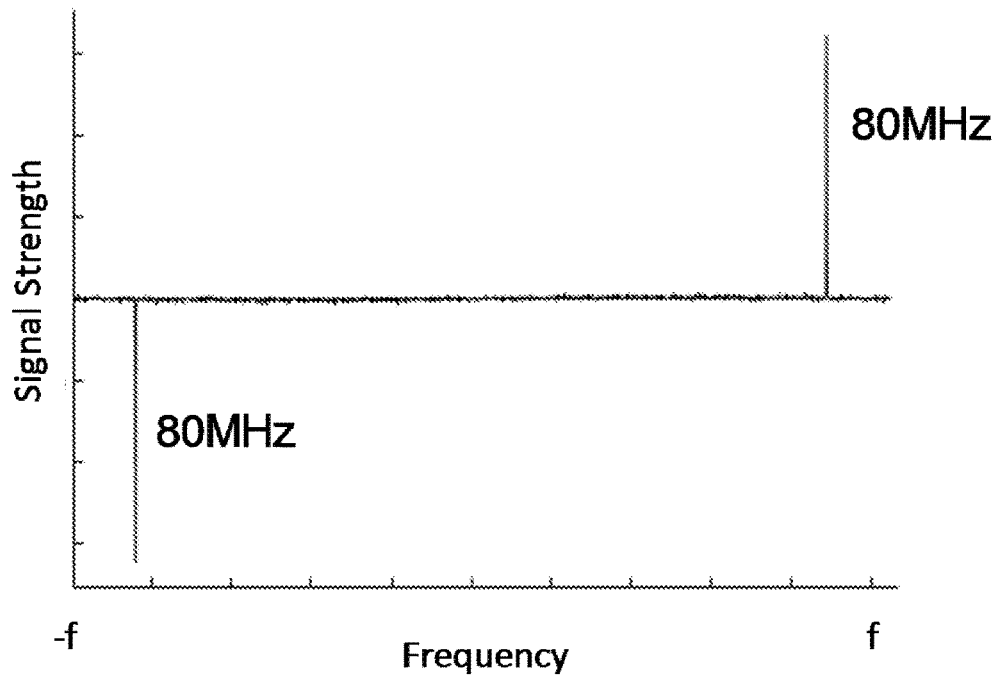
FIG. 7D is a graph that illustrates an example cross-spectrum of the composed IQ signal which shows clear resolution of the signed Doppler frequency, according to an embodiment.

FIG. 7D is a graph that illustrates an example cross-spectrum of the composed IQ signal which shows clear resolution of the signed Doppler frequency, according to an embodiment. The horizontal axis is frequency shift of down converted heterodyne RF frequencies with zero shift at the center, and the vertical axis is the cross spectrum signal strength of the transmitted signal having no Doppler shift with the simulated returned signal produced by the AOM 710. FIG. 7D is a cross-spectrum extracted from a time delayed and frequency shifted phase code. The cross-spectrum of the digitally constructed IQ signal shows clear resolution of the signed Doppler frequency because the −80 MH peak is suppressed relative to the +80 MHz peak. Therefore the −80 MHz peak is ignored. Ignoring the wrong −80 MHz peak results in a cross section analogous to the peak 156a in the cross spectrum plotted in FIG. 1E.

Figure 7E:
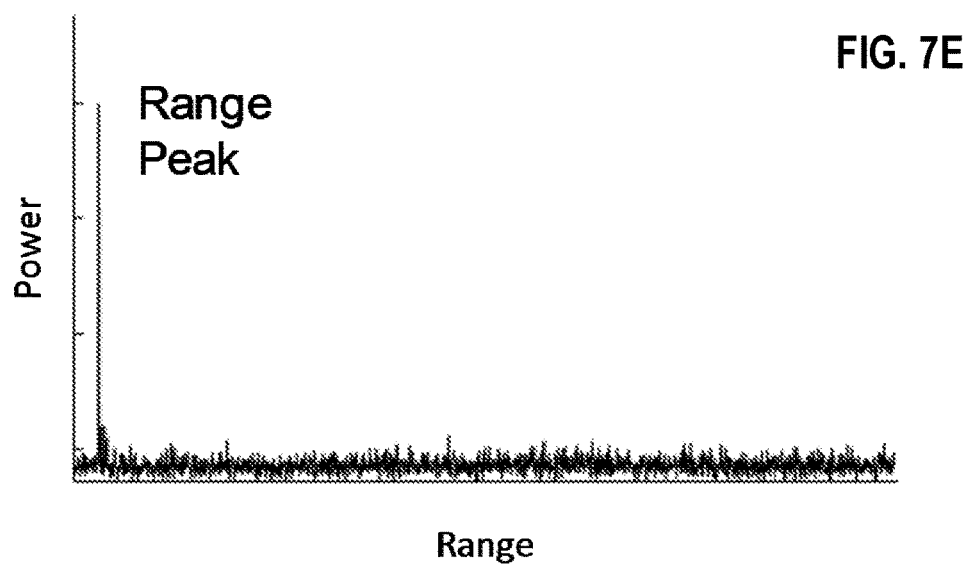
FIG. 7E is a graph that illustrates an example signed Doppler compensation that reveals the range peak, according to an embodiment.

Subsequent Doppler compensation and cross-correlation of the data produced by the equipment of FIG. 7C reveals the range peak. FIG. 7E is a graph that illustrates an example range plot after signed Doppler compensation that reveals the range peak, according to an embodiment. The horizontal axis indicates time delay (related to range by Equation 3) and the vertical axis indicates power of the cross correlation. The correct range is indicated by the range peak.

4. Chirped Optical Detection

In some embodiments, time separated I and Q processing is also applied to remove Doppler shift sign ambiguity in chirped laser ranging. This section begins with a review of chirped optical range and Doppler detection.

FIG. 8 is a set of graphs that illustrates an example optical chirp measurement of range, according to an embodiment. The horizontal axis 812 is the same for all four graphs and indicates time in arbitrary units, on the order of milliseconds (ms, 1 ms=$10^{-3}$ seconds). Graph 810 indicates the power of a beam of light used as a transmitted optical signal. The vertical axis 814 in graph 810 indicates power of the transmitted signal in arbitrary units. Trace 816 indicates that the power is on for a limited pulse duration, $\tau$ starting at time 0. Graph 820 indicates the frequency of the transmitted signal. The vertical axis 824 indicates the frequency transmitted in arbitrary units. The trace 826 indicates that the frequency of the pulse increases from $f_1$ to $f_2$ over the duration $\tau$ of the pulse, and thus has a bandwidth B=$f_2-f_1$. The frequency rate of change is $(f_2-f_1)/\tau$ The returned signal is depicted in graph 830 which has a horizontal axis 812 that indicates time and a vertical axis 824 that indicates frequency as in graph 820. The chirp 826 of graph 820 is also plotted as a dotted line on graph 830. A first returned signal is given by trace 836a, which is just the transmitted reference signal diminished in intensity (not shown) and delayed by $\Delta t$. When the returned signal is received from an external object after covering a distance of 2R, where R is the range to the target, the returned signal start at the delayed time $\Delta t$ is given by 2R/c, where c is the speed of light in the medium (approximately 3×$10^8$ meters per second, m/s), related according to Equation 3, described above. Over this time, the frequency has changed by an amount that depends on the range, called $f_R$, and given by the frequency rate of change multiplied by the delay time. This is given by Equation 16a.

$$f_R=(f_2-f_1)/\tau * 2R/c=2BR/c\tau \qquad (16a)$$

The value of $f_R$ is measured by the frequency difference between the transmitted signal 826 and returned signal 836a in a time domain mixing operation referred to as de-chirping. So the range R is given by Equation 16b.

$$R=f_R c\tau/2B \qquad (16b)$$

Of course, if the returned signal arrives after the pulse is completely transmitted, that is, if 2R/c is greater than $\tau$, then Equations 16a and 16b are not valid. In this case, the reference signal is delayed a known or fixed amount to ensure the returned signal overlaps the reference signal. The fixed or known delay time of the reference signal is multiplied by the speed of light, c, to give an additional range that is added to range computed from Equation 16b. While the absolute range may be off due to uncertainty of the speed of light in the medium, this is a near-constant error and the relative ranges based on the frequency difference are still very precise.

In some circumstances, a spot illuminated by the transmitted light beam encounters two or more different scatterers at different ranges, such as a front and a back of a semitransparent object, or the closer and farther portions of an object at varying distances from the LIDAR, or two separate objects within the illuminated spot. In such circumstances, a second diminished intensity and differently delayed signal will also be received, indicated on graph 830 by trace 836b. This will have a different measured value of $f_R$ that gives a different range using Equation 16b. In some circumstances, multiple additional returned signals are received.

Graph 840 depicts the difference frequency $f_R$ between a first returned signal 836a and the reference chirp 826. The horizontal axis 812 indicates time as in all the other aligned graphs in FIG. 8, and the vertical axis 834 indicates frequency difference on a much expanded scale. Trace 846 depicts the constant frequency $f_R$ measured during the transmitted chirp, which indicates a particular range as given by Equation 16b. The second returned signal 836b, if present, would give rise to a different, larger value of $f_R$ (not shown) during de-chirping; and, as a consequence yield a larger range using Equation 16b.

A common method for de-chirping is to direct both the reference optical signal and the returned optical signal to the same optical detector. The electrical output of the detector is dominated by a beat frequency that is equal to, or otherwise depends on, the difference in the frequencies of the two signals converging on the detector. A Fourier transform of this electrical output signal will yield a peak at the beat frequency. This beat frequency is in the radio frequency (RF) range of Megahertz (MHz, 1 MHz=$10^6$ Hertz=$10^6$ cycles per second) rather than in the optical frequency range of Terahertz (THz, 1 THz=$10^{12}$ Hertz). Such signals are readily processed by common and inexpensive RF components, such as a Fast Fourier Transform (FFT) algorithm running on a microprocessor or a specially built FFT or other digital signal processing (DSP) integrated circuit. In other embodiments, the return signal is mixed with a continuous wave (CW) tone acting as the local oscillator (versus a chirp as the local oscillator). This leads to the detected signal which itself is a chirp (or whatever waveform was transmitted). In this case the detected signal would undergo matched filtering in the digital domain as described in Kachelmyer 1990, the entire contents of which are hereby incorporated by reference as if fully set forth herein, except for terminology inconsistent with that used herein. The disadvantage is that the digitizer bandwidth requirement is generally higher. The positive aspects of coherent detection are otherwise retained.

Figure 9A:
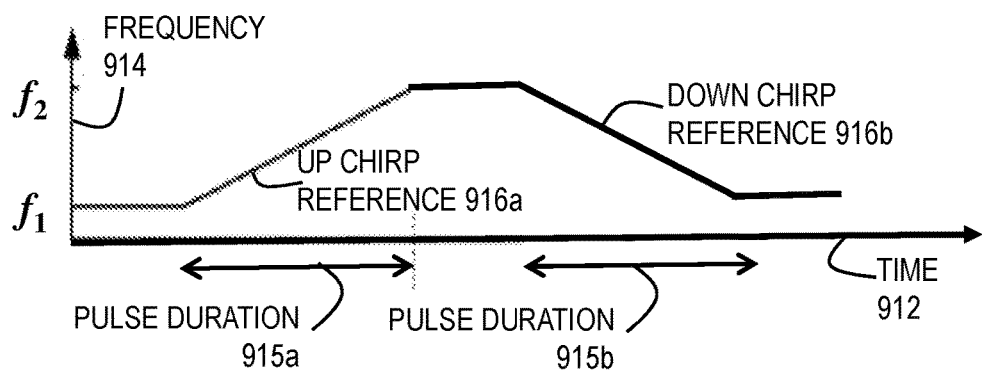
FIG. 9A is a graph that illustrates an example serial up and down chirp transmitted optical signal for a LIDAR system.

FIG. 9A is a graph that illustrates an example serial (also called sequential) up and down chirp transmitted optical signal for a LIDAR system, according to an embodiment. The horizontal axis 912 indicates time in arbitrary units; and, the vertical axis 914 indicates frequency of the optical transmitted signal or reference signal in arbitrary units. A first pulse of duration 915a is an up chirp and a second pulse of duration 915b is a down chirp. The pairs of ranges obtained from the up chirp and down chirp can be combined to determine a better estimate of range and the Doppler effect. The generic LIDAR system in FIG. 2 can be operated with such sequential up and down chirps and frequency modulators instead of phase modulators as modulator 282a or modulator 282b. There is no requirement that the bandwidths or pulse duration, or both, be the same for both up chirp and down chirp pulses, as long as each spans the range values of interest for a particular application.

As indicated above, if the sequential range measurements can be successfully paired and averaged, the range of the target or object and Doppler shift size of the movement of the target or object can be correctly inferred by averaging the ranges of the sequential measurements. However, the sign of the Doppler shift, and therefore the direction of movement of the target or object, is not resolved.

However, the sequential up/down approach leads to errors when the Doppler shift changes between measurements or when a translated beam (e.g., a LIDAR scanner) translates to a new location between measurements which could lead to a change in the objects being measured or a change in the actual range to the same objects, or even an different number of returns in the up and down chirps, or some combination.

In some embodiments, the LIDAR system is changed to produce simultaneous up and down chirps. This approach eliminates variability introduced by object speed differences, or LIDAR position changes relative to the object which actually does change the range, or transient scatterers in the beam, among others, or some combination. The approach then guarantees that the Doppler shifts and ranges measured on the up and down chirps are indeed identical and can be most usefully combined. The Doppler scheme guarantees parallel capture of asymmetrically shifted return pairs in frequency space for a high probability of correct compensation.

Figure 9B:
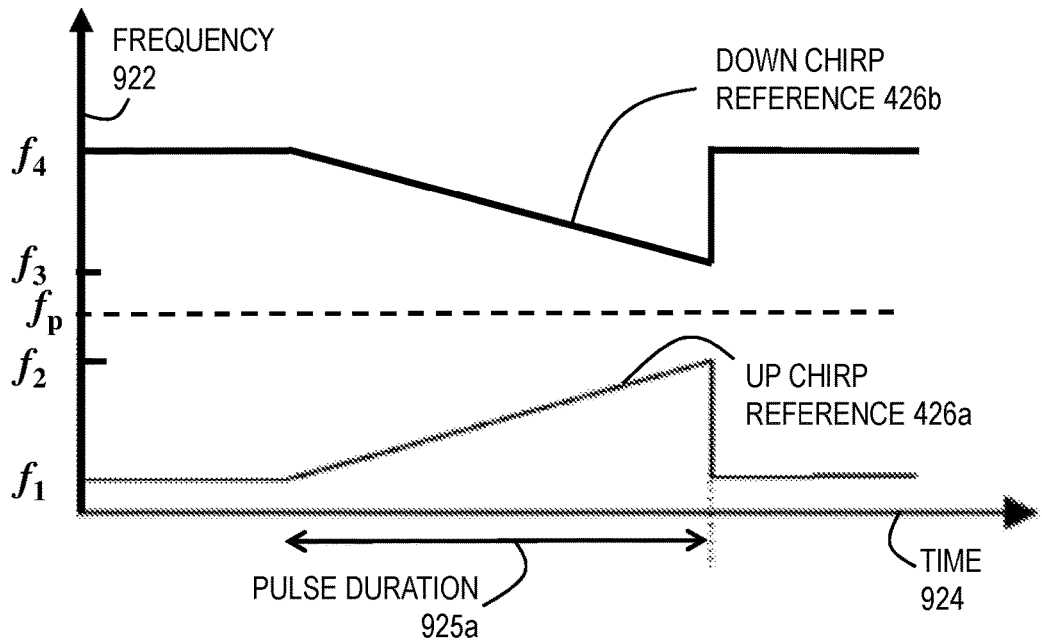
FIG. 9B is a graph that illustrates an example simultaneous up and down chirp transmitted optical signal for a LIDAR system.

FIG. 9B is a graph that illustrates an example simultaneous up and down chirp transmitted optical signal for a LIDAR system, according to an embodiment. The horizontal axis indicates time in arbitrary units, not necessarily the same axis limits as in FIG. 9A. For example, in some embodiments, the full temporal range of axis 924 is half the full temporal range of axis 912. The vertical axis 922 indicates frequency of the optical transmitted signal or reference signal in arbitrary units. During a pulse of duration 925a, a light beam comprising two optical frequencies at any time is generated. One frequency increases, e.g., from $f_1$ to $f_2$ while the other frequency simultaneous decreases from $f_4$ to $f_3$. The two frequency bands e.g., band 1 from $f_1$ to $f_2$, and band 2 from $f_3$ to $f_4$) do not overlap so that both transmitted and return signals can be optically separated by a high pass or a low pass filter, or some combination, with pass bands starting at pass frequency $f_p$. For example $f_1<f_2<f_p<f_3<f_4$. Though, in the illustrated embodiment, the higher frequencies provide the down chirp and the lower frequencies provide the up chirp, in other embodiments, the higher frequencies produce the up chirp and the lower frequencies produce the down chirp.

In some embodiments, two different laser sources are used to produce the two different optical frequencies in each beam at each time. However, in some embodiments, a single optical carrier is modulated by a single RF chirp to produce symmetrical sidebands that serve as the simultaneous up and down chirps. In some of these embodiments, a double sideband Mach-Zehnder intensity modulator is used that, in general, does not leave much energy in the carrier frequency; instead, almost all of the energy goes into the sidebands.

Figure 9C:
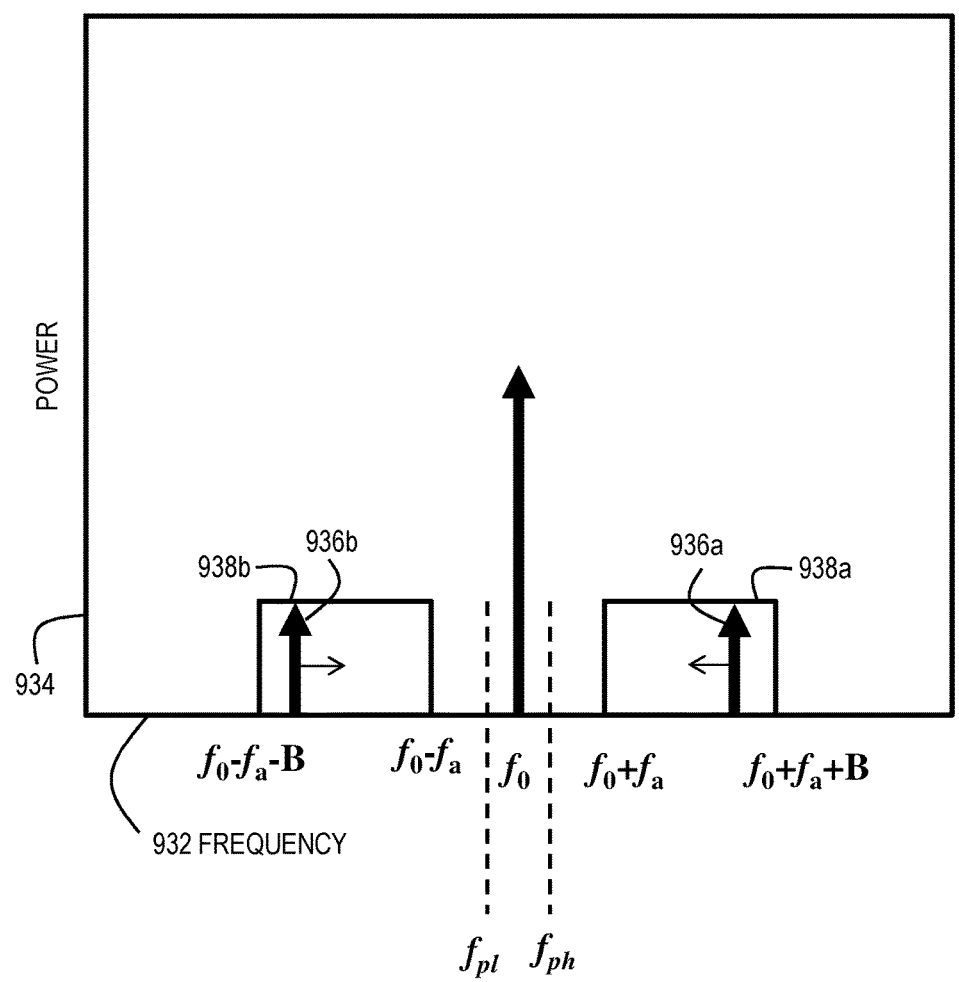
FIG. 9C is a graph that illustrates example first order sidebands produced by a modulator to generate simultaneous up and down chirp transmitted optical signal for a LIDAR system.

FIG. 9C is a graph that illustrates example first order sidebands produced by a modulator to generate simultaneous up and down chirp transmitted optical signal for a LIDAR system, according to an embodiment. The horizontal axis 932 indicates frequency of a signal and the vertical axis 934 indicates power of the signal. When an optical carrier $f_0$ is modulated by a RF signal of frequency f, two optical sidebands are produced for each multiple of the RF frequency. The first order sidebands are at the RF frequency f above and below the optical carrier frequency $f_0$ indicated by arrows 936a and 936b. Second order sidebands are produced at 2f above and below the optical carrier $f_0$, etc. Each higher order sideband is reduced in power compared to the previous lower order sideband.

When producing an optical chirp using a RF down chirp varying from fb to fa<fb, the bandwidth B=(fb−fa). The upper sideband varies from $f_0$+fa+B=$f_0$+fb to $f_0$+fa, as indicated by the left pointing arrow on frequency 936a, producing a signal in band 938a. The lower sideband simultaneous varies from $f_0$−fa−B=$f_0$−fb to $f_0$−fa, as indicated by the right pointing arrow on frequency 936b, producing a signal in band 938b. In other embodiments, a RF down chirp is used to modulate the optical carrier, and the frequencies 936a and 936b move through the bands 938a and 938b, respectively, in the opposite directions, e.g., from left to right in band 938a and right to left in band 938b. The returns from the up-chirp and the down chirp are distinguished using different methods in different embodiments. In some preferred embodiments the separation is performed by adding a frequency shift to remove the symmetry of the upper and lower sidebands, as described below. In other embodiment, in which the sidebands are widely enough separated to be optically filtered, the signals from each are split. One signal from each of the reference and return is passed through a low pass filter starting at $f_{pl}$ to filter out the carrier $f_0$ and the high band 938a to obtain the low frequency band 938b. Similarly, one signal from each of the reference and return is passed through a high pass filter starting at $f_{ph}$ to filter out the carrier $f_0$ and the low band 938b to obtain the high frequency band 938a. The two bands are processed as described above to produce the up-chirp ranges and the down-chirp ranges. After pairing the ranges from the up chirp and down chirp, the unsigned Doppler effect and the corrected ranges are determined.

As a result of sideband symmetry, the bandwidth of the two optical chirps will be the same if the same order sideband is used. In other embodiments, other sidebands are used, e.g., two second order sideband are used, or a first order sideband and a non-overlapping second sideband is used, or some other combination.

FIG. 2 also illustrates example components for a simultaneous up and down chirp LIDAR system according to one embodiment. In this embodiment, the modulator 282a is a frequency shifter added to the optical path of the transmitted beam 205. In other embodiments, the frequency shifter is added instead to the optical path of the returned beam 291 or to the reference path 220. In general, the frequency shifting element is added as modulator 282b on the local oscillator (LO, also called the reference path) side or on the transmit side (before the optical amplifier) as the device used as the modulator (e.g., an acousto-optic modulator, AOM) has some loss associated and it is disadvantageous to put lossy components on the receive side or after the optical amplifier. The purpose of the optical shifter is to shift the frequency of the transmitted signal (or return signal) relative to the frequency of the reference signal by a known amount $\Delta fs$, so that the beat frequencies of the up and down chirps occur in different frequency bands, which can be picked up, e.g., by the FFT component in processing system 250, in the analysis of the electrical signal output by the optical detector 230. For example, if the blue shift causing range effects is $f_B$, then the beat frequency of the up chirp will be increased by the offset and occur at $f_B+\Delta fs$ and the beat frequency of the down chirp will be decreased by the offset to $f_B-\Delta fs$. Thus, the up chirps will be in a higher frequency band than the down chirps, thereby separating them. If $\Delta fs$ is greater than any expected Doppler effect, there will be no ambiguity in the ranges associated with up chirps and down chirps. The measured beats can then be corrected with the correctly signed value of the known $\Delta fs$ to get the proper up-chirp and down-chirp ranges. In some embodiments, the RF signal coming out of the balanced detector is digitized directly with the bands being separated via FFT. In some embodiments, the RF signal coming out of the balanced detector is pre-processed with analog RF electronics to separate a low-band (corresponding to one of the up chirp or down chip) which can be directly digitized and a high-band (corresponding to the opposite chirp) which can be electronically down-mixed to baseband and then digitized. Both embodiments offer pathways that match the bands of the detected signals to available digitizer resources.

As described in U.S. patent application Ser. No. 62/428, 109 by Crouch et al., entitled "Method and System for Doppler Detection and Doppler Correction of Optical Chirped Range Detection," when selecting the transmit (TX) and local oscillator (LO) chirp waveforms, it is advantageous to ensure that the frequency shifted bands of the system take maximum advantage of available digitizer bandwidth. In general this is accomplished by shifting either the up chirp or the down chirp to have a range frequency beat close to zero.

Figure 9D:
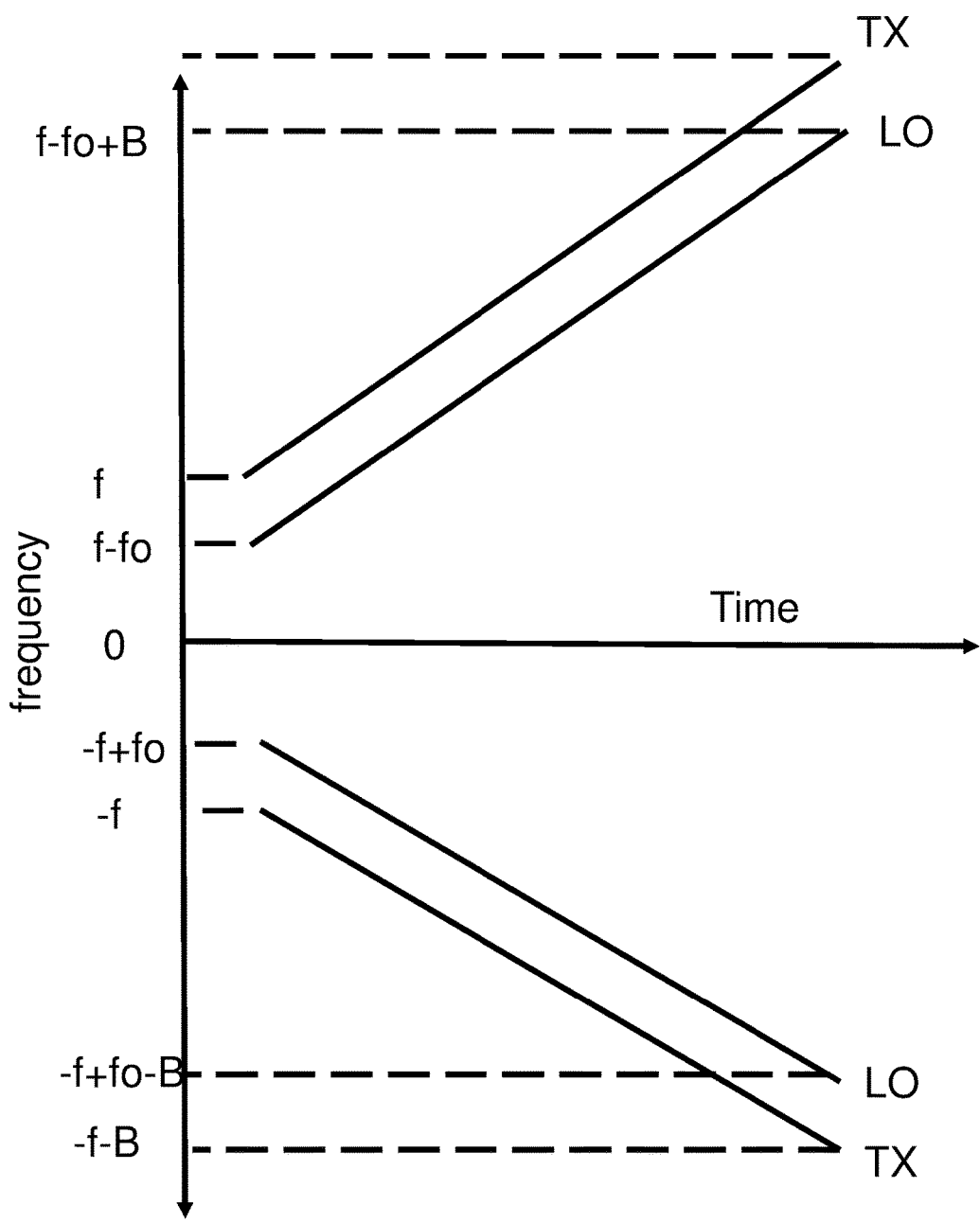
FIG. 9D is a graph that illustrates an example simultaneous up and down chirp transmitted optical signal and reference signal (LO) for a LIDAR system relative to an optical carrier.

For example, in another embodiment, the transmitted (TX) signal and the reference (LO) signal are generated independently using upper and lower sidebands on two different modulators 282a and 282b on the carrier frequency. FIG. 9D is a graph that illustrates an example simultaneous up and down chirp transmitted optical signal and reference signal (LO) for a LIDAR system relative to an optical carrier, according to another embodiment. The horizontal axis is time in relative units, and the vertical axis is frequency relative to the optical carrier $f_0$ plotted as $f_0=0$. The reference signal (LO) is offset from the transmitted signal (TX) by an offset frequency fo that, because of the side band symmetries, and unlike the examples above, are on opposite sides on the up chirp compared to the down chirp. In the illustrated embodiment, the LO signal frequency is lower than the simultaneous TX signal frequency for the up chirp and the LO signal frequency is higher than the simultaneous TX signal frequency for the down chirp. Thus, the TX up-chirp waveform chirps over bandwidth B from f to f+B; and the LO up-chirp waveform chirps from f−fo to f−fo+B. The down chirps are reflected around the optical carrier frequency plotted as 0.

Figure 9E:
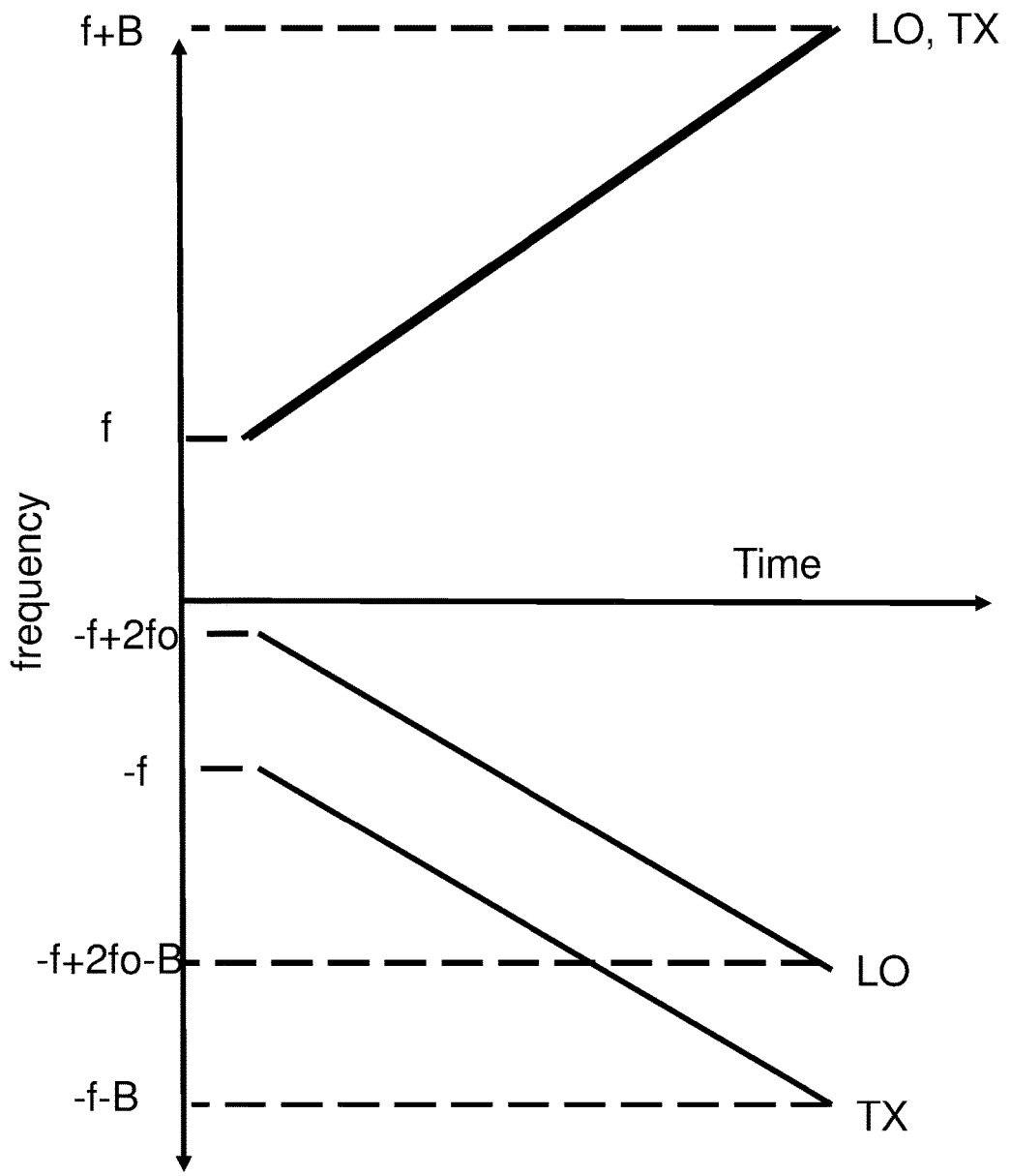
FIG. 9E is a graph that illustrates an example shifted simultaneous up and down chirp transmitted optical signal and reference signal (LO) for a LIDAR system relative to an optical carrier.

In this case, to get an up-chirp beat frequency near zero, it makes sense to select the shift frequency $\Delta fs=fo$ such that the up chirp is aligned with the transmit. The down chirps will be separated by 2*fo. FIG. 9E is a graph that illustrates an example shifted simultaneous up and down chirp transmitted optical signal and reference signal (LO) for a LIDAR system relative to an optical carrier, according to another embodiment. The horizontal axis is time in relative units, and the vertical axis is frequency relative to the optical carrier $f_0$ plotted as $f_0=0$. Overall this gives rise to an up-chirp beat frequency band for $f_R$ from 0 to 2*fo and a non-overlapping down-chirp beat frequency band for $f_R$ from 2*fo to a system cutoff frequency (probably digitizer limited). If the down chirp beat frequency is too large, a down-mix stage for the large beat frequency band would mix the large beat frequency band down by 2*fo so that it can be digitized at base-band.

Any frequency shifter known in the art may be used. For example, in some embodiments an acousto-optic modulator (AOM) is used; and, in other embodiments, serradyne based phase shifting is used with a phase modulator. In the following description it is assumed that the LO signal of FIG. 9D is used, though in other embodiments, the LO signal of FIG. 9E can be used instead.

FIG. 9F is a graph similar to FIG. 9D, using a symmetric LO signal, and shows the return signal in this frequency time plot as a dashed line when there is no Doppler shift. FIG. 9G is a graph similar to FIG. 9F, using a symmetric LO signal, and shows the return signal in this frequency time plot as a dashed line when there is a non zero Doppler shift.

Figure 10:
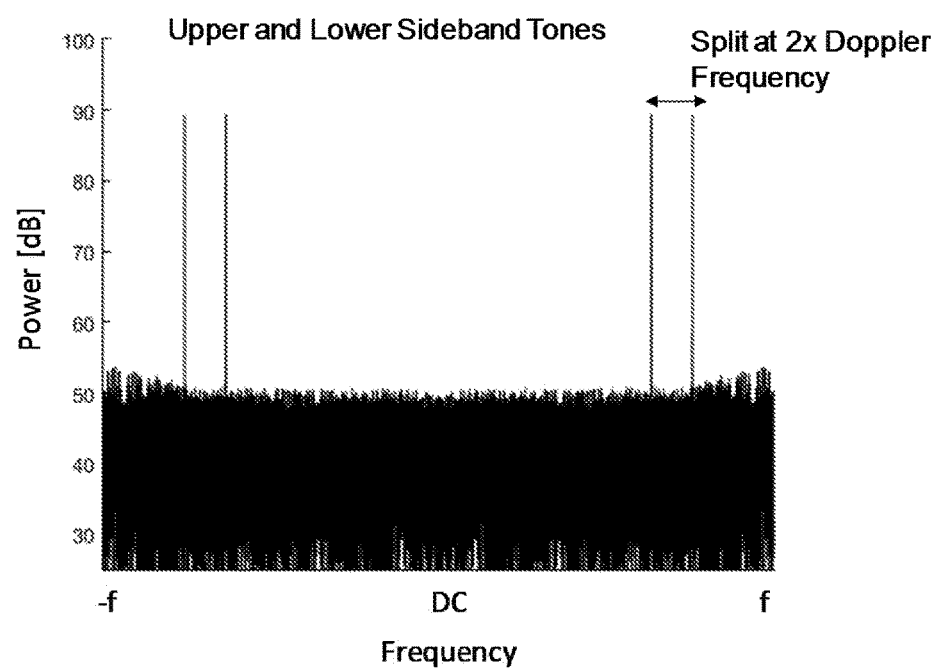
FIG. 10 is a graph that illustrates an example spectrum of returned signals without I/Q processing.

In the case of a chirped waveform, the time separated I/Q processing (aka time domain multiplexing) can be used to overcome hardware requirements of other approaches as described above. In that case, an AOM is used to break the range-Doppler ambiguity for real valued signals. For real valued sampling, the ranging frequencies for various Doppler shifts are extremely difficult to disambiguate, especially in the presence of large numbers of range returns or bright targets. FIG. 10 is a graph that illustrates an example spectrum of returned signals without I/Q processing. The horizontal axis indicates frequency bin centered on zero; and the vertical axis indicates power in deciBels (dB). FIG. 10 shows that real-valued-only measurement leads to ambiguous Doppler compensation scenarios where frequency differences on the upper and lower sideband are resolved in both the positive and negative frequencies of the FFT processing step. Approaches using hybrids for I/Q detection were not pursued as they required careful calibration for longer duration waveforms.

4.2 Chirped Optical Detection Signed Doppler Correction Hardware

Figure 11:
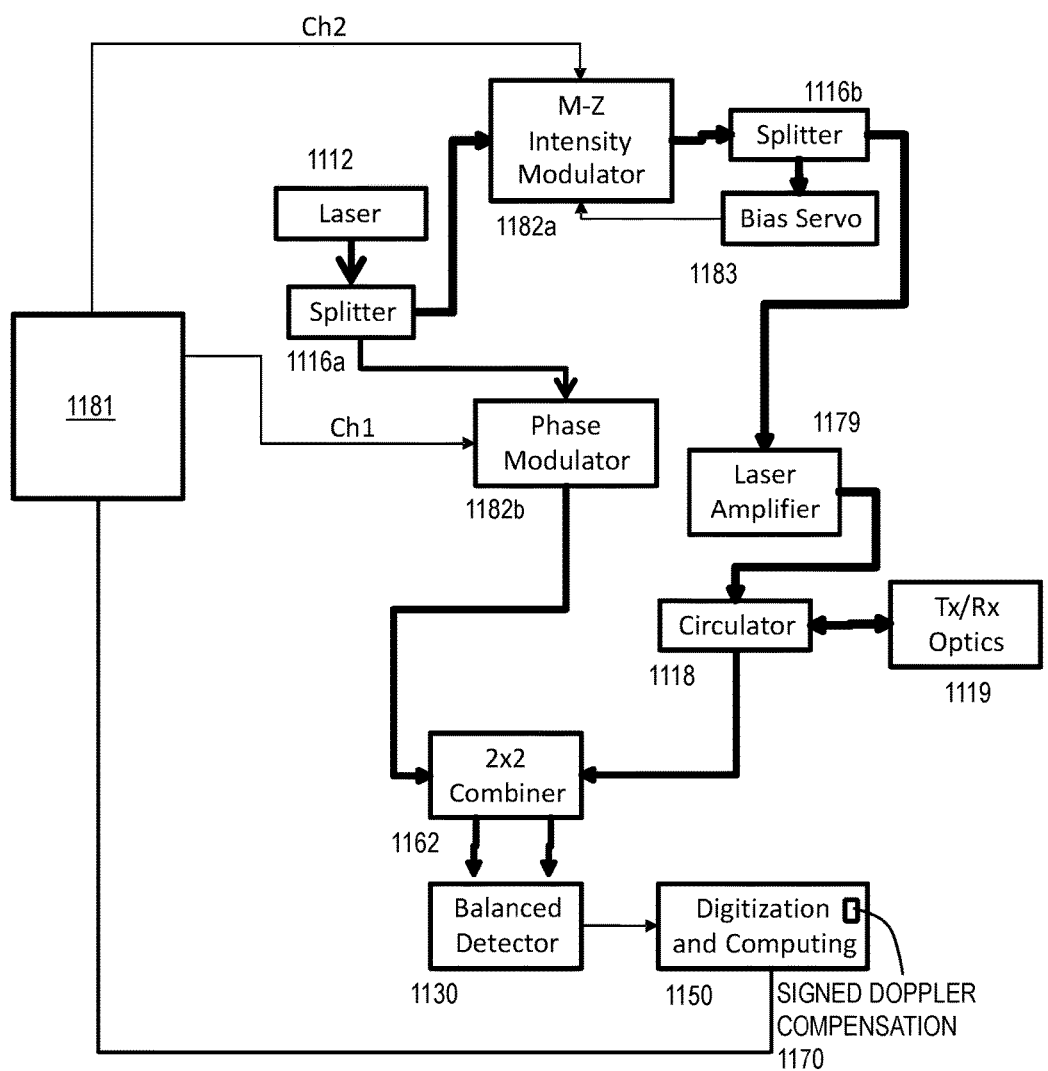
FIG. 11 is a block diagram that illustrates a time-separated I/Q chirped LIDAR system to determine signed Doppler shifts, according to an embodiment.

FIG. 11 is a block diagram that illustrates a time-separated I/Q chirped LIDAR system 1100 to determine signed Doppler shifts, according to an embodiment. The system 1100 includes continuous wave laser source 1112, beam splitter 1116a, such as a 1×2 MMI structure, Mach-Zehnder intensity modulator 1182a to move optical power from the optical carrier to simultaneous up and down chirp sidebands controlled in a feedback loop by bias servo 1183 based on an optical signal from second splitter 1116b, optical amplifier 1179 to increase gain and circulator 1118 and other transmission/receiver optical components 1119, such as optical couplers and scanning optics. Unlike prior chirped LIDAR systems, the system 1100 includes a phase modulator 1182b in the reference path to separately encode I and Q versions of the transmitted signal on the LO reference signal based on digital signal output by module 1181. The phase modulator changes the phase of the up and down chirp simultaneously (both the upper and lower sideband produced by the modulator). The MZ produces the simultaneous up and down chirp in the sidebands. The phase modulator does the same but with the time domain IQ modulation superimposed on this LO signal. The system also includes a small footprint 2×2 MMI structure as optical combiner 1162 with one balanced detector 1130. The 2×2 MMI combiner 1162 combines the LO optical signal from modulator 1182b with the returned signal output by circulator 1118. The balanced electrical signals are then digitized and processed by processor 1150 that includes the signed Doppler compensation module 1170. In some embodiments, digital signals for both the modulators 1182a and 1182b are generated by modulation signal module 272 in processing system 250 depicted in FIG. 2. In the illustrated embodiment, the modulation signal module 272 is a module 1181, such as a field programmable gate array (FPGA), separate from the processing system 1150.

In some embodiments, the digital signal to impose on the optical carrier, produced in 1181 for each of channel 1 and channel 2 to modulators 1182a and 1182b, respectively, includes the desired RF chirp signal imposed on a non-zero RF carrier signal. This results in an offset of the chirps further from the optical carrier. The offset is in both the transmitted optical signal and LO optical signal. When the resulting LO and received optical signals are mixed at mixer 1162, the result will mix back down to baseband for digitization, and subsequent processing is the same. FIG. 9A to FIG. 9G already have this concept illustrated for the chirp signal, where "f" is the offset frequency from DC (e.g., a 1 GHz chip going from 500 MHz to 1.5 GHz). The approach offers several advantages. The approach allows single octave processing which eliminates distortions due to harmonics and spurs. Filters can be designed to reduce noise content when the signal is away from baseband. The approach allows the possibility of higher sample rates with the addition of different modulation formats.

Two transceivers can be utilized to provide more flexibility in waveform design by modulating independent transmit and LO modulators. The nature of the modulators works to improve optical power utilization and reduce requirements on the balanced detector. In the chirped case of FIG. 11, the phase modulator 1182b provides both the up and down chirped local oscillator signal with either one of the superimposed I and Q phase states at different time intervals within the processing time interval to support the time domain IQ approach.

Figure 12A:
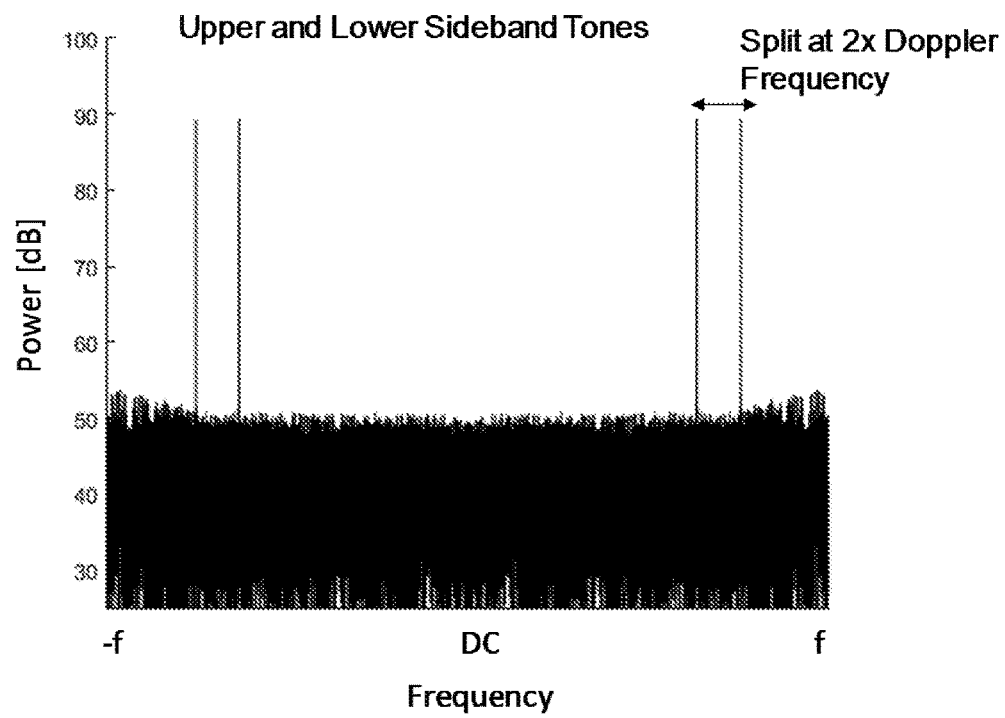
FIG. 12A is a repeat of FIG. 10
Figure 12B:
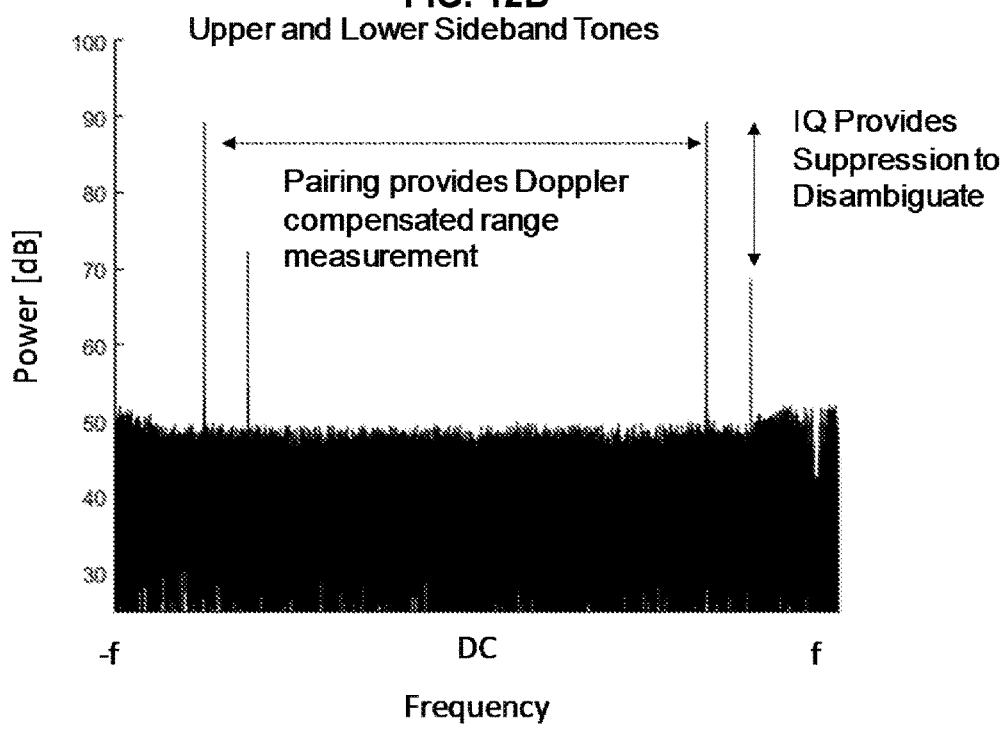
FIG. 12B is a graph that illustrates an example spectrum of returned signals with time separated I/Q processing, showing suppressed Doppler components of the wrong sign, according to an embodiment.

FIG. 12A is a repeat of FIG. 10 and FIG. 12B is a graph that illustrates an example spectrum of returned signals with time separated I/Q processing, showing suppressed Doppler components of the wrong sign, according to an embodiment. In both graphs the horizontal axis indicates frequency bin centered on zero; and the vertical axis indicates power in deciBels (dB). As can be seen, the peaks associated with the wrong sign Doppler shifts are suppressed below the correctly signed Doppler shift by about 15 dB, so there is no ambiguity about the correct sign of the Doppler shift.

4.2 Chirped Optical Detection Signed Doppler Correction Method

Figure 13:
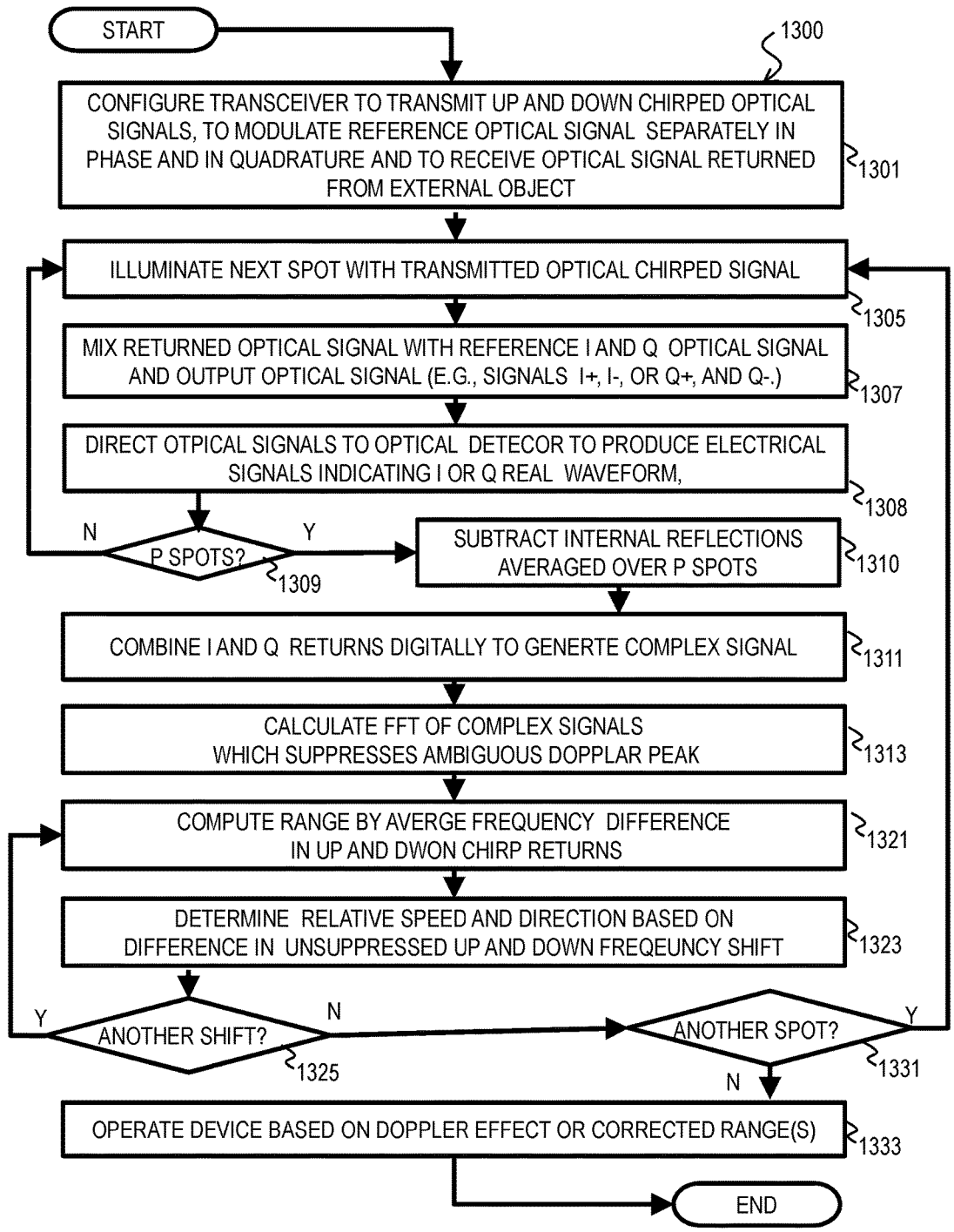
FIG. 13 is a flow chart that illustrates an example method for using time-separated I/Q Doppler-corrected up and down chirped LIDAR system to determine and compensate for signed Doppler effects on ranges, according to an embodiment.

FIG. 13 is a flow chart that illustrates an example method 1300 for using time-separated I/Q Doppler-corrected up and down chirped LIDAR system to determine and compensate for signed Doppler effects on ranges, according to an embodiment. This example method incorporates time separated I/Q measurements with other processing features of the methods described in the above cited patent application. In some embodiment, steps 1310 through 1333 are performed by processing system 250 or 1150. For example, in some embodiments, all of steps 1310 through 1333 are performed by Doppler compensation module 1170 in FIG. 11.

In step 1301, a transceiver, e.g., a LIDAR system 1100, is configured to transmit up and down chirped optical signals based on input from a modulation signal module. A portion (e.g., 1% to 10%) of the unmodulated input optical signal from the laser, or the up and down chirped transmitted signal, is also directed to a reference optical path. The LIDAR system is also configured to modulate the reference optical signal separately in phase and in quadrature, e.g., by storing those signals separately in the modulation signal module 272 and including the second modulator 282b as a phase modulator 1182 in the reference path but not the transmitted path. The transceiver is also configured to receive a backscattered optical signal from any external object illuminated by the transmitted signals. In some embodiments, step 1301 includes configuring other optical components in hardware to provide the functions of one or more of the following steps as well, as illustrated, for example, in FIG. 11, or equivalents. Note that the transmitted signal need not be a beam.

In step 1305 a first portion of the laser output is up and down chirped using signals received from modulation signal module 272, e.g., module 1181, to produce a transmitted up and down chirped signal and directed to a spot in a scene where there might be, or might not be, an object or a part of an object. In addition, in step 1305 a second portion of the laser output is directed as a reference signal also called a local oscillator (LO) signal, along a reference path. According to various embodiments, the LO signal is modulated by one of two different versions of the signal modulated onto the transmitted signal, either the in-phase component or a quadrature component. The in-phase component is given by Equation 17a based on Equation 6, given above.

$$LO = C_{LO} \exp(i[\omega(t)t]) \quad (17a)$$

Where $C_{LO}$ reflects the much lower amplitude of the LO signal than the transmitted signal. The quadrature component is given by Equation (17b)

$$LO = C_{LO} \exp(i[\omega(t)t + \pi/2]) \quad (17b)$$

In step 1307, the backscattered returned signal, R, with any travel time delay $\Delta t$ and Doppler shift $\omega_D$ is mixed with only one of the two reference signals (LO), as represented by Equation 17a or Equation 17b, depending on the time interval, to output one or more mixed optical signals. The mixed signal in any particular time interval informs on either the in-phase or quadrature component, but not both. For example, in the embodiment illustrated in FIG. 11, the mixed optical signals output by 2×2 MMI combiner 1162 include two optical signals that inform on in-phase components, namely I+, I−, during one time interval within the processing time interval; and in a different, non-overlapping time interval within the same processing time interval informs on the quadrature components, namely Q+, Q−. As described above for phase encoding, the in-phase time intervals can alternate with the quadrature time intervals or be randomly placed, an equal number of times during the processing time interval.

In step 1308, the mixed optical signals are directed to and detected at one or more optical detectors to convert the optical signals to one or more corresponding electrical signals. For example, in the embodiment illustrated in FIG. 11, one electrical signal is produced by the balanced detector 330*a*. The electrical signal during one time interval within the processing time interval (called channel Ch 1) indicates down-mixed in-phase component I. The electrical signal during a different non-overlapping time interval within the processing time interval (called Ch 2) indicates down-mixed quadrature component Q. A complex down-mixed signal S is later, e.g., in step 1311, computed digitally based on the two electrical signals, as given by Equation 11. Note that the signals S, I and Q are functions of time, t, of at least duration τ.

In some embodiments, averaging is performed over several different return signals S(t) to remove spurious copies of the up and down chirped signal produced at internal optical components along the return signal path as described above with respect to steps 609 and 610. In step 1309 it is determined whether P returns have been received. If not, control passes to back to step 1305 to illuminate another spot. If so, then control passes to step 1310. In step 1310 the average signal over P spots is computed. This average signal is used to correct each of the received signals to produce corrected signals.

In some embodiments, the internal optics are calibrated once under controlled conditions. Thus step 1310 includes only applying the stored correction. In some embodiments, the spurious returns produced by the internal optics are small enough, or the associated ranges different enough from the ranges to the external objects, that step 1309 and 610 can be omitted. Thus, in some embodiments, steps 1309 and 1310 are omitted, and control passes directly from step 1308 to step 1311.

In step 1311, a complex digital return signal is constructed using the temporally separated estimates of I and Q. In step 1313 the complex Fourier transform of the complex digitally constructed return signal is determined, for example using a complex FFT function FFT(S) implemented in hardware or software.

In step 1321, the range is determined by averaging the up chirp and down chirp ranges, correcting for any offset in LO as illustrated in FIG. 9E.

In step 1323 the complex FFT of the complex signal is taken to determine the unsuppressed peak in the spectrum as the signed Doppler shift.

In step 1325, it is determined whether there is another signed Doppler shift, e.g., when more than one unsuppressed Doppler peak is detected in step 1323. If so, then control passes back to step 1321. If not, then control passes to step 1331.

In step 1331, it is determined whether there is another spot to illuminate in a scene of interest, e.g., by scanning to view a new spot in the scene of interest. If so, control passes back to step 1305 and following steps to illuminate the next spot and process any returns during the next processing time interval. In some embodiments using multi-spot averaging, the new spot is added to the average and the oldest spot is removed, or P new spots are collected in the loop formed by steps 1305 through 1309. If there is not another spot to illuminate, then the results are used, and control passes to step 1333.

In step 1333, a device is operated based on the signed Doppler effect or the corrected ranges, for example as described above with respect to step 633.

5. Computational Hardware Overview

Figure 14:
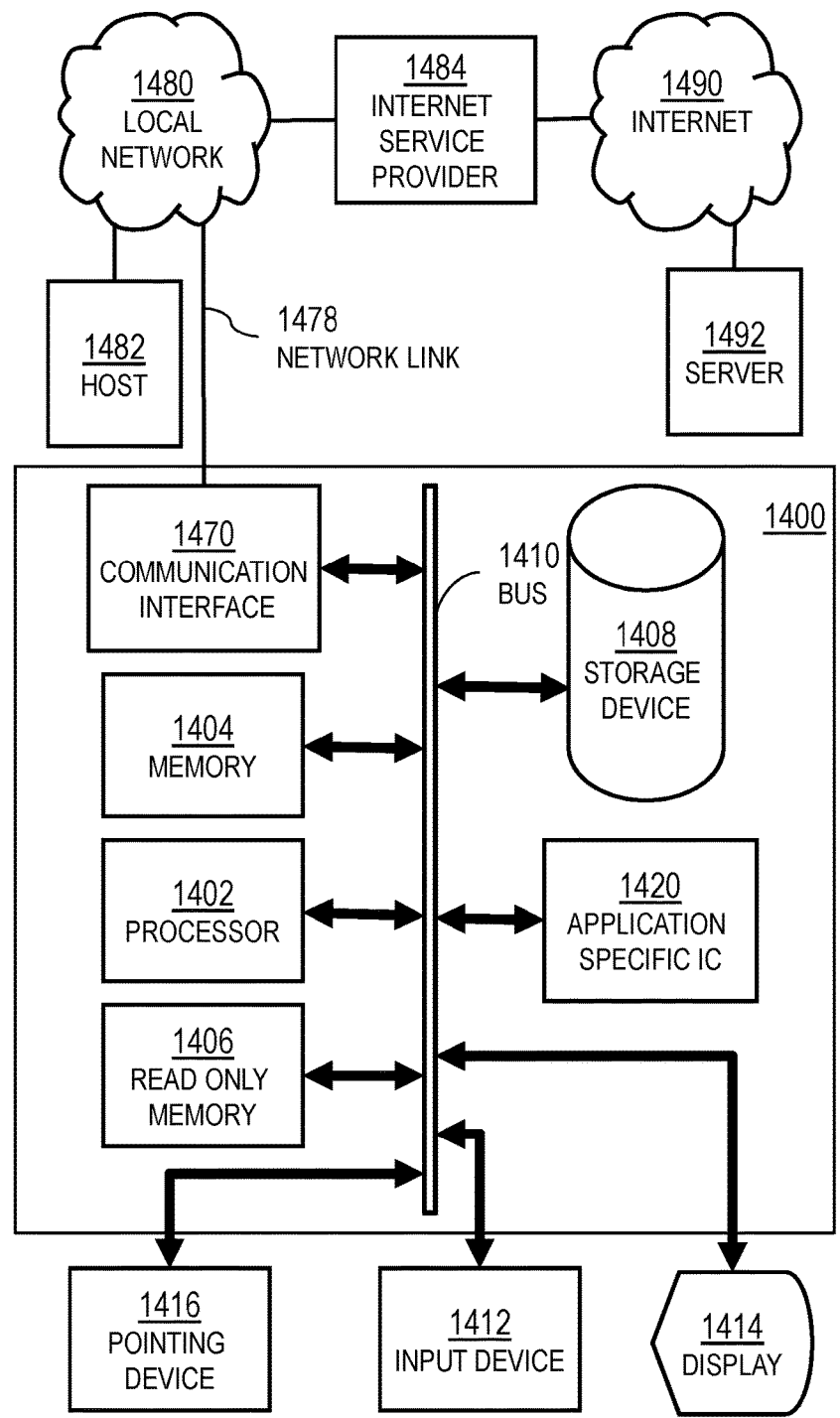
FIG. 14 is a block diagram that illustrates a computer system upon which an embodiment of the invention may be implemented.

FIG. 14 is a block diagram that illustrates a computer system 1400 upon which an embodiment of the invention may be implemented. Computer system 1400 includes a communication mechanism such as a bus 1410 for passing information between other internal and external components of the computer system 1400. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit).). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1400, or a portion thereof, constitutes a means for performing one or more steps of one or more methods described herein.

A sequence of binary digits constitutes digital data that is used to represent a number or code for a character. A bus 1410 includes many parallel conductors of information so that information is transferred quickly among devices coupled to the bus 1410. One or more processors 1402 for processing information are coupled with the bus 1410. A processor 1402 performs a set of operations on information. The set of operations include bringing information in from the bus 1410 and placing information on the bus 1410. The set of operations also typically include comparing two or more units of information, shifting positions of units of information, and combining two or more units of information, such as by addition or multiplication. A sequence of operations to be executed by the processor 1402 constitutes computer instructions.

Computer system 1400 also includes a memory 1404 coupled to bus 1410. The memory 1404, such as a random access memory (RAM) or other dynamic storage device, stores information including computer instructions. Dynamic memory allows information stored therein to be changed by the computer system 1400. RAM allows a unit of information stored at a location called a memory address to be stored and retrieved independently of information at neighboring addresses. The memory 1404 is also used by the processor 1402 to store temporary values during execution of computer instructions. The computer system 1400 also includes a read only memory (ROM) 1406 or other static storage device coupled to the bus 1410 for storing static information, including instructions, that is not changed by the computer system 1400. Also coupled to bus 1410 is a non-volatile (persistent) storage device 1408, such as a magnetic disk or optical disk, for storing information, including instructions, that persists even when the computer system 1400 is turned off or otherwise loses power.

Information, including instructions, is provided to the bus 1410 for use by the processor from an external input device 1412, such as a keyboard containing alphanumeric keys operated by a human user, or a sensor. A sensor detects conditions in its vicinity and transforms those detections into signals compatible with the signals used to represent information in computer system 1400. Other external devices coupled to bus 1410, used primarily for interacting with humans, include a display device 1414, such as a cathode ray tube (CRT) or a liquid crystal display (LCD), for presenting images, and a pointing device 1416, such as a mouse or a trackball or cursor direction keys, for controlling a position of a small cursor image presented on the display 1414 and issuing commands associated with graphical elements presented on the display 1414.

In the illustrated embodiment, special purpose hardware, such as an application specific integrated circuit (IC) 1420, is coupled to bus 1410. The special purpose hardware is configured to perform operations not performed by processor 1402 quickly enough for special purposes. Examples of application specific ICs include graphics accelerator cards for generating images for display 1414, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1400 also includes one or more instances of a communications interface 1470 coupled to bus 1410. Communication interface 1470 provides a two-way communication coupling to a variety of external devices that operate with their own processors, such as printers, scanners and external disks. In general the coupling is with a network link 1478 that is connected to a local network 1480 to which a variety of external devices with their own processors are connected. For example, communication interface 1470 may be a parallel port or a serial port or a universal serial bus (USB) port on a personal computer. In some embodiments, communications interface 1470 is an integrated services digital network (ISDN) card or a digital subscriber line (DSL) card or a telephone modem that provides an information communication connection to a corresponding type of telephone line. In some embodiments, a communication interface 1470 is a cable modem that converts signals on bus 1410 into signals for a communication connection over a coaxial cable or into optical signals for a communication connection over a fiber optic cable. As another example, communications interface 1470 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 1470 sends and receives electrical, acoustic or electromagnetic signals, including infrared and optical signals, that carry information streams, such as digital data.

The term computer-readable medium is used herein to refer to any medium that participates in providing information to processor 1402, including instructions for execution. Such a medium may take many forms, including, but not limited to, non-volatile media, volatile media and transmission media. Non-volatile media include, for example, optical or magnetic disks, such as storage device 1408. Volatile media include, for example, dynamic memory 1404. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 1402, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 1402, except for carrier waves and other signals.

Logic encoded in one or more tangible media includes one or both of processor instructions on a computer-readable storage media and special purpose hardware, such as ASIC 1420.

Network link 1478 typically provides information communication through one or more networks to other devices that use or process the information. For example, network link 1478 may provide a connection through local network 1480 to a host computer 1482 or to equipment 1484 operated by an Internet Service Provider (ISP). ISP equipment 1484 in turn provides data communication services through the public, world-wide packet-switching communication network of networks now commonly referred to as the Internet 1490. A computer called a server 1492 connected to the Internet provides a service in response to information received over the Internet. For example, server 1492 provides information representing video data for presentation at display 1414.

The invention is related to the use of computer system 1400 for implementing the techniques described herein. According to one embodiment of the invention, those techniques are performed by computer system 1400 in response to processor 1402 executing one or more sequences of one or more instructions contained in memory 1404. Such instructions, also called software and program code, may be read into memory 1404 from another computer-readable medium such as storage device 1408. Execution of the sequences of instructions contained in memory 1404 causes processor 1402 to perform the method steps described herein. In alternative embodiments, hardware, such as application specific integrated circuit 1420, may be used in place of or in combination with software to implement the invention. Thus, embodiments of the invention are not limited to any specific combination of hardware and software.

The signals transmitted over network link 1478 and other networks through communications interface 1470, carry information to and from computer system 1400. Computer system 1400 can send and receive information, including program code, through the networks 1480, 1490 among others, through network link 1478 and communications interface 1470. In an example using the Internet 1490, a server 1492 transmits program code for a particular application, requested by a message sent from computer 1400, through Internet 1490, ISP equipment 1484, local network 1480 and communications interface 1470. The received code may be executed by processor 1402 as it is received, or may be stored in storage device 1408 or other non-volatile storage for later execution, or both. In this manner, computer system 1400 may obtain application program code in the form of a signal on a carrier wave.

Various forms of computer readable media may be involved in carrying one or more sequence of instructions or data or both to processor 1402 for execution. For example, instructions and data may initially be carried on a magnetic disk of a remote computer such as host 1482. The remote computer loads the instructions and data into its dynamic memory and sends the instructions and data over a telephone line using a modem. A modem local to the computer system 1400 receives the instructions and data on a telephone line and uses an infra-red transmitter to convert the instructions and data to a signal on an infra-red a carrier wave serving as the network link 1478. An infrared detector serving as communications interface 1470 receives the instructions and data carried in the infrared signal and places information representing the instructions and data onto bus 1410. Bus 1410 carries the information to memory 1404 from which processor 1402 retrieves and executes the instructions using some of the data sent with the instructions. The instructions and data received in memory 1404 may optionally be stored on storage device 1408, either before or after execution by the processor 1402.

Figure 15:
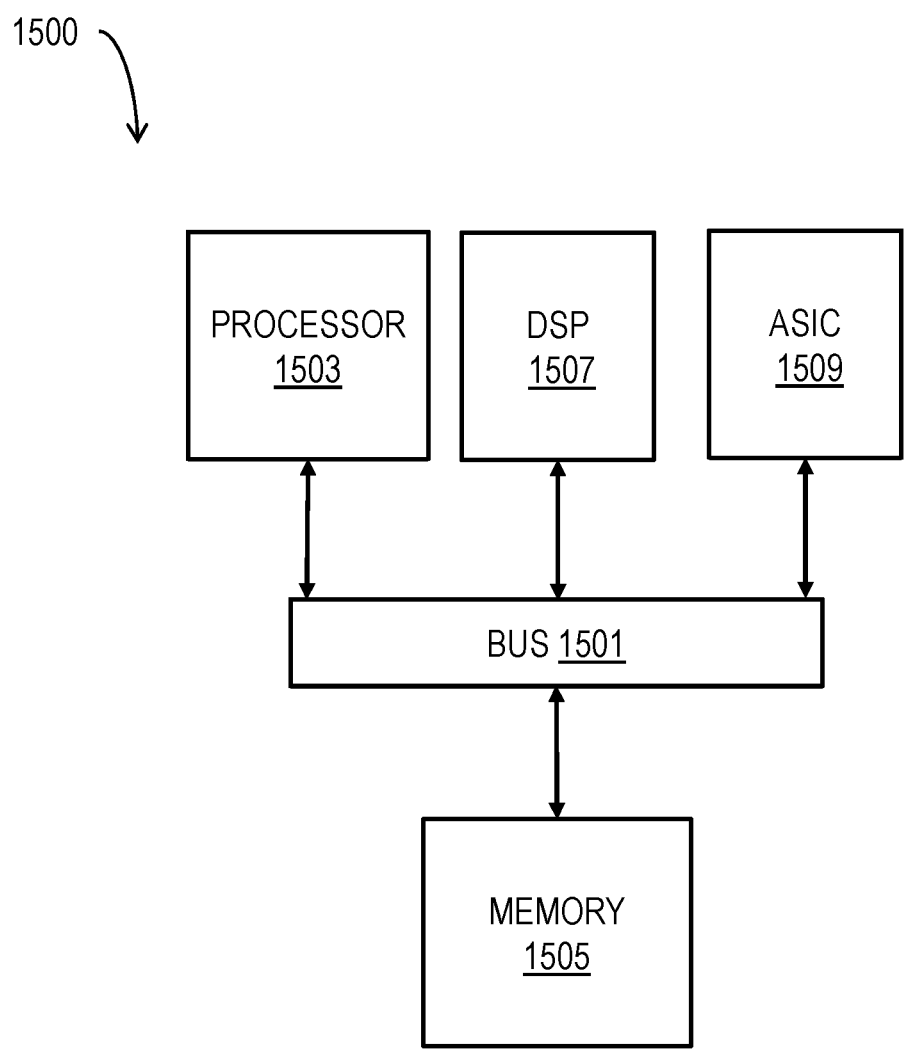
FIG. 15 illustrates a chip set upon which an embodiment of the invention may be implemented.

FIG. 15 illustrates a chip set 1500 upon which an embodiment of the invention may be implemented. Chip set 1500 is programmed to perform one or more steps of a method described herein and includes, for instance, the processor and memory components described with respect to FIG. 14 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1500, or a portion thereof, constitutes a means for performing one or more steps of a method described herein.

In one embodiment, the chip set 1500 includes a communication mechanism such as a bus 1501 for passing information among the components of the chip set 1500. A processor 1503 has connectivity to the bus 1501 to execute instructions and process information stored in, for example, a memory 1505. The processor 1503 may include one or more processing cores with each core configured to perform independently. A multi-core processor enables multiprocessing within a single physical package. Examples of a multi-core processor include two, four, eight, or greater numbers of processing cores. Alternatively or in addition, the processor 1503 may include one or more microprocessors configured in tandem via the bus 1501 to enable independent execution of instructions, pipelining, and multithreading. The processor 1503 may also be accompanied with one or more specialized components to perform certain processing functions and tasks such as one or more digital signal processors (DSP) 1507, or one or more application-specific integrated circuits (ASIC) 1509. A DSP 1507 typically is configured to process real-world signals (e.g., sound) in real time independently of the processor 1503. Similarly, an ASIC 1509 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1503 and accompanying components have connectivity to the memory 1505 via the bus 1501. The memory 1505 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 1505 also stores the data associated with or generated by the execution of one or more steps of the methods described herein.

6. Alterations, Extensions and Modifications

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article. As used herein, unless otherwise clear from the context, a value is "about" another value if it is within a factor of two (twice or half) of the other value. While example ranges are given, unless otherwise clear from the context, any contained ranges are also intended in various embodiments. Thus, a range from 0 to 10 includes the range 1 to 4 in some embodiments.

7. References

The following references were cited herein, the entire contents of each of which are hereby incorporated by reference as if fully set forth herein, except for terminology inconsistent with that used herein.

Foucras, M. et al., 2014, "Detailed Analysis of the Impact of the Code Doppler on the Acquisition Performance of New GNSS Signals," ION ITM 2014, International Technical Meeting of The Institute of Navigation, San Diego, United States. January 2014.

Kachelmyer, A. L., 1990, "Range-Doppler Imaging with a Laser Radar", The Lincoln Laboratory Journal, v3 (1), pp 87-118.

Krasner, N. F., 1998, "GPS Receiver and Method for Processing GPS Signals," U.S. Pat. No. 5,781,156, July-1998.

OIF (Optical Internetworking Forum), "Implementation Agreement for Integrated Dual Polarization Micro-Intradyne Coherent Receivers," R. Griggs, Ed., IA # OIF-DPC-MRX-01.0, published by Optical Internetworking Forum available at domain oiforum at category com, 31 Mar. 2015.

What is claimed is:
1. A method comprising:
   modulating an optical signal from a laser to produce a broadband optical signal; transmitting the broadband optical signal;
   receiving a returned optical signal in response to transmitting the broadband optical signal;
   mixing during a first time interval the returned optical signal with a first reference optical signal based on an in-phase version of the broadband optical signal to produce a first mixed optical signal;

detecting a real part of the first mixed optical signal at a first optical detector during the first time interval to produce a first electrical signal;

mixing during a non-overlapping second time interval the returned optical signal with a second reference optical signal based on a quadrature version of the broadband optical signal to produce a second mixed optical signal;

detecting a real part of the second mixed optical signal at a second optical detector during the second time interval to produce a second electrical signal;

producing on a processor a complex digital signal by using a digitized sample of one of the first electrical signal and the second electrical signal as a real part of the complex digital signal and a digitized sample of a different one of the first electrical signal and the second electrical signal as an imaginary part of the complex digital signal;

determining on a processor a signed Doppler frequency shift of the returned optical signal based, at least in part, on a Fourier transform of the complex digital signal; and operating a device based on the signed Doppler frequency shift.

2. The method as recited in claim 1, wherein the first optical detector is also the second optical detector.

3. The method as recited in claim 1, wherein:
both mixing steps are performed using one 2×2 multimode interference structure that outputs a positive optical component and a negative optical component; and both detecting steps are performed using one balanced optical detector that outputs an electrical signal that indicates a difference between the positive optical component and the negative optical component.

4. The method as recited in claim 1, wherein the broadband optical signal is a phase-encoded optical signal.

5. The method as recited in claim 1, wherein the broadband optical signal is an up and down chirped optical signal.

6. The method as recited in claim 1, wherein the first time interval and the second time interval alternate an equal number of times during a processing time interval.

7. The method as recited in claim 1, wherein the first time interval and the second time interval occur an equal number of times randomly during a processing time interval.

8. The method a recited in claim 1, wherein operating the device based on the Doppler frequency shift further comprises presenting on a display device an image that indicates a Doppler corrected position of any object at a plurality of spots illuminated by the transmitted broadband optical signal.

9. The method a recited in claim 1, wherein operating the device based on the Doppler frequency shift further comprises communicating, to the device, data that identifies at least one object based on a point cloud of Doppler corrected positions at a plurality of spots illuminated by the transmitted broadband optical signal.

10. The method a recited in claim 1, wherein operating the device based on the Doppler frequency shift further comprises presenting on a display device an image that indicates a size of the Doppler frequency shift at a plurality of spots illuminated by the transmitted broadband optical signal, whereby moving objects are distinguished from stationary objects and absent objects.

11. The method a recited in claim 1, wherein operating the device based on the Doppler frequency shift further comprises moving a vehicle to avoid a collision with an object, wherein a closing speed between the vehicle and the object is determined based on a size of the Doppler frequency shift at a plurality of spots illuminated by the transmitted broadband optical signal.

12. The method a recited in claim 1, wherein operating the device based on the Doppler frequency shift further comprises identifying an object based on a point cloud of Doppler corrected positions at a plurality of spots illuminated by the transmitted broadband optical signal.

13. The method a recited in claim 1, wherein producing the complex digital signal further comprises producing the complex digital signal by subtracting from an output of the first optical detector an average output from the first optical detector over a plurality of returned optical signals received in response to transmitting a corresponding plurality of the broadband optical signal.

* * * * *

UNITED STATES PATENT AND TRADEMARK OFFICE
CERTIFICATE OF CORRECTION

PATENT NO. : 10,401,495 B2
APPLICATION NO. : 15/645311
DATED : September 3, 2019
INVENTOR(S) : Crouch et al.

Page 1 of 1

It is certified that error appears in the above-identified patent and that said Letters Patent is hereby corrected as shown below:

On the Title Page

Please update the Applicant and Assignee, as follows:
(71) Applicant: AURORA OPERATIONS, INC., PITTSBURGH, PA (US)
(73) Assignee: AURORA OPERATIONS, INC., PITTSBURGH, PA (US)

Signed and Sealed this
Twenty-fifth Day of June, 2024

Katherine Kelly Vidal
*Director of the United States Patent and Trademark Office*